US006687555B1

(12) United States Patent
Honda et al.

(10) Patent No.: US 6,687,555 B1
(45) Date of Patent: Feb. 3, 2004

(54) LINEAR SOLENOID CONTROL APPARATUS AND METHOD HAVING INCREASED RESPONSIVENESS FEATURES

(75) Inventors: Takayoshi Honda, Nagoya (JP); Takamichi Kamiya, Kasugai (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/293,149

(22) Filed: Apr. 16, 1999

(30) Foreign Application Priority Data

Apr. 21, 1998 (JP) ............................. 10-110957
Sep. 30, 1998 (JP) ............................. 10-278747

(51) Int. Cl.[7] .............................................. G05B 21/02
(52) U.S. Cl. ........................................ 700/73; 341/155
(58) Field of Search .................. 700/73, 74, 9; 701/115; 341/141, 155, 142, 165

(56) References Cited

U.S. PATENT DOCUMENTS

| 4,564,831 | A | * | 1/1986 | Wheable et al. | ............ 341/155 |
| 4,821,167 | A | * | 4/1989 | Wiebe | ............ 700/9 |
| 5,383,086 | A | | 1/1995 | Wietelmann et al. | ....... 361/152 |
| 5,991,686 | A | * | 11/1999 | Oguro et al. | ............... 701/115 |

FOREIGN PATENT DOCUMENTS

| JP | 60-68401 | 4/1985 |
| JP | 6-30594 | 2/1994 |
| JP | 10-2248 | 1/1998 |

* cited by examiner

*Primary Examiner*—Leo Picard
*Assistant Examiner*—Steven R. Garland
(74) *Attorney, Agent, or Firm*—Harness, Dickey & Pierce, PLC

(57) ABSTRACT

A control system and method for controlling operation of a group of linear solenoids, which in turn control operation of an electrical load such as a solenoid or actuator, that exhibits increased responsiveness to a change in the target linear solenoid load current. A microcomputer cyclically generates and outputs pulse-width-modulated drive signals based on acquired drive data to establish clock periods. A switch connected between the microcomputer and the target load switchably connects the target load to a power source based on the drive data to selectively drive the target load. A feedback loop between the target load and the microcomputer provides actual target load drive data to the microcomputer, and the microcomputer adjusts the drive signals at a rate of not more than two times per cycle based on the actual drive data to converge the actual drive data to a calculated target load drive value. The present invention also provides an apparatus that prevents a drop in controller current control responsiveness due to signal response delay produced by feedback or the drive system. A converter converts input signals to digital values at a conversion cycle shorter than a cycle of the input signals. A data storage device sequentially stores digital values obtained from the converter, and a processor calculates a mean value to fetch the stored digital values for a cycle time of the input signals, and computes an arithmetic mean of the fetched digital values for target control purposes.

13 Claims, 29 Drawing Sheets

FIG. 2

| | RAM 22 |
|---|---|
| PWM1 | CYCL(1) |
| | TON(1) |
| PWM2 | CYCL(2) |
| | TON(2) |
| PWM3 | CYCL(3) |
| | TON(3) |
| PWM4 | CYCL(4) |
| | TON(4) |

FIG. 3

SOLENOID-CONTROL PROCESSING

DETECT SOLENOID CURRENT I(m) — S110

CALCULATE TARGET CURRENT VR(m) — S120

CALCULATE "ON" TIME DATA TON(m) — S130

STORE TON(m) AND CYCL(m) IN RAM — S140

RETURN

FIG. 20A

RAM 1022

| PWM 0 | CYCL(0) |
|---|---|
|  | T ON(0) |
|  | OVW(0) |
| PWM 1 | CYCL(1) |
|  | T ON(1) |
|  | OVW(1) |
| PWM 2 | CYCL(2) |
|  | T ON(2) |
|  | OVW(2) |
| PWM 3 | CYCL(3) |
|  | T ON(3) |
|  | OVW(3) |

FIG. 20B

RAM 1036

| ch 0 | ch 1 | ch 2 | ch 3 |
|---|---|---|---|
| dat[0,0] | dat[1,0] | dat[2,0] | dat[3,0] |
| dat[0,1] | dat[1,1] | dat[2,1] | dat[3,1] |
| dat[0,2] | dat[1,2] | dat[2,2] | dat[3,2] |
| ⋮ | ⋮ | ⋮ | ⋮ |
| dat[0,14] | dat[1,14] | dat[2,14] | dat[3,14] |
| dat[0,15] | dat[1,15] | dat[2,15] | dat[3,15] |

FIG. 20C

RAM 1034a

| ch 0 | ch 1 | ch 2 | ch 3 |
|---|---|---|---|
| ad[0] | ad[1] | ad[2] | ad[3] |

LINEAR SOLENOID CONTROL APPARATUS AND METHOD HAVING INCREASED RESPONSIVENESS FEATURES

CROSS-REFERENCE TO RELATED APPLICATIONS

The present application is related to, and claims priority from, Japanese Patent Application Nos. Hei. 10-110957 and Hei. 10-278747, the contents of which are incorporated herein by reference.

BACKGROUND OF THE PRESENT INVENTION

1. Technical Field

The present invention relates generally to pulse-width modulated controls, and more particularly to controlling current to a linear solenoid in an electromagnetic-type solenoid or actuator to regulate the degree of opening of the solenoid or the amount of actuator displacement of a driven target.

2. Related Art

Linear solenoids are provided in conventional solenoids or actuators to regulate actuation of the solenoid/actuator by regulating the amount of current flow to the solenoid/actuator. In turn, current flow to the linear solenoid is typically controlled by connecting the inductive load of the linear solenoid to a direct-current power source across a switching element, such as a conducting unit including a transistor, and then switching the element on and off via controlled duty pulse-width-modulated signals.

When it is necessary to accurately control the opening degree of the solenoid or the amount of displacement of the driven target, current flowing to the linear solenoid inductive load is detected, and current feedback is performed to increase or reduce the duty of the pulse-width-modulated signals to the switching element so that the detected current value converges to a calculated target current.

Herein, in an inductive load conductivity controller that performs the above-described current control according to the prior art, a processing portion including a central processing unit (CPU) calculates the duty of the pulse-width-modulated signals at each iteration of a predetermined processing cycle. A pulse-width-modulated signal-output portion including a logic circuit and provided separately from the processing portion outputs signals to the switching element at a duty calculated by the processing portion.

More particularly, the processing portion determines the time per pulse-width-modulated signal cycle to switch the switching element on or off based on the calculated duty, and stores data representing the time in a RAM. Meanwhile, the signal-output portion includes a counter to repeatedly clock one cycle of pulse-width-modulated signals, and a register to which data stored in the specific address in the RAM is sent. The signal-output portion generates and outputs the pulse-width-modulated signal of the duty calculated by the CPU by repeating operation wherein a pulse-width-modulated signal goes to a high level (or to a low level) at the start of one cycle of a pulse-width-modulated signal detected based on the value of a counter. Correspondingly, the output portion sends the data stored in the specific address in the RAM by the processing unit to the register, and inverts the output level of the pulse-width-modulated signal when the value of a counter reaches the data value in the register.

Accordingly, pulse-width-modulated signals having a desired duty can be output to the switching element as drive signals, with no need for the processing portion to execute complex output signal processing.

However, in the above-described conventional pulse-width-modulated signal-output portion, a maximum time of one pulse-width-modulated signal cycle is required until the duty calculated by the processing portion is actually reflected in the drive for the switching element. Therefore, the actual responsiveness that can be effected when controlling the current to the inductive load is limited. That is to say, the pulse-width-modulated signal-output portion is structured so that, at the start point of one pulse-width-modulated signal cycle, the pulse-width-modulated signal-output portion transfers the data stored in the specific address of the RAM at that time to its own register. Because of this, even when the processing portion calculates the newest duty and stores the data corresponding thereto in the specified address in the RAM during one pulse-width-modulated signal cycle, the newest data is reflected only in the next pulse-width-modulated signal cycle.

To overcome the above limitation, Japanese Patent Application Laid-open No. Hei 10-2248 proposes an apparatus to monitor whether data in the foregoing specific address in the RAM has been updated by the processing portion during the interval from initiation of clocking of one pulse-width-modulated signal cycle by the counter until initiation of clocking of the next cycle. Accordingly, when a data update is detected, the apparatus transfers the updated data from the RAM to its own register, while continuously comparing the value of the counter with the data value within the above-mentioned register. When the counter value has not reached the value of the data in the register, the apparatus causes the pulse-width-modulated signals to go to one level. When the value has reached the value of the data in the register, the apparatus causes the signals to go to the other level.

Although the newest data stored at a specific address in the RAM can immediately be reflected in the duty of the pulse-width-modulated signals, the signal level may change three or more times during a single pulse-width-modulated signal cycle. As such, during one pulse-width-modulated signal cycle, after the signal level has already been reflected, the signal level is returned to its original level, and thereafter is again reflected. As a result, the pulse-width-modulated signal cycle may be disturbed.

That is to say, the signal level of the pulse-width-modulated signals ordinarily changes twice during one cycle thereof, from low to high and from high to low. However, changing of the signal level three or more times signifies a change in the pulse-width-modulated signal cycle itself. Accordingly, in a conductivity controller of the type presently discussed, the cycle of the pulse-width-modulated signals output to the switching element is established at an optimal value for adjusting the amount of displacement of the drive target, such as a solenoid or an actuator. Therefore, when division from the cycle occurs, controllability of the drive target is decreased.

Meanwhile, Japanese Patent Application Laid-open No. Hei. 6-30594, for example, describes an apparatus for generating a delta wave of the same cycle as a pulse-width-modulated signal, together with a pulse-width-modulated signal having a corresponding to a threshold value Vth. The apparatus accomplishes this by comparing the sizes of the level of the delta wave and a threshold value Vth proportional to the high-level time during one pulse-width-modulated signal cycle, and making the pulse-width-modulated go high when the level of the delta wave is the threshold value Vth or less, or otherwise making the pulsewidth-modulated signal go low, as shown in FIG. 18. In the "PWM signal" entry of FIG. 18, "ON" indicates a high level and "OFF" indicates a low level.

Accordingly, even when pulse-width-modulated signals are generated by such a method, as shown on the right-hand half of FIG. 18, when the change timing of the threshold value Vth occurs any number of times in a single pulse-width-modulated signal cycle, disturbance occurs in the cycle of the output signals, and the controllability of the drive target decreases, as shown by the ellipse in FIG. 18.

Additionally, the above-described Japanese Patent Application Laid-open No. Hei. 6-30594 describes a structure for suppressing fluctuation of the threshold value Vth compared with the delta-wave level by a lag circuit to prevent such a problem. However, as a result of the suppression, a decline occurs even in the original reflection speed with respect to the duty of the pulse-width-modulated signals. Thus, current control responsiveness is negatively affected.

In addition, when performing the above-discussed current feedback, it is necessary to detect the load current. However, because this current flows through the switching element which is cyclically switched on and off by the pulse-width-modulated signal, the current pulses. For example, when the inductive load current is detected based on the voltage drop across a resistor provided in the conductive path of the inductive load, the detected current value fluctuates, and so stabilized control cannot be performed.

In this regard, when performing feedback control of current to an inductive load, conventionally, a current value detected using the above resistor is smoothed using a lag circuit made up of a capacitor and a resistor. The duty of the pulse-width-modulated signal is then increased or reduced in accordance with the deviation between the smoothed detected current value and the target current value, for example as shown in Japanese Patent Application Laid-open No. 60-68401.

FIG. 29 shows the general structure of a linear-solenoid controller for vehicle use. The controller controls current to a linear solenoid L incorporated within a solenoid which is a control target, to thereby control the degree of opening of various types of solenoids incorporated within a vehicle internal combustion engine, an automatic transmission or the like. As shown, in a linear-solenoid controller 1050, a host CPU 1052, which controls an internal combustion engine, an automatic transmission, or the like, issues a target current value to a linear-solenoid control IC 1054. In the linear-solenoid control IC 1054, a sub CPU 1054 receives a target current value from the host CPU 1052 and determines the duty for duty-driving the linear solenoid L based on the deviation between the target current value and the actual detected value of current flowing to the linear solenoid L. The sub CPU 1054 then outputs this duty to a pulse-width-modulated signal-output circuit 1056 as an instruction value. The circuit 1056 generates a pulse-width-modulated signal corresponding to the instruction value (duty value).

By outputting this to a switching element (in the drawing, a field-effect transistor [FET]) 1058 provided in the conduction path to the linear solenoid L from a battery which is a direct-current power source, the circuit 1056 duty-drives the switching element 58 at the duty determined by the sub CPU 1054. Additionally, a resistor R10 for current-detecting use is disposed in the conduction path of the linear solenoid L. By differentially amplifying the two end voltages of the resistor R10 with a differential amplifier 1060, the current to the linear solenoid L is converted to a voltage signal.

After the output from the differential amplifier 1060 is smoothed by a lag circuit 1062 made up of a resistor R11 and a capacitor C11, the resulting voltage signal after being digitally converted by an analog-to-digital converter 1064 is input to the sub CPU 1054 as a detected current value indicating the current to the linear solenoid L.

However, with a current controller according to the prior art, when performing feedback control of the load current, the current detection signal is smoothed using a lag circuit or the like, the duty of the pulse-width-modulated signals is set according to this detected-current value after smoothing and a target current value, and the pulse-width-modulated signals are generated according to this duty. Because of this, considerable time is required until the current to the inductive load reaches the target current value and stabilizes, due to feedback delay, particularly delay due to the time constant of the lag circuit.

For example, when the value of the load current is controlled at the target value, as shown in FIG. 30A, when the target current value is changed (time t0), the differential between the detected current value and the target current value becomes large. Therefore, the duty of the pulse-width-modulated signals also is updated in accordance with this differential to control the detected current value at the target current value. However, when the time constant (CR time constant) of the lag circuit is large, the detected current value is such that response lag occurs with respect to change in the controlled current actually flowing to the inductive load.

Because of this, even when the controlled current reaches the target current value, the differential between the detected current value and the target current value does not reach zero, the pulse-width-modulated signals continue to be updated, the controlled current repeatedly overshoots or undershoots the target current value, and additional time is required for the controlled current to stabilize at the target current value.

For this reason, the above-described apparatus cannot be utilized where responsiveness and control precision are demanded when updating the target current value, such as in a solenoid used in changing gears in an automatic transmission.

Eliminating the lag circuit or reducing the time constant (CR time constant) thereof may increase responsiveness, but as shown in FIG. 30A, although the time until the controlled current stabilizes near the target current value is shortened, the detected current value changes in accordance with current pulsing produced duty drive of the of the switching element. Because of this, the duty of the pulse-width-modulated signals fluctuates as well. Even though the target current value is fixed, it becomes impossible to maintain the controlled current at a fixed value.

Additionally, for example in an apparatus according to the prior art shown in FIG. 29, when the cycle of pulse-width-modulated signals generated by output circuit 56 matches the processing cycle of the sub CPU 54, the sub CPU 54 must operate at high speed, and the processing load of the sub CPU 54 becomes large. Because of this, the sub CPU 54 and the output circuit 56 operate asynchronously. In such a case, it is preferable to make the processing cycle of the sub CPU 54 longer than the cycle of the output circuit 56.

However, even when the target current value is fixed and the controlled current is substantially stabilized at the target current, for example as shown in FIG. 30B, in actuality the detected current value acquired at analog-to-digital conversion timing tAD in accordance with the operation of the sub CPU 54 fluctuates due to the pulsing of the current detection signals after smoothing. Also, the duty of the pulse-width-modulated signals can be set in correspondence with the target current value.

In Japanese Patent Application Laid-open No. Hei. 5-222993, for example, an apparatus is disclosed which does not smooth current detection signals utilizing a lag circuit as in the above-described prior art. Rather, the disclosed apparatus acquires current detection signals twice, immediately after the switching element switched on and off by the pulse-width-modulated signals has been switched on, and immediately before this switching element is switched off. The apparatus determines the detected, or mean, current value from these two current values. According to this proposed apparatus, the detected current value utilized in control can be determined and can alleviate delay in the feedback system, without being affected by the time constant of a lag circuit, as in an apparatus according to the prior art which smoothes current detection signals utilizing a lag circuit.

In this proposed apparatus, the timing of the rising edge and the falling edge of the pulse-width-modulated signals changing due to control must be detected accurately, and the current detection signals must undergo analog-to-digital conversion. Consequently, a timing circuit is necessary to control the timing at which analog-to-digital conversion is performed in accordance with the rising edge and falling edge of the pulse-width-modulated signals, and the apparatus becomes complex in structure.

In the above-described current controller, the control delay for the current is produced not merely by delay in the feedback system to detect the current to the inductive load, but also by operation delay of the drive system (i.e., the pulse-width-modulated signal output circuit 56) generating the pulse-width-modulated signals in accordance with the duty calculated in accordance with the current differential.

That is to say, a pulse-width-modulated signal output circuit according to the prior art is ordinarily provided with a counter to repeatedly clock one cycle of pulse-width-modulated signals, and a register to store data expressing time for which the switching element is to be switched on or off during one pulse-width-modulated signal cycle. The apparatus generates a pulse-width-modulated signal whose signal level in inverted in correspondence with the duty by a procedure wherein at the start time of one cycle of the pulse-width-modulated signal detected based on the counter value, the pulse-width-modulated signal goes high (or low), and thereafter, the pulse-width-modulated signal is inverted when the counter value reaches the data value stored in the register.

For this reason, in a current controller according to the prior art, time equal to a maximum of one pulse-width-modulated signals cycle is required until the duty computed in correspondence with the differential between the detected current value and the target current value is reflected in the driving of the switching element, and improvement in control responsiveness is limited.

SUMMARY OF THE PRESENT INVENTION

In light of the foregoing problems, it is an object of the present invention to provide a pulse-width-modulated signal generating apparatus capable of changing the duty of a pulse-width-modulated signal with a high degree of responsiveness, without disturbing a pulse-width-modulated signal cycle.

In the present invention, a microcomputer cyclically generates and outputs pulse-width-modulated drive signals based on acquired drive data to establish clock periods which are alternating half-cycle clocked times, and acquires the drive data at each start of the half-cycle clocked times.

A switch connected between the microcomputer and the target load switchably connects the target load to a power source based on the drive data to selectively drive the target load. A feedback loop between the target load and the microcomputer provides actual target load drive data to the microcomputer. The microcomputer then adjusts the drive signals at a rate of not more than two times per cycle based on the actual drive data to converge the actual drive data to a target load drive value.

It is also another object of the present invention to provide an apparatus that prevents a drop in control responsiveness in a current controller due to signal response delay produced by a detection-signal feedback or drive system.

According to another embodiment of the present invention, a signal-input apparatus for conditioning analog signals for control use includes an analog-to-digital converter for converting input signals to digital values at a conversion cycle shorter than a cycle of the input signals. A data storage device sequentially stores the digital values obtained from the analog-to-digital converter, and a processor calculates a mean value to fetch the digital values for a cycle time m (where m is an integer) of the input signals from the data storage device, and computes an arithmetic mean of the fetched digital values for target control purposes.

In the above embodiment, pulse-width-modulated signal duty can be controlled at both the rise and the fall timings of the pulse-width-modulated signals. Therefore, the delay time after updating the pulse-width-modulated data until the pulse-width-modulated signals correspond to the duty after the updating becomes a maximum of the time of one-half of the pulse-width-modulated signal cycle, thereby improving control responsiveness.

BRIEF DESCRIPTION OF THE DRAWINGS

FIG. 2 is an explanatory diagram for a RAM for pulse-width-modulated data-transfer use and pulse-width-modulated data stored therein;

FIG. 3 is a flow diagram showing solenoid control processing executed by a CPU;

FIGS. 20A–20C are explanatory diagrams depicting the structure of data respectively stored in a RAM for pulse-width-modulated data-transfer use, a RAM for analog-to-digital data-transfer use, and a RAM within an analog-to-digital converter;

DETAILED DESCRIPTION OF THE PRESENT INVENTION

First Embodiment

Figure 1:
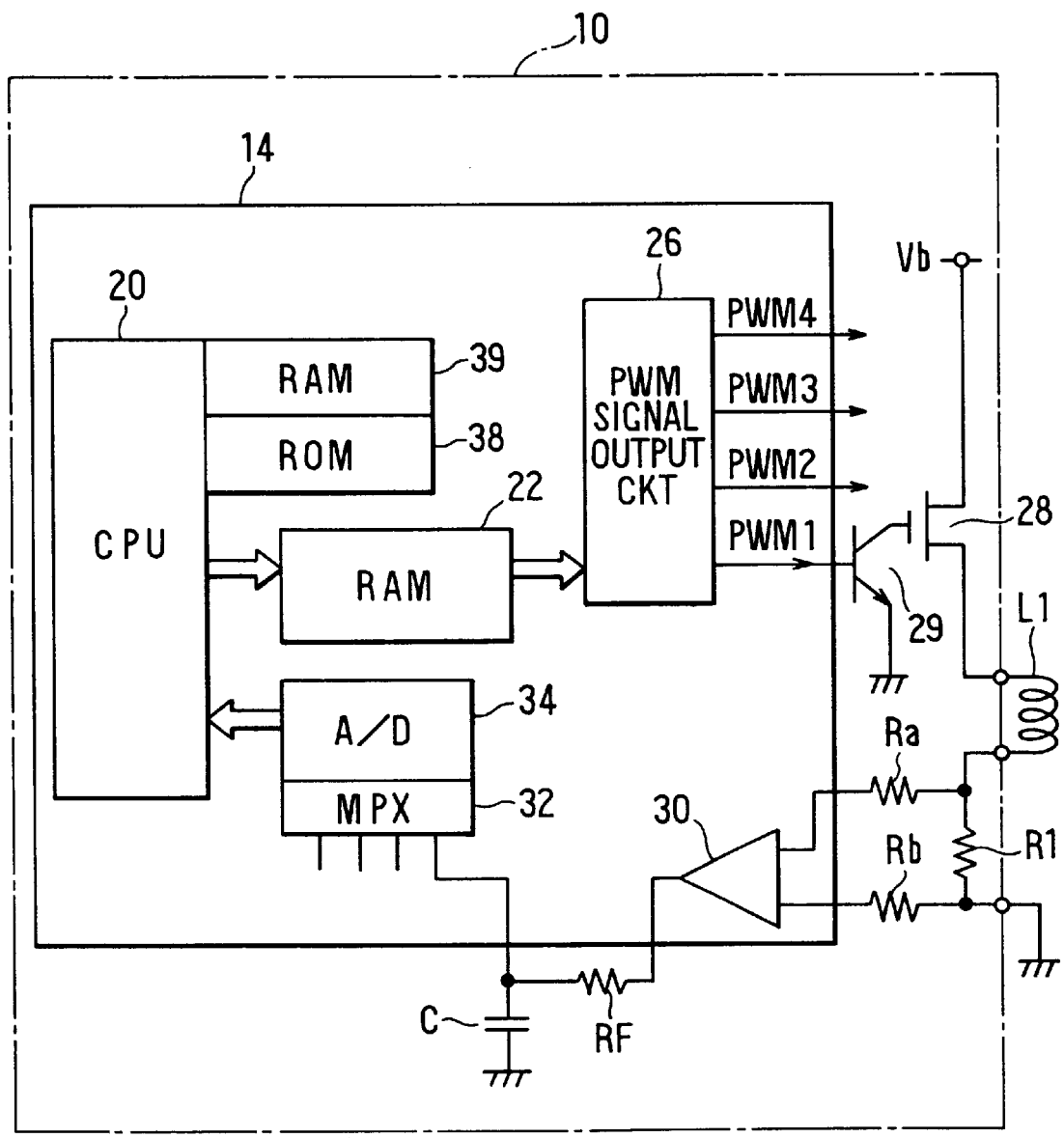
FIG. 1 is a block diagram depicting the structure of a conductivity controller according to a first embodiment of the present invention.

FIG. 1 is a block diagram depicting the structure of a conductivity controller (hereinafter termed simply "controller") 10 according to a first embodiment of the present invention for controlling linear solenoids in a vehicle-mounted electromagnetic-type solenoid or actuator.

The controller 10 according to the first embodiment is an apparatus for individually controlling conduction of a plurality (in the embodiment, four) of linear solenoids L1–L4 (FIG. 1 shows only L1) of a vehicle internal combustion engine. The controller 10 includes a microprocessor for linear-solenoid control 14 for calculating a target current for the solenoids L1–L4 based on signals from various vehicle-mounted sensors (not illustrated), together with performing current feedback control of the respective linear solenoids L1–L4 according to the target current.

The microprocessor 14 includes a CPU 20 for performing processing related to control of the several linear solenoids L1–L4, calculating a duty for duty-driving the respective linear solenoids L1–L4 with pulse-width-modulated signals, and storing data based on the calculated result in a RAM 22 as pulse-width-modulated data. The microprocessor 14 also includes a signal output circuit 26 for respectively acquiring the pulse-width-modulated data corresponding to the several linear solenoids L1–L4 from the RAM 22 and respectively generating and output pulse-width-modulated signals PWM1, PWM2, PWM3, and PWM4 for duty-driving the several linear solenoids L1–L4.

Meanwhile, the linear solenoid L1, which is the current control target, is disposed in a conduction path from a power-source line (power-source voltage Vb) connected to a battery. A FET 28 is disposed in the conduction path on the power-source line side of the linear solenoid L1 and functions as a high-side switch. Additionally, a connector of an NPN transistor 29 whose emitter is provided on the ground line is connected to the gate of the FET 28.

The NPN transistor 29 is for switching on the FET 28 by grounding the gate of the FET 28 via the ground line. The pulse-width-modulated signal PWM1 is input to the base of the NPN transistor 29 from the signal output circuit 26. As a result, the NPN transistor 29 and the FET 28 as a conducting unit are switched on when the pulse-width-modulated signal PWM1 goes high, creating continuity of the conduction path from the battery to the linear solenoid L1. Conversely, when the pulse-width-modulated signal PWM1 goes low, the NPN transistor 29 and the FET 28 are switched off and the conduction path of the linear solenoid L1 is interrupted.

Switching elements similar to that of the linear solenoid L1 are provided for the other three linear solenoids L2 through L4 (not illustrated) as well, switching the respective switching elements on and off according to the pulse-width-modulated signals PWM2–PWM4 output from the signal output circuit 26 thereby enabling duty control of the current to the respective linear solenoids L2–L4.

A resistor R1 for current-detecting use is disposed in the conduction path on the ground-line side of the respective linear solenoids L1–L4 to enable detection of the current to the respective linear solenoids L1–L4 from the two end voltages thereof. The end voltages of the resistor R1 are input through resistors Ra and Rb to a differential amplifier 30. After differential amplification by the differential amplifier 30 followed by smoothing by a lag circuit formed by a resistor Rf and a capacitor C, the voltages are selectively input through a multiplexer 32 for signal-selecting use to an A/D converter 34.

The analog-to-digital converter 34 sequentially acquires, through the multiplexer 32 and at a fixed analog-to-digital conversion cycle, a current detection signal (voltage) indicating the current to the respective linear solenoids L0 through L3. The analog-to-digital converter 34 then converts the current detection signal to a digital value and outputs the digital value to the CPU 20. Thereupon, the CPU 20 respectively detects the currents (hereinafter termed "solenoid currents") actually flowing to the several linear solenoids L1–L4, and calculates the duty of the pulse-width-modulated signals PWM1–PWM4 so that the solenoid currents become the target current value of the solenoids L1–L4, pulse-width-modulated data for energizing the several linear solenoids L1–L4 is established based on the calculated duty, and is stored in the RAM 22.

A ROM 38 for storing a program for processing-execution use and various data items, and a RAM 39 for temporarily storing data for control use during processing execution, are connected to the CPU 20. The CPU 20 and the signal output circuit 26 are asynchronously actuated upon receiving a clock signal generated by respectively-provided dedicated oscillators (not illustrated).

The configuration of the RAM 22 and pulse-width-modulated data stored therein will now be described.

As shown in FIG. 2, the RAM 22 is provided with memory regions for storing pulse-width-modulated data for each pulse-width-modulated signal PWM1–PWM4 corresponding to the several linear solenoids L1–L4.

The pulse-width-modulated data stored in these several memory regions is of two types: cycle data CYCL(1)–CYCL(4) indicating one cycle of the respective pulse-width-modulated signals PWM1–PWM4, and "on" time data TON(1)–TON(4) indicating the time for switching the switching elements disposed in the conduction paths of the respective linear solenoids L1–L4.

Additionally, the pulse-width-modulated data stored in the RAM 22 is updated each time the CPU 21 calculates the duty for driving the linear solenoids L1–L4. Accordingly, the signal output circuit 26 generates the pulse-width-modulated signals PWM1–PWM4 for driving the linear solenoids L1–L4 by acquiring pulse-width-modulated data from the RAM 22.

As will be described later, the signal output circuit 26 is provided with a counter for clocking use CNT wherein a count value changes by one at every instance of a fixed time (in the embodiment, 1 $\mu$sec), and the above-described cycle data CYCL(1)–CYCL(4) is a count value equal to the predetermined cycle time of the pulse-width-modulated signals PWM1–PWM4 divided by the foregoing fixed time (1 $\mu$sec). Similarly, the above-described "on" time data TON(1)–TON(4) also is a count value equal to the time for which the relevant signal is to be held at high level per cycle of the several pulse-width-modulated signals PWM1–PWM4, divided by the fixed time (1 $\mu$sec).

Still referring to FIG. 2, the numbers in parentheses indicate which of the several linear solenoids L1–L4 and the several pulse-width-modulated signals PWM1–PWM4 the data corresponds to. For example, "on" time data TON(1) is the "on" time data of the pulse-width-modulated signal PWM1 for duty-driving the linear solenoid L1. Additionally, according to the embodiment, the memory regions among the several memory regions of the RAM 22 in which the "on" time data TON(1)–TON(4) is stored correspond to the data-storing unit.

Next, the control processing respectively executed by the CPU 20 and the signal output circuit 26 according to the embodiment will be described with reference to a flow diagram and a timing diagram. In the description hereinbelow, "m" is the channel number (1, 2, 3, or 4) of the pulse-width-modulated signals PWM1–PWM4. For example, the "on" time data TON(m) is the "on" time data of the pulse-width-modulated signal PWMm of the mth channel (channel m) corresponding to the mth linear solenoid Lm, counting from 1.

FIG. 3 is a flow diagram depicting solenoid-control processing executed for example every 2 msec in the CPU 20.

The solenoid-control processing is executed respectively for the four linear solenoids L1–L4, but herein will be described as being executed for the mth linear solenoid Lm.

As shown in FIG. 3, first, at Step (hereinafter indicated simply "S") 110, solenoid current I(m) flowing to the mth linear solenoid Lm as the control target is detected based on a digital value of the analog-to-digital converter 34. At S120, the target current VR(m) to be allowed to flow to the linear solenoid Lm is established in accordance with an operating state of the internal combustion engine based on the signals from the sensors Also, the duty D(m) of the pulse-width-modulated signal PWMm of the mth channel corresponding to the linear solenoid Lm is calculated so that the solenoid current I(m) detected at S110 becomes the foregoing established target current VR(m).

Next, at S130, the "on" time data TON(m) of the pulse-width-modulated signal PWMm is calculated from the foregoing calculated duty D(m) and the cycle data CYCL(m) of the predetermined pulse-width-modulated signal PWMm according to the equation hereinafter.

$$TON(m) = (D(m)/100) \times CYCL(m)$$

In the above equation, the duty D(m) is divided by "100" because the duty D(m) is a percentage (%) unit. Additionally, according to the embodiment, the respective cycle data CYCL(1)–CYCL(4) of the four pulse-width-modulated signals PWM1–PWM4 are all set to the same value.

At S140, the "on" time data TON(m) calculated as was described above, and the cycle data CYCL(m) are respectively stored in the address region (the memory region for storing the pulse-width-modulated data for the pulse-width-modulated signal PWMm of channel m in FIG. 2) of the corresponding channel m in the RAM 22, and thereafter the processing ends.

Figure 4:
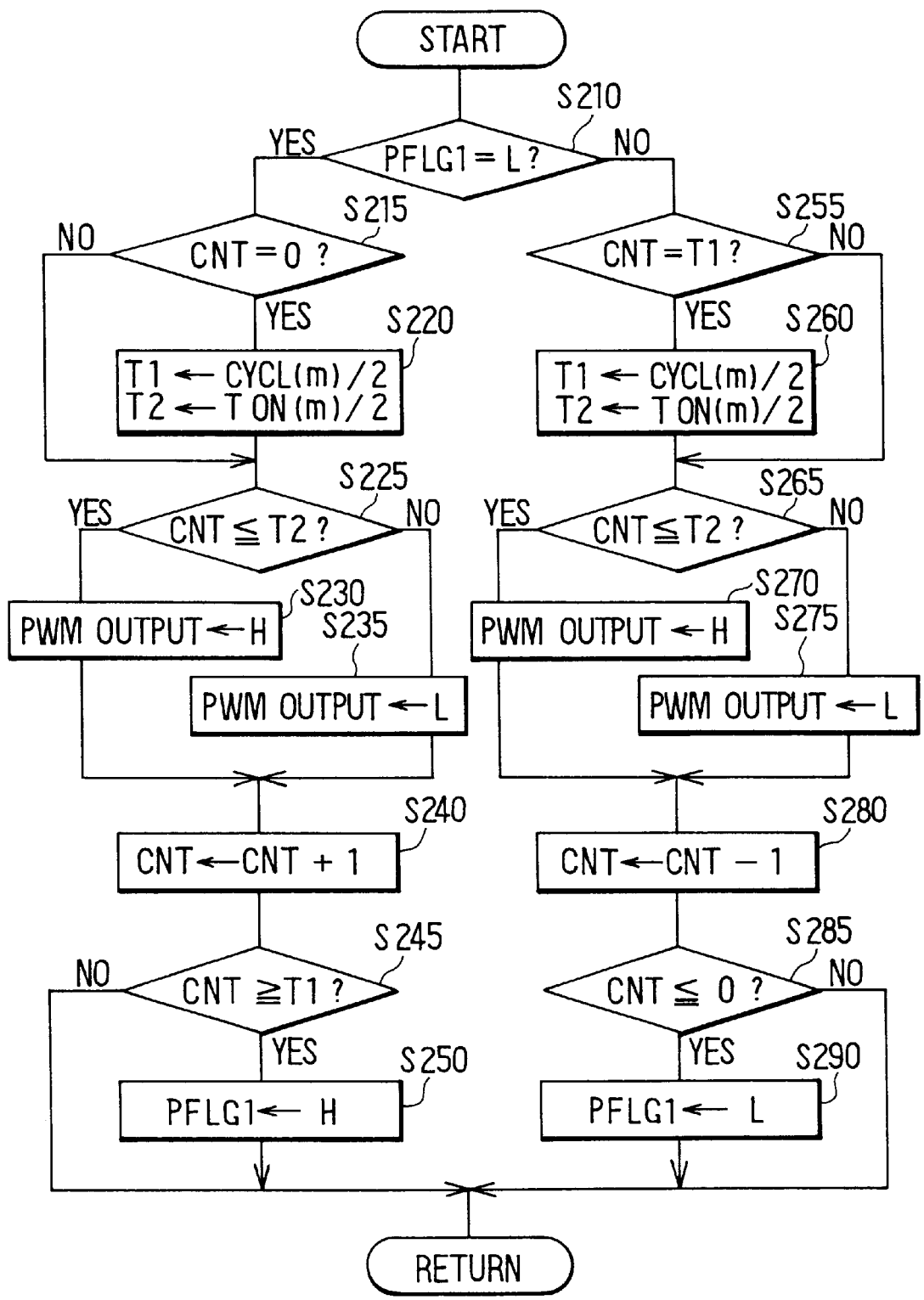
FIG. 4 is a flow diagram showing pulse-width-modulated signal-output processing executed by a pulse-width-modulated signal output circuit according to the first embodiment.
Figure 5:
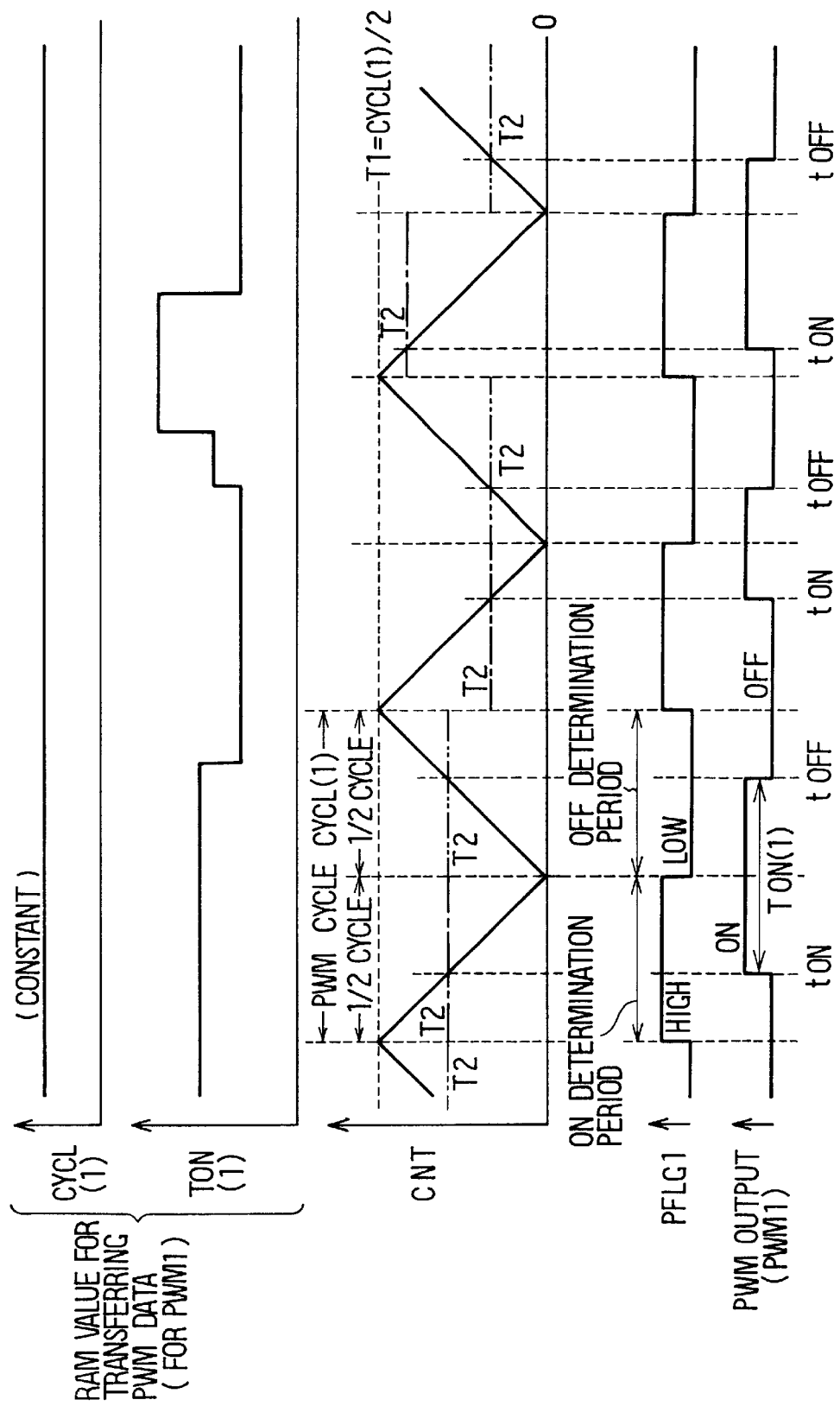
FIG. 5 is a timing diagram showing operation of the pulse-width-modulated signal output circuit according to the first embodiment.

Next, FIG. 4 is a flow diagram showing pulse-width-modulated signal-output processing executed in the signal output circuit 26, and FIG. 5 is a timing diagram for describing operation thereof. The pulse-width-modulated signal-output processing is achieved by a pulse-width-modulated signal-output processing portion, which is logic circuitry disposed in each of the several linear solenoids L1–L4 within the signal output circuit 26.

As shown in FIG. 4, at S210 it is determined whether a determination-period discrimination flag PFLG1 has been reset to low. The determination-period discrimination flag PFLG1 indicates whether a determination period for inverting the pulse-width-modulated signal PWMm corresponding to the linear solenoid Lm of the control target from low to high, or from high to low is presently obtained.

When determined at S210 that the determination-period discrimination flag PFLG1 has been reset to low, the "off" determination period is considered to be presently obtained, and execution proceeds to S215, where it is determined whether the value of the counter CNT is "0." When the value of the counter CNT is not "0," execution proceeds directly to S225. When the value of the counter CNT is "0," the time at which clocking of the half-cycle time of the pulse-width-modulated signal PWMm by the counter CNT has begun is considered to be obtained, and execution proceeds to S220. Accordingly, the cycle data CYCL(m) and the "on" time data TON(m) of the signal PWMm are acquired from the RAM 22. Next, a value equal to one-half of the acquired cycle data CYCL(m) is established as half-cycle data T1, and together with this, a value equal to one-half of the "on" time data TON(m) is established as a threshold value T2 for pulse-width-modulated signal-inverting use. Thereafter, execution proceeds to S225.

Next, at S225, it is determined whether the value of the counter CNT is the threshold value T2 or less. When the value of the counter CNT is the threshold value T2 or less, at S230 the output level of the pulse-width-modulated signal PWMm is set high, and thereafter execution proceeds to S240 and the value of the counter CNT is incremented by one.

Additionally, when the value of the counter CNT is determined at S225 to be greater than the threshold value T2, clock time according to the counter CNT from the point at which the value of the counter CNT was determined in the foregoing S215 to be "0" is considered to have reached the time of one-half (½) of the "on" time of the pulse-width-modulated signal PWMm. Execution then proceeds to S235, and the output level of the pulse-width-modulated signal PWMm is set low. Thereafter, execution proceeds to S240, and the value of the counter CNT is incremented by one.

Accordingly, when the value of the counter CNT is incremented by one at S240, at S245 it is determined whether the value of the counter CNT greater than or equal to data T1 established at S220. Accordingly, when the value of the counter CNT is less than the value data T1, execution ends without further processing. However, when the value of the counter CNT greater than or equal to the value of the half-cycle data T1, execution proceeds to S250, the determination-period discrimination flag PFLG1 is set high, and the processing ends.

Meanwhile, when it is determined at S210 that the determination-period discrimination flag PFLG1 has not been reset (where the determination-period discrimination flag PFLG1 has been set high), the "on" determination period is considered to be presently obtained and execution proceeds to S255, where it is determined whether the value of the counter CNT coincides with the value of the half-cycle time T1. When it is determined that the value of the counter CNT does not coincide with the value of the half-cycle time T1, execution proceeds directly to S265. However, when it is determined that the value of the counter CNT coincides with the value of the half-cycle time T1, the time at which clocking of the half-cycle time of the pulse-width-modulated signal PWMm by the counter CNT has newly started is considered to be obtained, and execution proceeds to S260. Accordingly, as with the procedure at S220, the cycle data CYCL(m) and the "on" time data TON(m) of the pulse-width-modulated signal PWMm are first acquired from the RAM 22. Next, a value equal to one-half of the data CYCL(m) is established as the half-cycle data T1, and a value equal to one-half of the "on" time data TON(m) is established as the threshold value T2 for pulse-width-modulated signal-inverting use. Thereafter, execution proceeds to S265.

At S265, it is determined whether the value of the counter CNT is less than or equal to the threshold value T2. When the value of the counter CNT is greater than the threshold value T2, at S275 the output level of the pulse-width-modulated signal PWMm is set low, and thereafter execution proceeds to S280, and the value of the counter CNT is decremented by one.

Additionally, when the value of the counter CNT is determined at S265 to be less than or equal to the threshold value T2, the clock according to the counter CNT from the point at which the value of the counter CNT was determined at S255 to coincide with the half-cycle data T1 is considered to have reached the time of one-half of the "off" time of the signal PWMm. Execution then proceeds to S270, and the output level of the pulse-width-modulated signal PWMm is set high. Thereafter, execution proceeds to S280, and the value of the counter CNT is decremented by one.

When the value of the counter CNT is decremented by one at S280, at S285 it is determined whether the value of the counter CNT is less than or equal to "0". Accordingly, when the value of the counter CNT is not less than or equal to "0", execution ends without further processing. However, when the value of the counter CNT is "0" or less, execution proceeds to S290, the determination-period discrimination flag PFLG1 is set low, and thereafter the processing ends.

In the pulse-width-modulated signal-output processing, the counter CNT is operated as an up/down counter and repeatedly clocks the half-cycle time of the signal PWMm to be output by repeating processing wherein a value of one-half of the cycle data CYCL(m) of the pulse-width-modulated signal. PWMm is taken to be the half-cycle data T1, as shown in the "CNT" row of FIG. 5. The value of the counter CNT is also increased by one at every fixed time interval (1 μsec) from "0" up to the value of the half-cycle data T1 (S240 and S245), and when the value of the counter CNT becomes the value of the half-cycle data T1, the value is reduced by one at every fixed time interval (1 μsec) from the value of the half-cycle data T1 to "0" (S280 and S285). Further, when the value of the counter CNT reaches "0," the value is again increased by one at every fixed time interval from "0" to the value of the half-cycle data T1 (S240 and S245).

Additionally, when the count value thereof becomes the value of the half-cycle data T1 (S245: YES), the determination-period discrimination flag PFLG1 is set high (S250), and the next count-down period of the counter CNT is set as the "on" determination period to invert the pulse-width-modulated signal PWMm from low to high and switch on the switching element. Alternatively, when due to the counting down of the counter CNT (S280) the count value thereof reaches "0" (S285: YES), the determination-period discrimination flag PFLG1 is reset to low (S290), and the next count-up period of the counter CNT is set as the "on" determination period to invert the signal PWMm from high to low and to switch off the switching element.

As shown in FIG. 5, in an "on" determination period (S210: NO), it is determined, at a time tON when the counted-down value of the counter CNT becomes the threshold value T2 set to the value of one-half of the "on" time data TON(m) of the signal PWMm, that a time of one-half of the "off" time of the signal PWMm has elapsed since the start of the half-cycle time clocked by the counter CNT. The pulse-width-modulated signal PWMm is then inverted from low to high (S270). Conversely, in an "off" determination period (S210: YES), it is determined, at a time tOFF when the counted-up value of the counter CNT becomes the threshold value T2 set to the value of one-half of the "on" time data TON(m) of the pulse-width-modulated signal PWMm, that a time of one-half of the "off" time of the pulse-width-modulated signal PWMm has elapsed since the clocking start of half-cycle time by the counter CNT, and the pulse-width-modulated signal PWM is inverted from high to low (S235).

Additionally, the threshold value T2 and the half-cycle data T1 are such that at every iteration of the timing at which clocking of the half-cycle time of the pulse-width-modulated signal PWMm ends and clocking of the next half-cycle time starts anew (S215: YES and S255: YES), the pulse-width-modulated data in the RAM 22 is acquired and the threshold value T2 and the half-cycle data T1 are updated (S220 and S260). In the "CNT" row in FIG. 5, the single-dotted lines indicate the threshold value T2 established at S260 in FIG. 4, and the double-dotted lines indicate the threshold value T2 established at S220 in FIG. 4.

According to the signal output circuit 26 of the first embodiment, a delay time after the "on" time data TOM(m) in the RAM 22 has been updated by the CPU 20 until the most recent "on" time data TON(m) is reflected in the duty of the pulse-width-modulated signal PWMm becomes, even at a maximum, the half-cycle time of the pulse-width-modulated signal. Accordingly, current control responsiveness can be greatly improved compared with an apparatus according to the prior art wherein the maximum value of the delay time is the time of one pulse-width-modulated signal cycle.

With the signal output circuit 26 according to the present embodiment, duty can be controlled at the timing of both the rising edge and the falling edge of the pulse-width-modulated signal PWMm. Therefore, the delay time after the updating of the "on" time data TON(m) until the pulse-width-modulated signal PWMm corresponds to duty after updating thereof is, even at a maximum, the half-cycle time of the pulse-width-modulated signal PWMm, and control responsiveness is improved.

Moreover, with the signal output circuit 26 according to the present embodiment, the "on" time data TON(m) which determines the timing of the rising edge and the falling edge of the signal PWMm is acquired when clocking of the half-cycle time of the signal PWMm starts anew. Therefore, even when the update cycle of the "on" time data TON(m) by the CPU 20 is shorter than one pulse-width-modulated signal cycle, the signal level of the pulse-width-modulated signal PWMm never changes more than two times per cycle. Accordingly, duty of the pulse-width-modulated signals can be changed with favorable responsiveness, without disturbing the pulse-width-modulated signal cycle.

Second Embodiment

Figure 6:
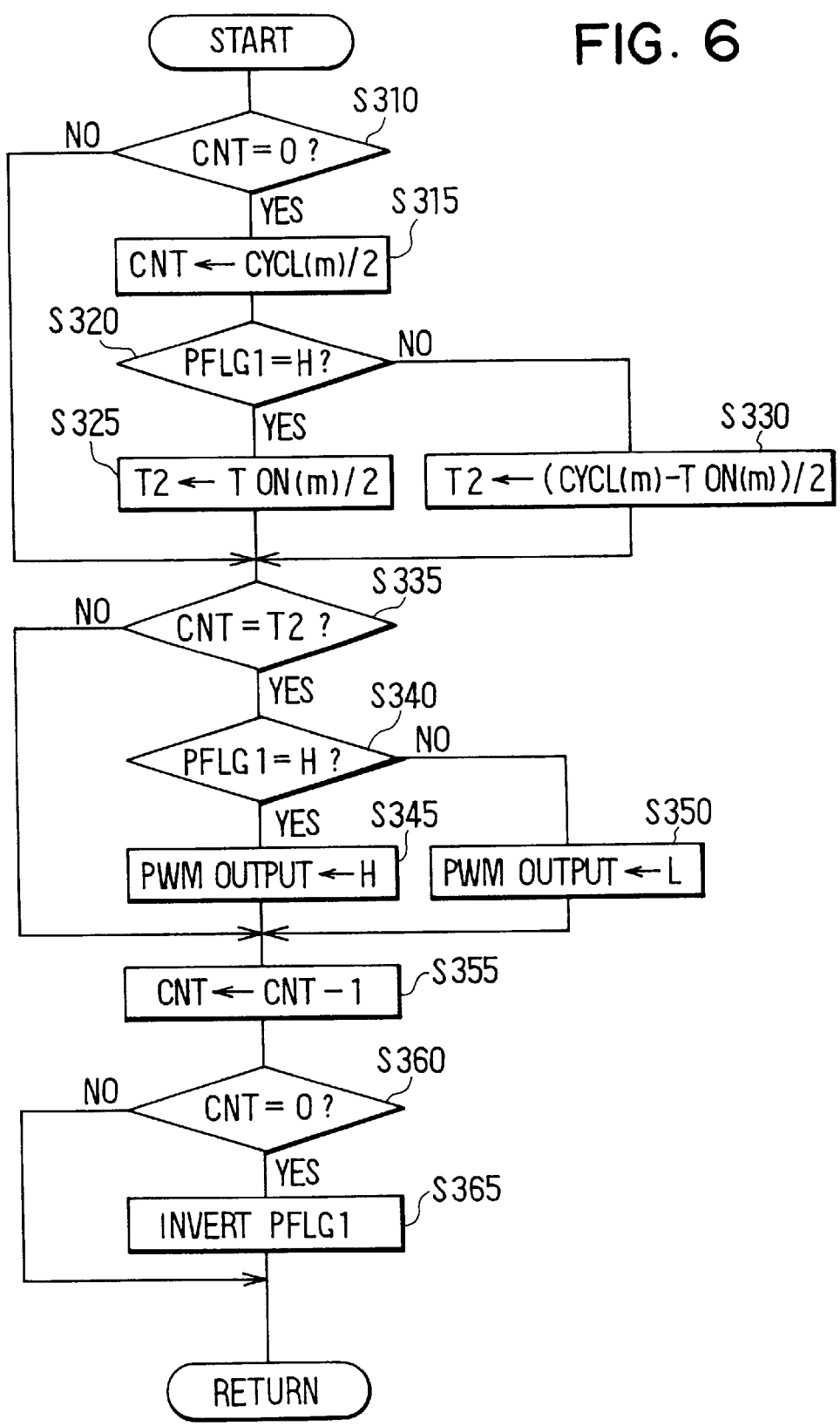
FIG. 6 is a flow diagram showing pulse-width-modulated signal-output processing executed by a pulse-width-modulated signal output circuit according to a second embodiment of the present invention.

A controller 10 according to a second embodiment differs from the controller according to the first embodiment solely in that the pulse-width-modulated signal-output processing executed every 1 μsec with respect to the linear solenoids L1–L4 is executed as shown in FIG. 6. The processing shown in FIG. 6 also is achieved by a pulse-width-modulated signal-output processing portion within the output circuit 26. Operation of the processing portion will be described.

As shown in FIG. 6, in the processing of the second embodiment, at S310 it is determined whether the value of the counter CNT is "0." When the value of the counter CNT is not "0," execution proceeds directly to S335, but when the value of the counter CNT is "0," the time at which clocking of the half-cycle time of the signal PWMm by the counter CNT has started is considered to be obtained, and execution proceeds to S315.

At S315, the cycle data CYCL(m) of the signal PWMm is acquired from the RAM 22, and a value equal to one-half of the acquired cycle data CYCL(m) is set in the counter CNT.

Further, at S320, it is determined whether the determination-period discrimination flag PFLG1 has been set high. The flag PFLG1 indicates whether a determination period for inverting the pulse-width-modulated signal PWMm corresponding to the linear solenoid Lm of the control target from low to high, or whether a determination period for inverting the signal PWMm, is presently obtained.

When it is determined at S320 that the flag PFLG1 has been set, the "on" determination period is considered to be presently obtained, and execution proceeds to S325. The "on" time data TON(m) of the signal PWMm is then acquired from the RAM 22. Next, a value equal to one-half of the "on" time data TON(m) is established as the threshold value T2 for pulse-width-modulated signal-inverting use, and execution proceeds to S335.

When it is determined at S320 that the flag PFLG1 has not been set, the "off" determination period is considered to be presently obtained, and execution proceeds to S330. Accordingly, the "on" time data TON(m) of the signal PWMm is acquired from the RAM 22. Next, a value equal to one-half of the value obtained by subtracting the "on" time data TON(m) from the cycle data CYCL (m) is established as the threshold value T2. Thereafter, execution proceeds to S335.

At S335, it is determined whether the value of the counter CNT coincides with the present threshold value T2. When the value of the counter CNT does not coincide with the threshold value T2, execution proceeds directly to S355 and the value of the counter CNT is decremented by one.

When it is determined at S335 that the value of the counter CNT coincides with the threshold value T2, execution proceeds to S340, and it is determined whether the flag PFLG1 has been set high. Accordingly, when the flag PFLG1 has been set, the "on" determination period is presently obtained, and because the threshold value T2 is equal to one-half of the "on" time data TON(m) established at S325, the clock time according to the counter CNT since the start of the "on" determination period is considered to have reached the time of one-half of the "off" time of the pulse-width-modulated signal PWMm. Execution then proceeds to S345, and the output level of the pulse-width-modulated signal PWMm is set high. Thereafter, execution proceeds to S355, and the value of the counter CNT is decremented by one.

Conversely, when it is determined at S340 that the flag PFLG1 has not been set, the "off" determination period is presently obtained. Because the threshold value T2 is equal to the value established at S330, the clock time from the start of the "off" determination period is considered to have reached the time of one-half of the "on" time of the signal PWMm. Execution then proceeds to S350, and the output level of the pulse-width-modulated signal PWMm is set low. Thereafter, execution proceeds to S355, and the value of the counter CNT is decremented by one.

When the value of the counter CNT is decremented by one at S355, at S360 it is determined whether the value of the counter CNT is "0." When the value of the counter CNT is not "0," execution ends without further processing. However, when the value of the counter CNT is "0," execution proceeds to S365, the set/reset state of the determination-period discrimination flag PFLG1 is inverted, and thereafter processing ends.

Figure 8:
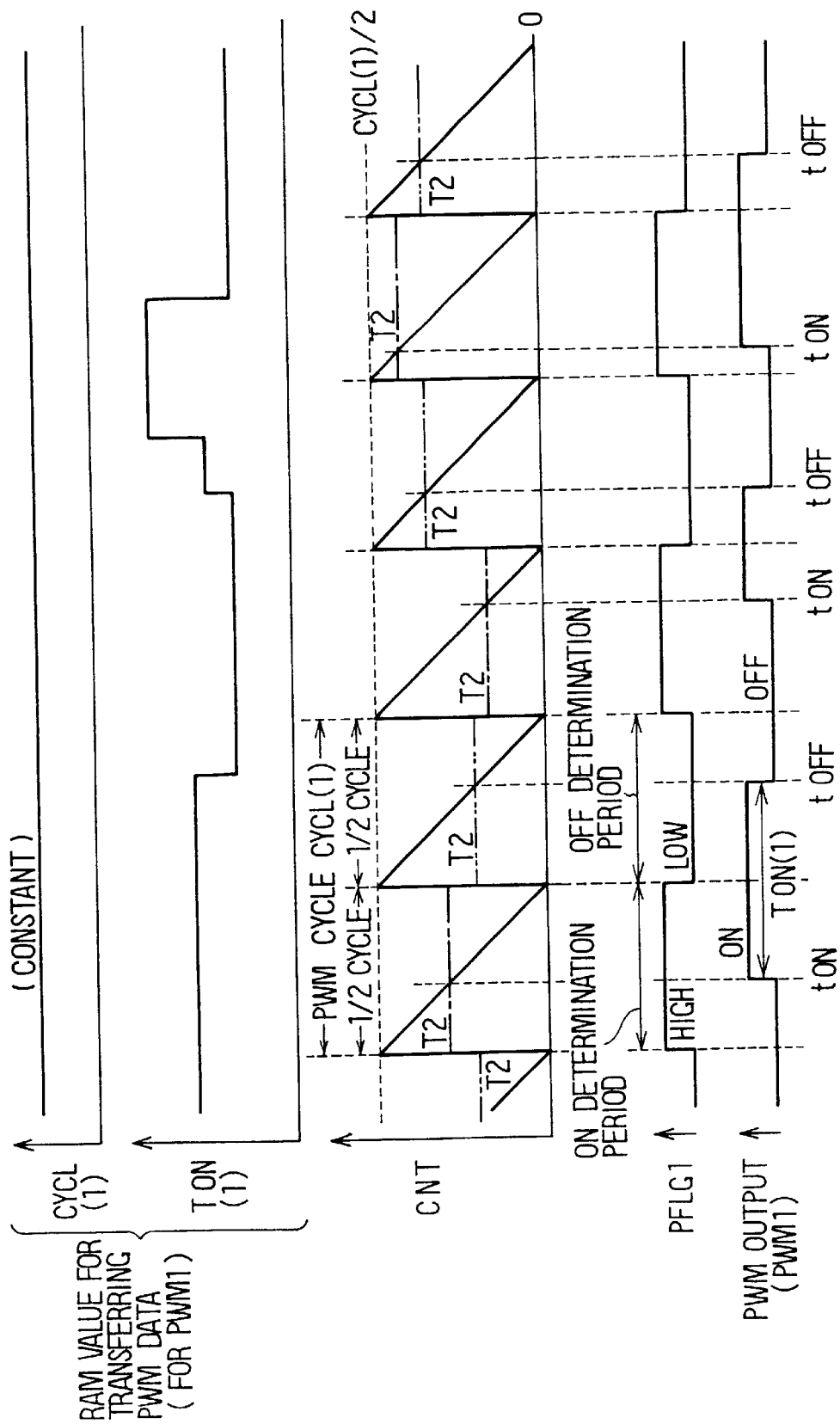
FIG. 8 is a timing diagram showing operation of the pulse-width-modulated signal output circuit according to the second embodiment.

As shown in the timing diagram of FIG. 8, the half-cycle time of the signal PWMm to be output is repeatedly clocked by causing the counter CNT to operate as a down counter. This is realized by writing to the counter CNT a value of one-half of the cycle data CYCL(m) of the signal PWMm to be output (S315), and by reducing the count value thereof by one at every fixed time interval (S355). Further, when the count value reaches "0," a value of one-half of the cycle data CYCL(m) is again written to the counter CNT (S315).

Each time the counter CNT becomes "0" and clocking of the half cycle of the signal PWMm ends (S360: YES), half of one cycle of the signal PWMm is established as the "on" determination period for inverting the signal PWMm from low to high and for switching on the switching element. The remaining half is established as the "off" determination period for inverting the signal PWMm from high to low and switching off the switching element by inverting the determination-period discrimination flag PFLG1 (S365).

As shown in FIG. 8, in an "on" determination period (S320: YES), it is determined, at a time tON when the counted-down value of the counter CNT becomes the threshold value T2 set to one-half of the "on" time data TON(m) of the signal PWMm at S325 (S335: YES and S340: YES), that a time of one-half of the "off" time of the signal PWMm has elapsed since the clocking start of half-cycle time by the counter CNT. Thus, the pulse-width-modulated signal PWMm is inverted from low to high (S345). Conversely, in an "off" determination period (S320: NO), it is determined, at a time tOFF when the counted-down value of the counter CNT becomes the threshold value T2 set to the value of one-half of the value obtained by subtracting the "on" time data TON(m) from the cycle data CYCL(m) of the signal PWMm at S330 (S335: YES and S340: NO), one-half of the "on" time of the signal PWMm has elapsed since the clocking start of the half-cycle time by the counter CNT, and the signal PWMm is inverted from high to low (S350).

Additionally, the threshold value T2 and the value of one-half of the cycle data CYCL(m) written to the counter CNT are such that at every iteration of the timing at which clocking of the half-cycle time of the signal PWMm ends and clocking of the next half-cycle time starts anew according to the counter CNT (S310: YES), the data in the RAM 22 is acquired and the threshold value T2 and the cycle data CYCL(m) are updated (S325, S330, and S315). In the "CNT" row in FIG. 8, the single-dotted lines indicate the threshold value T2 established at S325 in FIG. 6, and the double-dotted lines indicate the threshold value T2 established at S330 in FIG. 6.

For this reason, according to the signal output circuit 26 of the second embodiment as well, the delay time, after the "on" time data TOM(m) in the RAM 22 has been updated by the CPU 20 until the most recent "on" time data TON(m) is reflected in the duty of the signal PWMm, becomes, even at a maximum, the half-cycle time of the pulse-width-modulated signal. Accordingly, linear solenoid current control responsiveness can be greatly improved compared with an apparatus according to the prior art wherein the maximum value of the delay time is the time of one pulse-width-modulated signal cycle. That is to say, duty can be controlled at the timing of both the rising edge and the falling edge of the signal PWMm, and so the delay time after the updating of the "on" time data TON(m) until the signal PWMm corresponds to duty after updating thereof is, even at a maximum, the half-cycle time of the pulse-width-modulated signal PWMm. As a result, control responsiveness is improved.

Moreover, with the signal output circuit 26 according to the second embodiment as well, the "on" time data TON(m) which determines the timing of the rising edge and the falling edge of the pulse-width-modulated signal PWMm is acquired when the clocking of the half-cycle time of the signal PWMm is started. Therefore, even when the update cycle of the "on" time data TON(m) by the CPU 20 is shorter than one pulse-width-modulated signal cycle, the signal level of the signal PWMm never changes more than twice within one cycle. Accordingly, the duty of the pulse-width-modulated signals can be caused to change with favorable responsiveness, without disturbing the pulse-width-modulated signal cycle. As a result, both responsiveness and controllability can be achieved when controlling current flow to the linear solenoid Lm.

According to the signal output circuit 26 of the second embodiment, the half-cycle time of the signal PWMm is repeatedly clocked by the down counter wherein the count value makes two circuits in the time of a single cycle of the signal PWMm. Therefore, the processing and circuit structure thereof can be simplified compared to the signal output circuit 26 according to the first embodiment utilizing an up/down counter.

Figure 7:
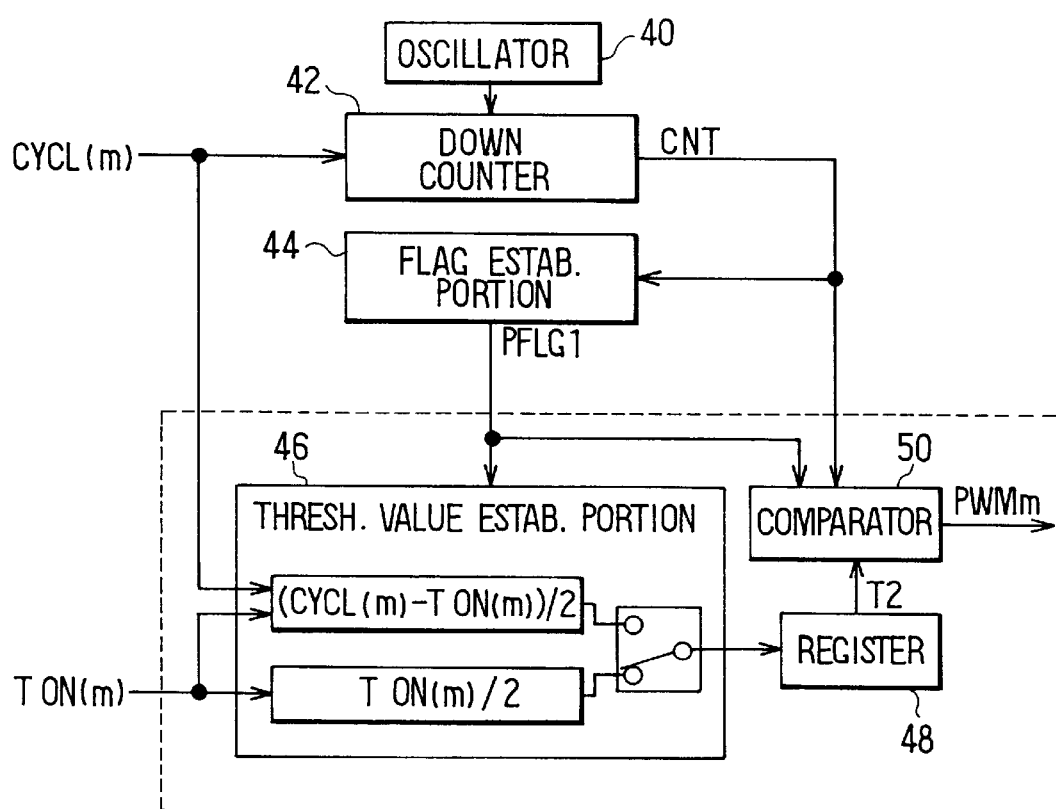
FIG. 7 is a block diagram of the structure of a pulse-width-modulated signal-output processing portion for the pulse-width-modulated signal-output processing of FIG. 6.

In the signal output circuit 26 according to the second embodiment, the pulse-width-modulated signal-output processing portion that performs the processing of FIG. 6 can be structured as shown in FIG. 7.

That is to say, the pulse-width-modulated signal-output processing portion may include an oscillator 40 to output a clock signal having a cycle of 1 μsec, and a down counter 42 to count down by one to "0" in synchronization with the clock signal from the oscillator 40, and, when the count value (CNT) reaches "0," to acquire the cycle data CYCL(m) of the pulse-width-modulated signal PWMm from the RAM 22 and set a value of one-half of the cycle data CYCL(m) as the count value (CNT).

The processing portion may also include a determination-period discrimination-flag establishing portion 44 to invert the determination-period discrimination flag PFLG1 from high to low or from low to high each time the count value (CNT) of the down counter 42 becomes "0".

In addition, the processing portion may include a threshold-value establishing portion 46 to receive the flag PFLG1 from the flag establishing portion. 44, and together therewith, to acquire the "on" time data TON(m) of the signal PWMm from the RAM 22 and store the value of one-half of the acquired "on" time data TON(m) in a register 48 as the threshold value T2 for signal-inverting use at the start timing of the "on" determination period wherein the flag PFLG1 is inverted from low to high. Or, the establishing portion 46 may acquire the cycle data CYCL(m) and the "on" time data TON(m) of the signal PWMm from the RAM 22 and store the value of one-half of the value obtained by subtracting the "on" time data TON(m) from the acquired cycle data CYCL(m) in the register 48 as the threshold value T2 for signal-inverting use at the start timing of the "on" determination period wherein the determination-period discrimination flag PFLG1 is inverted from high to low.

Finally, the processing portion may include a comparator 50 to be supplied with the flag PFLG1 from the flag establishing portion 44, and to compare the count value (CNT) of the down counter 42 and the threshold value T2 in the register. When the count value (CNT) coincides with the threshold value T2, the comparator would then establish the output level of the signal PWMm at the level of the flag PFLG1 at that time.

Accordingly, operation similar to the apparatus executing the pulse-width-modulated signal-output processing of FIG. 6 every 1 μsec is performed by the pulse-width-modulated signal-output processing portion, and the effects of the above-described second embodiment are obtained.

Third Embodiment

Figure 9:
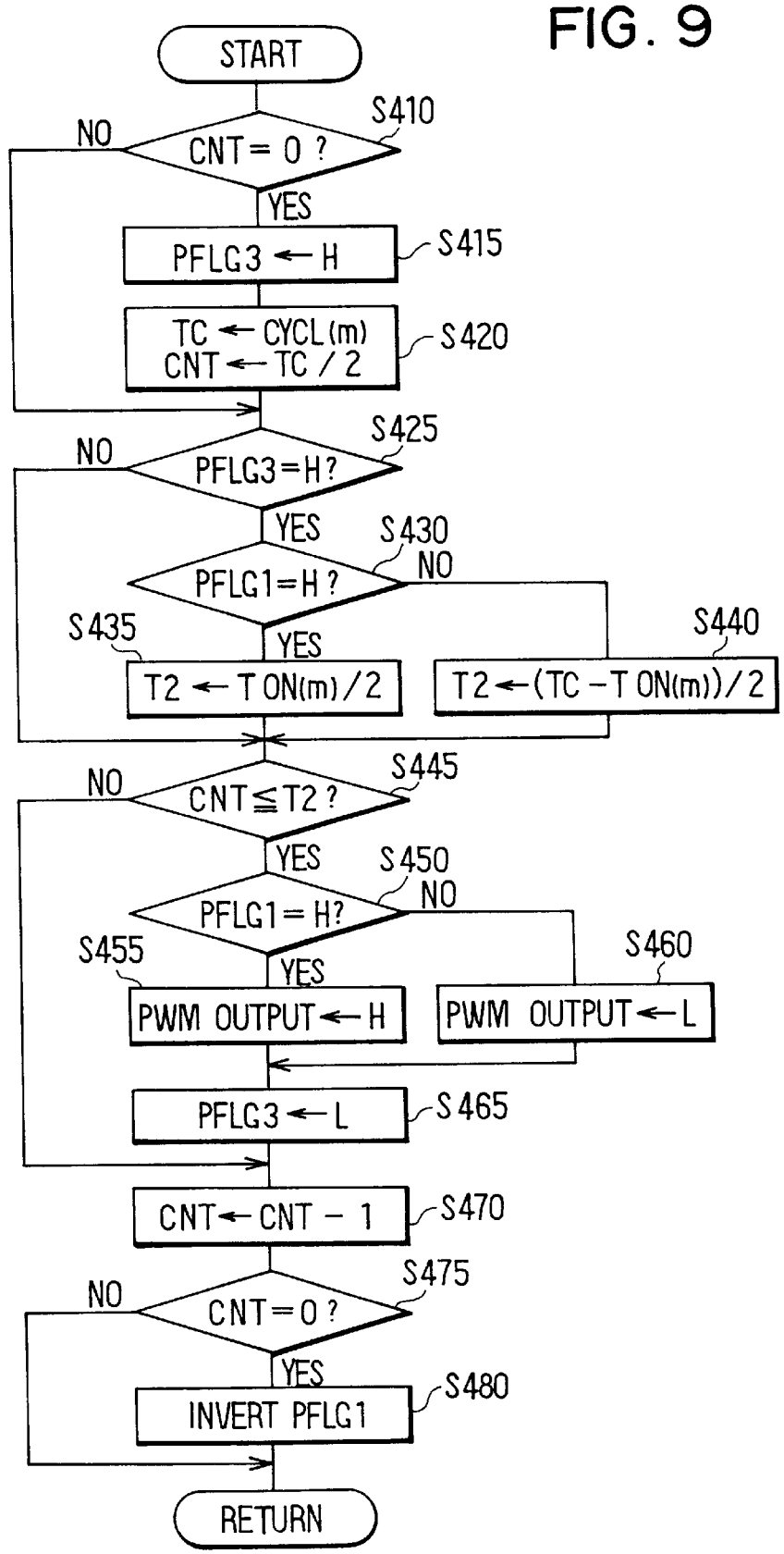
FIG. 9 is a flow diagram showing pulse-width-modulated signal-output processing executed by a pulse-width-modulated signal output circuit according to a third embodiment of the present invention.

A controller 10 according to a third embodiment of the present invention differs from the above-described controllers of the first and second embodiments solely in that the pulse-width-modulated signal-output processing executed every 1 μsec with respect to the linear solenoids L1–L4 by the signal output circuit 26 is executed as shown in FIG. 9. The processing shown in FIG. 9 also actually is achieved by a processing portion, which is logic circuitry disposed in each of the several linear solenoids L1–L4 within the signal output circuit 26.

As shown in FIG. 9, in the signal-output processing of the third embodiment, at S410 it is determined whether the value of the counter CNT is "0." Accordingly, when the value of the counter CNT is not "0," execution proceeds directly to S425. When the value of the counter CNT is "0," the time at which clocking of the half-cycle time of the signal PWMm by the counter CNT has started is considered to be obtained, and execution proceeds to S415.

At S415, a threshold-update permission flag PFLG3 is set high to indicate permission. At S420, the cycle data CYCL (m) of the signal PWMm is acquired from the RAM 22 and is set as processing-use cycle data TC, while a value equal to one-half of the cycle data TC is set in the counter CNT.

Next, at S425, it is determined whether the threshold-update permission flag PFLG3 has been set high. When the threshold-update permission flag PFLG3 has not been set high, execution proceeds directly to S455. However, when the threshold-update permission flag PFLG3 has been set high, execution proceeds to S430, and it is determined whether the flag PFLG1 has been set high. The flag PFLG1 indicates whether a determination period for inverting the signal PWMm corresponding to the linear solenoid Lm of the control target from low to high is presently obtained, or whether a determination period for inverting the pulse-width-modulated signal PWMm from high to low is presently obtained.

Accordingly, when the flag PFLG1 has been set, the "on" determination period is presently obtained, execution advances to S435, and the "on" time data TON(m) of the signal PWMm is acquired from the RAM 22. Next, a value equal to one-half of the acquired "on" time data TON(m) is established as the threshold value T2, and thereafter execution proceeds to S455.

Additionally, when it is determined at S430 that the flag PFLG1 has not been set, the "off" determination period is obtained, execution proceeds to S440, and the "on" time data TON(m) of the signal PWMm is acquired from the RAM 22. Next, a value equal to one-half of the value obtained by subtracting the above-described acquired "on" time data TON(m) from the processing-use cycle data TC is established as the threshold value T2, and thereafter execution proceeds to S455.

At S455 it is determined whether the value of the counter CNT is less than or equal to the present threshold value T2. When the value of the counter CNT is not less than or equal to the threshold value T2, execution proceeds directly to S470, and the value of the counter CNT is decremented by one.

Meanwhile, when it is determined at S445 that the value of the counter CNT is less than or equal to the threshold value T2, execution proceeds to S450, and it is determined whether the flag PFLG1 has been set high. Accordingly, when the flag PFLG1 has been set, the "on" determination period is obtained. Because the threshold value T2 is equal to one-half of the "on" time data TON(m) established at S435, the clock time according to the counter CNT from the start of the "on" determination period is considered to have reached the time of one-half of the "off" time of the pulse-width-modulated signal PWMm, execution proceeds to S455, and the output level of the pulse-width-modulated signal PWMm is set high. Accordingly, at S465, the flag PFLG3 is reset to low. Thereafter, execution proceeds to S355, and the value of the counter CNT is decremented by one.

Conversely, when it is determined at S450 that the flag PFLG1 has not been set, the "off" determination period is presently obtained, and, because the threshold value T2 is equal to the value established at S440, the clock time according to the counter CNT since the start of the "off" determination period is considered to have reached the time of one-half of the "on" time of the signal PWMm, execution proceeds to S460, and the output level of the pulse-width-modulated signal PWMm is set low. At S465, the threshold-update permission flag PFLG3 is reset to low. Thereafter, execution proceeds to S470, and the value of the counter CNT is decremented by one.

When the value of the counter CNT is decremented by one at S470, at S475 it is determined whether the value of the counter CNT is "0." Accordingly, when the value of the counter CNT is not "0," execution ends without further processing. However, when the value of the counter CNT is "0," execution proceeds to S480, the set/reset state of the determination-period discrimination flag PFLG1 is inverted, and thereafter the processing ends.

That is to say, in the pulse-width-modulated signal-output processing according to the third embodiment, as with the second embodiment, the half-cycle time of the signal PWMm to be output is repeatedly clocked using the counter CNT by causing the counter CNT to operate as a down counter. The counter is caused to be operated in this manner by writing a value to the counter CNT equal to one-half of the cycle data CYCL(m) of the signal PWMm corresponding to the linear solenoid Lm of the control target (S420), reducing the count value thereof by one at every fixed time interval (S470), and, when the count value reaches "0," repeating the writing of S420.

Additionally, each time the counter CNT becomes "0" and clocking of the half cycle of the pulse-width-modulated signal PWMm ends (S475: YES), half of one cycle of the pulse-width-modulated signal PWMm is established as the "on" determination period for inverting the pulse-width-modulated signal PWMm from low to high and switching on the switching element. The remaining half is established as the "off" determination period for inverting the pulse-width-modulated signal PWMm from high to low and switching off the switching element by inverting the flag PFLG1 (S480).

Further, in an "on" determination period (S430: YES), it is determined, at a time when the value of the counter CNT becomes the threshold value T2 set to the value of one-half of the "on" time data TON(m) of the signal PWMm at S435 (S445: YES and S450: YES), that a time of one-half of the "off" time of the signal PWMm has elapsed since the clocking start of half-cycle time by the counter CNT. Subsequently, the signal PWMm is inverted from low to high (S455). Conversely, in an "off" determination period (S430: NO), it is determined, at a time when the value of the counter CNT becomes the threshold value T2 set to the value of one-half of the value obtained by subtracting the "on" time data TON(m) from the cycle data CYCL(m) of the pulse-width-modulated signal PWMm at S440 (S445: YES and S450: NO), that a time of one-half of the "on" time of the signal PWMm has elapsed since the clocking start of half-cycle time by the counter CNT, and the signal PWMm is inverted from high to low (S460).

In the third embodiment, each time the value of the counter CNT reaches "0" and the clocking of the half cycle of the signal PWMm is started (S410: YES), the threshold-update permission flag PFLG3 is set high (S415). When the level of the signal PWMm is inverted, the threshold-update permission flag PFLG3 is reset to low (S465), and when the threshold-update permission flag PFLG3 is high (S425: YES), the "on" time data TON(m) of the pulse-width-modulated signal PWMm is continuously acquired from the RAM 22, and the threshold value T2 is continuously updated (S435 and S440).

With the above-described second embodiment, the "on" time data TON(m) is acquired from the RAM 22, and the threshold value T2 is updated only when clocking of the signal PWMm is started by the counter CNT. However, with the third embodiment, the "on" time data TON is continuously acquired from the RAM 22, and the threshold value T2 is continuously updated from the time the clocking of the half-cycle time of the signal PWMm is started until the value of the counter CNT has reached the threshold value T2 and the level of the signal PWMm is inverted.

For this reason, according to the signal output circuit 26 of the third embodiment, delay time after the "on" time data TOM(m) in the RAM 22 has been updated by the CPU 20 until the most recent "on" time data TON(m) is reflected in the duty of the signal PWMm can be shortened without disturbing the signal cycle. That is to say, when the signal PWMm is inverted, the threshold value T2 is not changed until clocking of the next cycle starts. Therefore, responsiveness of output duty when the "on" time data TON(m) in the RAM 22 is updated by the CPU 20 can be further improved while preventing the signal level of the pulse-width-modulated signal PWMm from changing more than two times within one cycle.

Fourth Embodiment

A controller 10 according to a fourth embodiment differs from with the controllers according to the first through third embodiments described above in the two points (1) and (2) discussed hereinafter.

(1) Update flags OVW(1) through OVW(4) are added to indicate whether the "on" time data TON(1)–TON(4), as the pulse-width-modulated data of each of the pulse-width-modulated signals PWM1–PWM4 stored in the RAM 22, has just been updated by CPU 20 or has already been utilized in generating pulse-width-modulated signals after updating has been performed.

Update flags OVW(1)–OVW(4) are set (OVW←high) each time the CPU 20 calculates the duty for driving the linear solenoids L1–L4. When the update flags OVW(1) –OVW(4) have been set when pulse-width-modulated data is acquired from the RAM 22, the signal output circuit 26 resets the flags (OVW←low).

Figure 10:
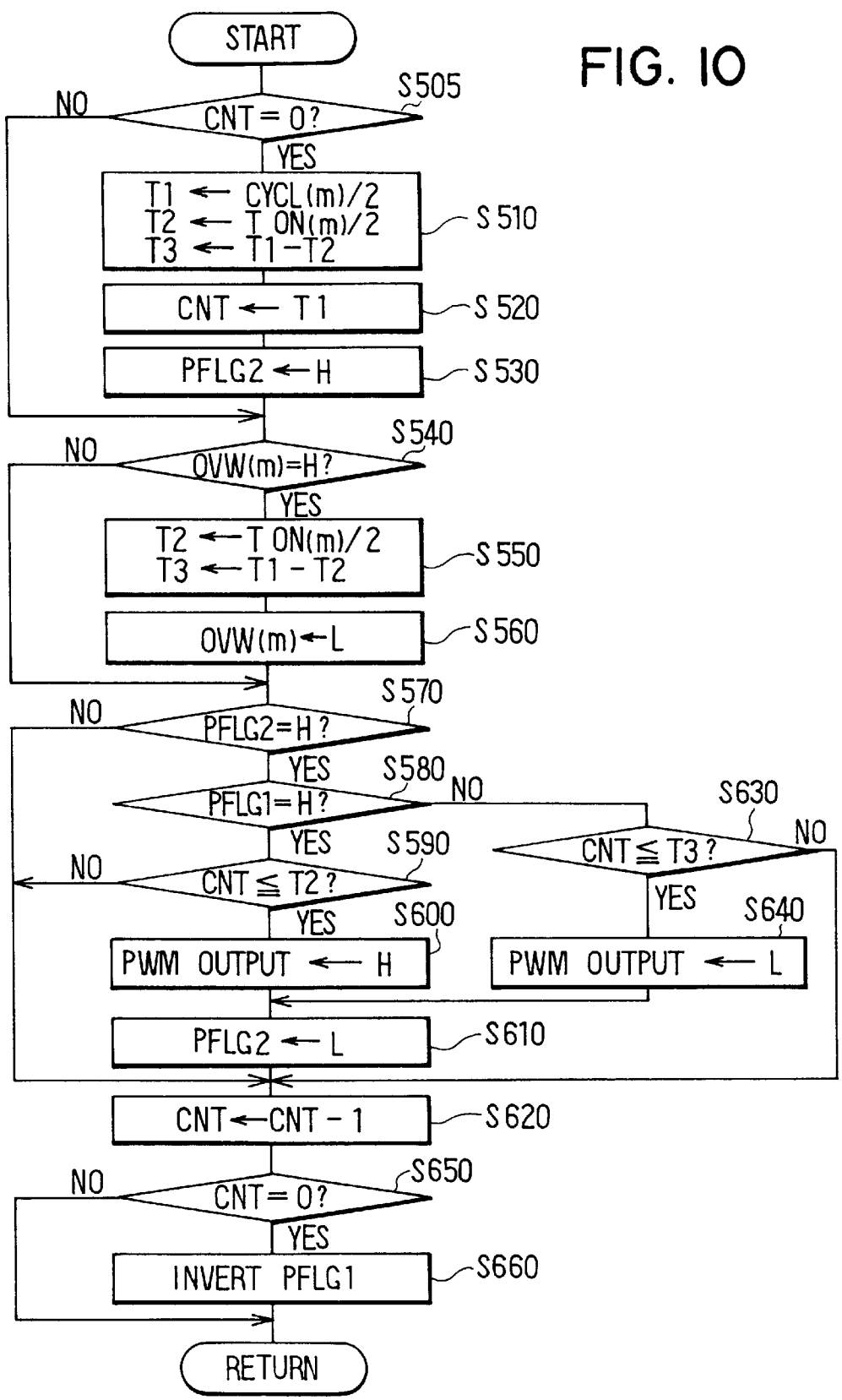
FIG. 10 is a flow diagram showing pulse-width-modulated signal-output processing executed by a pulsewidth-modulated signal output circuit according to a fourth embodiment of the present invention.

(2) The pulse-width-modulated signal-output processing executed every 1 μsec with respect to the linear solenoids L1–L4 by the signal output circuit 26 is executed as shown in FIG. 10.

In this regard, the pulse-width-modulated signal-output processing will be described next with reference to FIGS. 10 and 11. The processing shown in FIG. 10 also actually is achieved by a pulse-width-modulated signal-output processing portion, which is logic circuitry disposed in each of the linear solenoids L1–L4.

As shown in FIG. 10, in the pulse-width-modulated signal-output processing of the fourth embodiment, at S505 it is determined whether the value of the counter CNT is "0." When the value of the counter CNT is not "0," execution proceeds directly to S540. When the value of the counter CNT is "0," the time at which clocking of the half-cycle time of the signal PWMm by the counter CNT has started is considered to be obtained, and execution proceeds to S510.

At S510, the cycle data CYCL(m) and the "on" time data TON(m) of the signal PWMm are acquired from the RAM 22. A value equal to one-half of the acquired cycle data CYCL(m) is set as the half-cycle data T1. A value equal to one-half of the "on" time data TON(m) is set as a threshold value T2 for pulse-width-modulated signal high-level inverting use. A value obtained by subtracting the threshold data T2 from the value of the half-cycle data T1 is set as a threshold value T3 for pulse-width-modulated signal low-level inverting use. At S520, the value of the half-cycle data T1 is established in the counter CNT. At S530, an output-inversion permission flag PFLG2 for the signals is set (PFLG2←high), and execution proceeds to S540.

At S540, the update flag OVW(m) corresponding to the signal PWMm is acquired from the RAM 22, and it is determined whether the update flag OVW(m) has been set high. Accordingly, when the update flag OVW(m) has not been set, execution proceeds directly to S570. When the update flag OVW(m) has been set, at S550, as in above-described S510, the threshold values T2 and T3 are established. At S560, the update flag OVW(m) in the RAM 22 is reset to low, and thereafter execution proceeds to S570.

At S570, it is determined whether the output-inversion permission flag PFLG2 has been set high. When the flag PFLG2 has been set, at S580 it is determined whether the flag PFLG1 has been set high. The flag PFLG1 indicates whether a determination period for inverting the signal PWMm corresponding to the linear solenoid Lm of the control target from low to high is presently obtained, or whether a determination period for inverting the signal PWMm from high to low is presently obtained.

Accordingly, when it is determined at S580 that the flag PFLG1 has been set, the "on" determination period is considered to be presently obtained, execution proceeds to S590, and it is determined whether the value of the counter CNT is less than or equal to the threshold value T2. Accordingly, when the value of the counter CNT is less than or equal to the threshold value T2, the clock time according to the counter CNT since the start of the "on" determination period is considered to have reached the time of one-half of the "off" time of the pulse-width-modulated signal PWMm. Execution then proceeds to S600, and the output level of the 1o pulse-width-modulated signal PWMm is set high. At S610, the output-inversion permission flag PFLG2 is reset to low, and execution proceeds to S620.

Meanwhile, when it is determined at S580 that the flag PFLG1 has been set, the "off" determination period is considered to be presently obtained, and execution proceeds to S630, where it is determined whether the value of the counter CNT is less than or equal to the threshold value T3. Accordingly, when the value of the counter CNT is less than or equal to the threshold value T3, the clock time according to the counter CNT since the start of the "off" determination period is considered to have reached the time of one-half of the "on" time of the pulse-width-modulated signal PWMm. Execution then proceeds to S640, and the output level of the pulse-width-modulated signal PWMm is set low. Accordingly, at S610, the output-inversion permission flag PFLG2 is reset to low, and execution proceeds to S620.

When it is determined at S570 that the permission flag PFLG2 has not been set, when it is determined at S590 that the value of the counter CNT is less than or equal to the threshold value T2, or when it is determined at S630 that the value of the counter CNT is not less than or equal to the threshold value T3, execution proceeds directly to S620.

At S620, the counter CNT is decremented by one, and at S650 it is determined whether the value of the counter CNT has become "0." Accordingly, when the value of the counter CNT is not "0," execution ends without further processing. However, when the value of the counter CNT is "0," execution proceeds to S660, the set/reset state of the determination-period discrimination flag PFLG1 is inverted, and thereafter the processing ends.

In the pulse-width-modulated signal-output processing, the half-cycle time of the signal PWMm to be output is repeatedly clocked by causing the counter CNT to operate as a down counter by writing to the counter CNT a value of one-half of the cycle data CYCL(m) of the pulse-width-modulated signal PWMm as the half-cycle data T1 (S520), reducing the count value thereof by one at every fixed time interval (such as, for example, 1 $\mu$sec) (S620), and further, when the count value thereof reaches "0," again writing the half-cycle data T1 to the counter CNT (S420).

Accordingly, each time the counter CNT becomes "0" and clocking of the half cycle of the signal PWMm ends (S650: YES), half of one cycle of the pulse-width-modulated signal PWMm is established as the "on" determination period for inverting the signal PWMm from low to high and switching on the switching element, and the remaining half is established as the "off" determination period for inverting the signal PWMm from high to low and switching off the switching element, by inverting the determination-period discrimination flag PFLG1 (S660).

Figure 11:
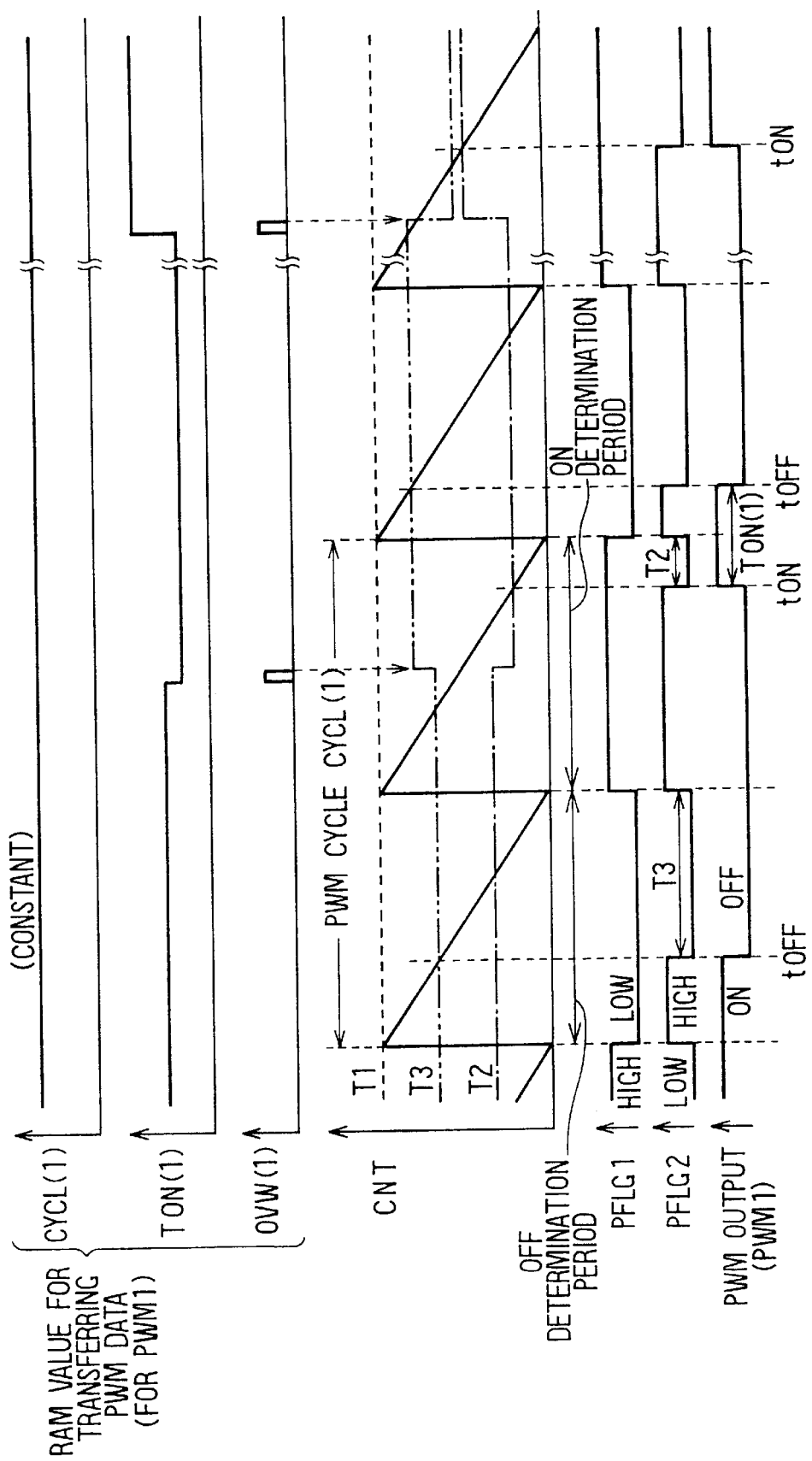
FIG. 11 is a timing diagram showing operation of the pulse-width-modulated signal output circuit according to the fourth embodiment.

Further, as shown in FIG. 11, in an "on" determination period (S580: YES), it is determined, at a time tON when the value of the counter CNT becomes the threshold value T2 set to the value of one-half of the "on" time data TON(m) of the signal PWMm at S510 and S550 (S590: YES), that a time of one-half of the "off" time of the signal PWMm has elapsed since the clocking start of the half-cycle time by the counter CNT. Consequently, the pulse-width-modulated signal PWMm is inverted from low to high (S600). Conversely, in an "off" determination period (S580: NO), it is determined, at a time tOFF when the counted-down value of the counter CNT becomes the threshold value T3 set to the value of one-half of the value obtained by subtracting the "on" time data TON(m) from the cycle data CYCL(m) of the signal PWMm at S510 and S550 (S630: YES), that a time (first time) of one-half of the "on" time of the pulse-width-modulated signal PWMm has elapsed since the clocking start of half-cycle time by the counter CNT, and the pulse-width-modulated signal PWMm is inverted from high to low (S640).

Additionally, the half-cycle data T1 and the two threshold values T2 and T3 are such that at every iteration at which clocking of the half-cycle time of the signal PWMm starts anew according to the counter CNT (S505: YES), the pulse-width-modulated data in the RAM 22 is acquired, and the half-cycle data T1 and the two threshold values T2 and T3 are updated (S510). Further, even when clocking of the half-cycle time by the counter CNT is in progress, it is determined whether the update flag OVW(m) in the RAM 22 has been set (whether the CPU 20 has overwritten the pulse-width-modulated data) (S540). When the update flag OVW(m) has been set, the updated pulse-width-modulated data is acquired, and T2 and T3 are updated.

Further, each time the value of the counter CNT reaches "0" and the clocking of the half cycle of the pulse-width-modulated signal PWMm is newly started (S505: YES), the output-inversion permission flag PFLG2 is set high (S530). When the signal level of the signal PWMm is inverted, the output-inversion permission flag PFLG2 is reset to low (S610). When the flag PFLG2 is low (S570: NO), the determination processing of S580, S590, and S630 is not executed, and inversion of the signal level of the signal PWMm is prohibited.

For this reason, the pulse-width-modulated signals output from the signal output circuit 26 according to the fourth embodiment are such that the pulse-width-modulated signals can be changed to signals corresponding to new pulse-width-modulated data at either the rising-edge timing or the falling-edge timing immediately after the pulse-width-modulated data (the duty of the pulse-width-modulated signals to be output) has been updated, without being fixed at either one or the other of the rising-edge or falling-edge timing thereof as in an apparatus according to the prior art. That is to say, by fixing either the rising-edge or falling-edge timing of the pulse-width-modulated signals and controlling the other timing, with an apparatus according to the prior art to generate pulse-width-modulated signals, the duty of the pulse-width-modulated signals can be changed once per signal cycle, and the delay time until the signal cycles correspond to the duty after updating thereof is, at a maximum, one signal cycle.

According to the present embodiment, however, the duty of the pulse-width-modulated signals can be controlled at both the rising edge and the falling edge of the pulse-width-modulated signals, and so the delay time after the updating of the pulse-width-modulated data until the pulse-width-modulated signals correspond to duty after updating is, at a maximum, the time of one-half cycle of the pulse-width-modulated signals. As a result, control responsiveness is improved.

Additionally, with the fourth embodiment, the update status of the pulse-width-modulated data is monitored from the update flag OVW(m) of the pulse-width-modulated data. When the pulse-width-modulated data has been updated, the pulse-width-modulated data is acquired and the threshold values T2 and T3 are recalculated without synchronization to the switching of the determination period. Because of this, when the pulse-width-modulated signals have not been inverted within the determination period during recalculation, the signals are inverted based on the threshold values T2 and T3 after recalculation, and control responsiveness is improved.

Moreover, when the signal level of the pulse-width-modulated signal PWMm is inverted, the output-inversion permission flag PFLG2 is reset, and level inversion of the pulse-width-modulated signals is prohibited until clocking of the next cycle time starts. Therefore, as in the third embodiment, output duty responsiveness when the pulse-width-modulated data is updated by the CPU 20 can be improved while preventing the signal level of the pulse-width-modulated signal PWMm from changing more than two times within one cycle.

Fifth Embodiment

It may be noted that with the signal output circuit 26 according to the above-described first through fourth embodiments, the respective pulse-width-modulated signal-output processing portions to individually generate the pulse-width-modulated signals PWM1–PWM4 of the several channels are each provided with a counter CNT (refer to FIG. 7). However, a signal output circuit 26 having a structure sharing a single counter CNT to generate and output two pulse-width-modulated signals will be described next as a fifth embodiment.

Figure 12:
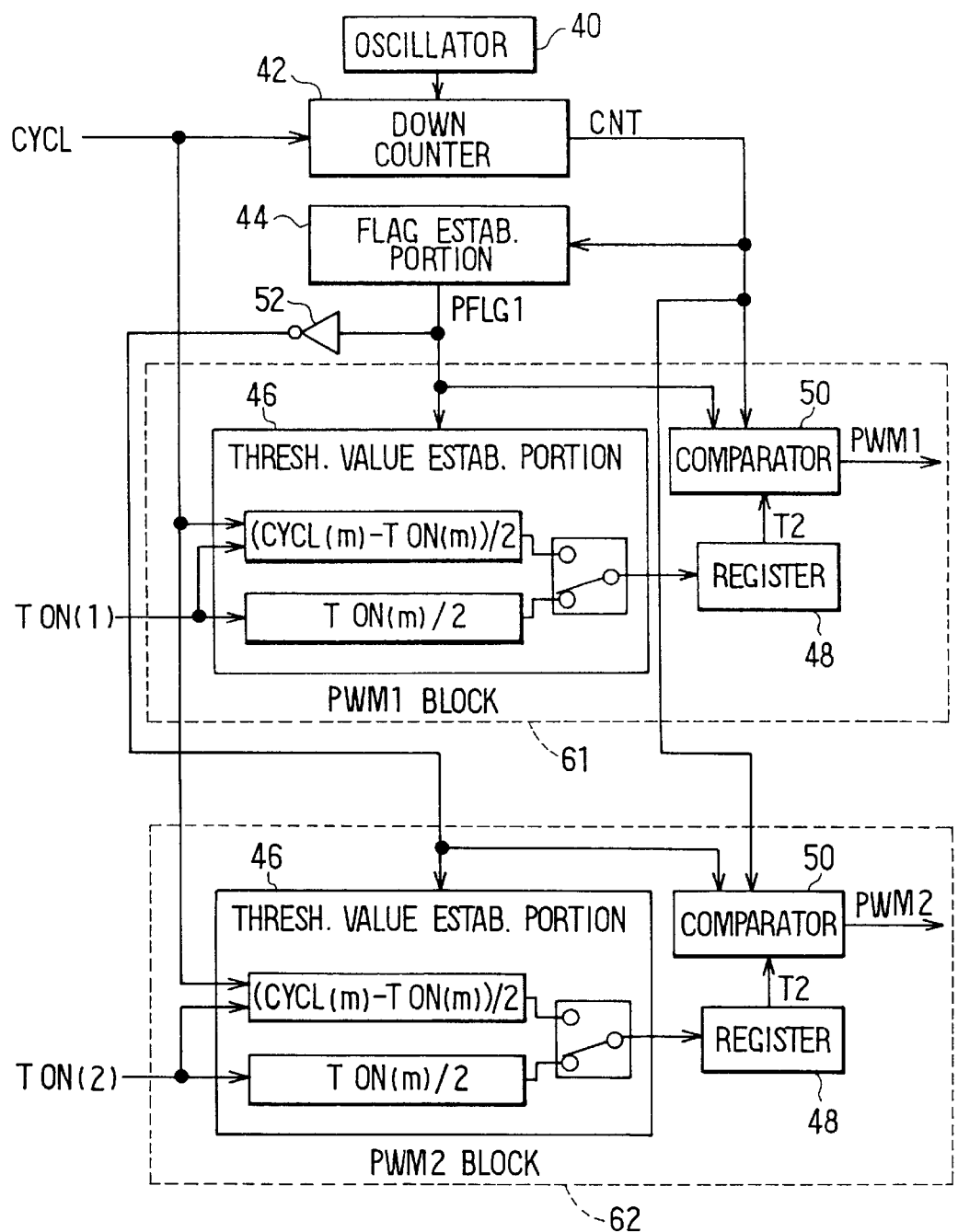
FIG. 12 is a block diagram indicating the structure of a pulse-width-modulated signal-output processing portion provided in a pulse-width-modulated signal output circuit according to a fifth embodiment of the present invention.

In the controller 10 according to the fifth embodiment, two each of the four pulse-width-modulated signal-output processing portions are provided to individually generate the four pulse-width-modulated signals PWM1–PWM4 in the signal output circuit 26, and are structured as shown in FIG. 12. However, in other respects the controller is similar to the controller 10 of the above-described second embodiment.

FIG. 12 depicts the structure of the pulse-width-modulated signal-output processing portion to individually generate and output the signal PWM1 of the channel 1 corresponding to the linear solenoid L1 and the signal PWM2 of the channel 2 corresponding to the linear solenoid L2. However, the structure of the pulse-width-modulated signal-output processing portion to individually generate and output the two pulse-width-modulated signals PWM3 and PWM4 of the channel 3 and channel 4 corresponding to the remaining linear solenoids L3 and L4 is also similar to that shown in FIG. 12. For this reason, the structure of the pulse-width-modulated signal-output processing portion for linear solenoids L1 and L2 will be described hereinafter with reference to FIG. 12.

As shown in FIG. 12, the pulse-width-modulated signal-output processing portion provided in the signal output circuit 26 according to the fifth embodiment is provided with separate circuit blocks (hereinafter "PWM blocks") for the respective pulse-width-modulated signals PWM1 and PWM2 of channel 1 and channel 2, as a drive-data acquiring unit and a signal-level establishing unit made up of the threshold-value establishing portion 46, the register 48, and the comparator 50 enclosed within the dotted lines in FIG. 7. However, only one oscillator 40, one down counter 42, and one determination-period discrimination-flag establishing portion 44 identical with FIG. 7 are provided.

Accordingly, the PWM1 block 61 to output the pulse-width-modulated signal PWM1 is supplied with the flag PFLG1 from the flag establishing portion 44 in unmodified form. However, the PWM2 block 62 is supplied with a signal produced by inverting the level of the flag PFLG1 from the flag establishing portion 44 with an inverter 52 as the flag PFLG1. Additionally, the threshold-value establishing portion 46 of the PWM1 block 61 and the threshold-value establishing portion 46 of the PWM2 block 62 acquire shared cycle data CYCL for the two pulse-width-modulated signals PWM1 and PWM2, which is cycle data identical to that acquired in the down counter 42 from the RAM 22.

Figure 13:
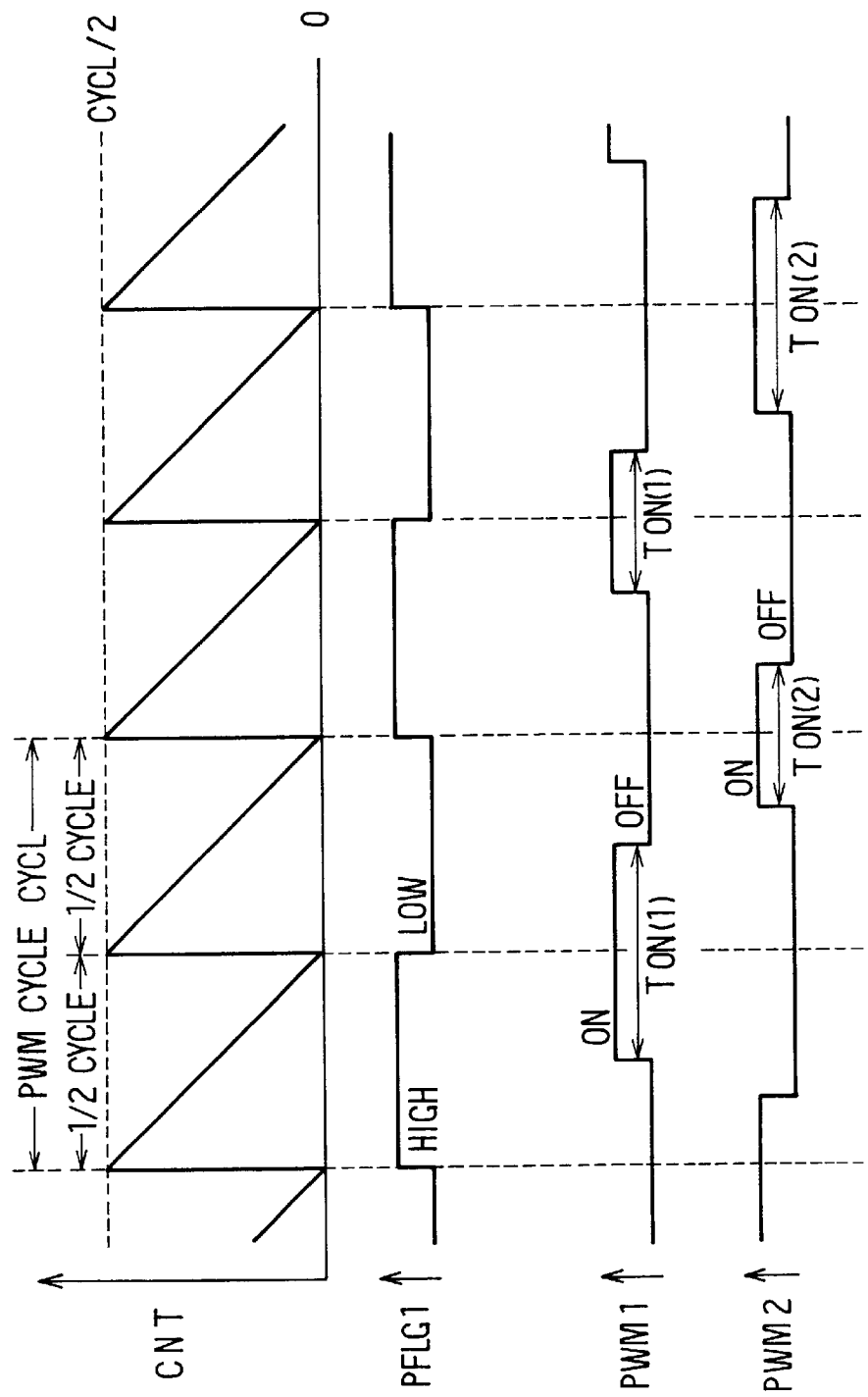
FIG. 13 is a timing diagram showing operation of the pulse-width-modulated signal output circuit of FIG. 12.

For this reason, as shown in FIG. 13, the pulse-width-modulated signal PWM1 output from the PWM1 block 61 is inverted from low to high in the "on" determination period wherein the flag PFLG1 from the flag establishing portion 44 is high, and is inverted from high to low in the "off" determination period wherein the flag PFLG1 from the flag establishing portion 44 is low, as in the second embodiment shown in FIG. 7.

Conversely thereto, however, the signal PWM2 output from the PWM2 block 62 is inverted from high to low in the "on" determination period wherein the flag PFLG1 from the flag establishing portion 44 is high, and is inverted from low to high in the "off" determination period wherein the flag PFLG1 from the flag establishing portion 44 is low.

That is to say, the two PWM blocks 61 and 62 operate in a state respectively offset by the half-cycle time of the pulse-width-modulated signals clocked by the down counter 42.

Consequently, according to the signal output circuit 26 of the fifth embodiment, when the duty of the two pulse-width-modulated signals PWM1 and PWM2 is less than 100%, the two signals PWM1 and PWM2 do not simultaneously go high, the simultaneous flow of current to the two linear solenoids L1 and L2 is prevented, and fluctuation of the power-source voltage Vb that causes current to flow to the linear solenoids L1–L4 is suppressed, as is exemplified in FIG. 13.

That is to say, by fixing either the rising-edge or falling-edge timing of the pulse-width-modulated signals and controlling the other timing to generate pulse-width-modulated signals with an apparatus according to the prior art, when the duty of either one or the other of the pulse-width-modulated signals exceeds 50%, a period occurs wherein the two pulse-width-modulated signals simultaneously go high and current flows simultaneously to the two linear solenoids, even if the two pulse-width-modulated signals should be output with an offset of one-half of the cycle time. Accordingly, when current flows simultaneously to the two linear solenoids, the power-source voltage Vb becomes susceptible to fluctuation, and there is a chance of the electronic equipment mounted on the vehicle being adversely affected.

In contrast thereto, according to the signal output circuit 26 of the fifth embodiment, when the total duty of the two pulse-width-modulated signals is less than 100%, current does not flow simultaneously to the two linear solenoids corresponding respectively to these two pulse-width-modulated signals, and suppression of fluctuation in the power-source voltage Vb is facilitated.

Additionally, with the fifth embodiment, the half-cycle time of the pulse-width-modulated signals is repeatedly clocked by the down counter 42 wherein the count value changes two times per pulse-width-modulated signal cycle, and so the structure of the two PWM blocks 61 and 62 can be identical.

As was described above, the structure of the pulse-width-modulated signal-output processing portion for the linear solenoids L3 and L4 is also similar to that shown in FIG. 12. However, when the down counter 42 of the processing portion to output signals PWM1 and PWM2 and the down counter 42 of the processing portion to output the signals PWM3 and PWM4 are perform counting with exactly the same timing, the respective signals PWM1–PWM4 output from the circuit 26 according to the fifth embodiment change in level with an associated timing shown in FIG. 14.

That is to say, the signal PWM1 and the signal PWM3 go high with a timing centering on the falling-edge timing of the flag PFLG1 from the flag establishing portion 44, and the pulse-width-modulated signal PWM2 and the pulse-width-modulated signal PWM4 go high at a timing centering on the rising-edge timing of the flag PFLG1 from the flag establishing portion 44.

In this case, the pulse-width-modulated signal-output processing portion to output the signals PWM1 and PWM2 and the pulse-width-modulated signal-output processing portion to output the signals PWM3 and PWM4 can also be structured to share the down counter 42 and the flag establishing portion 44.

Figure 15:
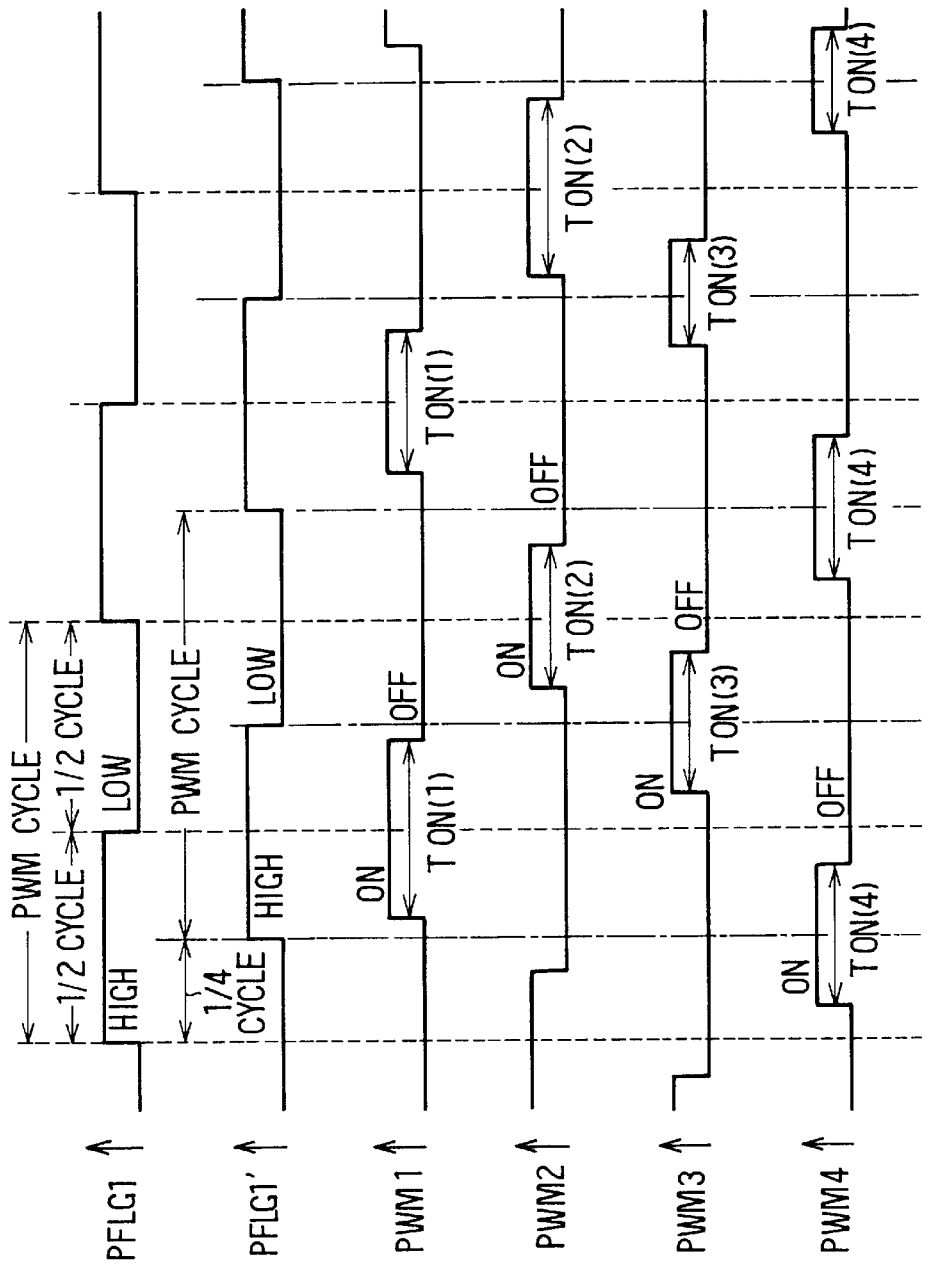
FIG. 15 is a timing diagram showing another example of level-change timing of several pulse-width-modulated signals output from the pulse-width-modulated signal output circuit according to the fifth embodiment.

Additionally, for example, when the pulse-width-modulated signal-output processing portion to output the signals PWM1 and PWM2 and the pulse-width-modulated signal-output processing portion to output the signals PWM3 and PWM4 are structured to perform counting at a timing offset by a time equal to one-fourth of the pulse-width-modulated signal cycle time (i.e., a quarter cycle), the four respective pulse-width-modulated signals PWM1–PWM4 output from the signal output circuit 26 undergo level change at a timing shown in FIG. 15.

That is to say, the signal PWM1 goes high at a timing centering on the falling-edge timing of the flag PFLG1 from the flag establishing portion 44, and the signal PWM2 goes high at a timing centering on the rising-edge timing of the flag PFLG1 from the flag establishing portion 44. The signal PWM3 goes high at a timing centering on the falling-edge timing of a flag PFLG1' having a level inverted at an offset of one quarter-cycle of the pulse-width-modulated signal with respect to the flag PFLG1 from the flag establishing portion 44, and the signal PWM4 goes high at a timing centering on the rising-edge timing of the foregoing flag PFLG1'. Accordingly, when structured in this way, the probability of current flowing simultaneously to the linear solenoids L1–L4 can be further reduced, and power-source voltage fluctuation can be more effectively suppressed.

Figure 16:
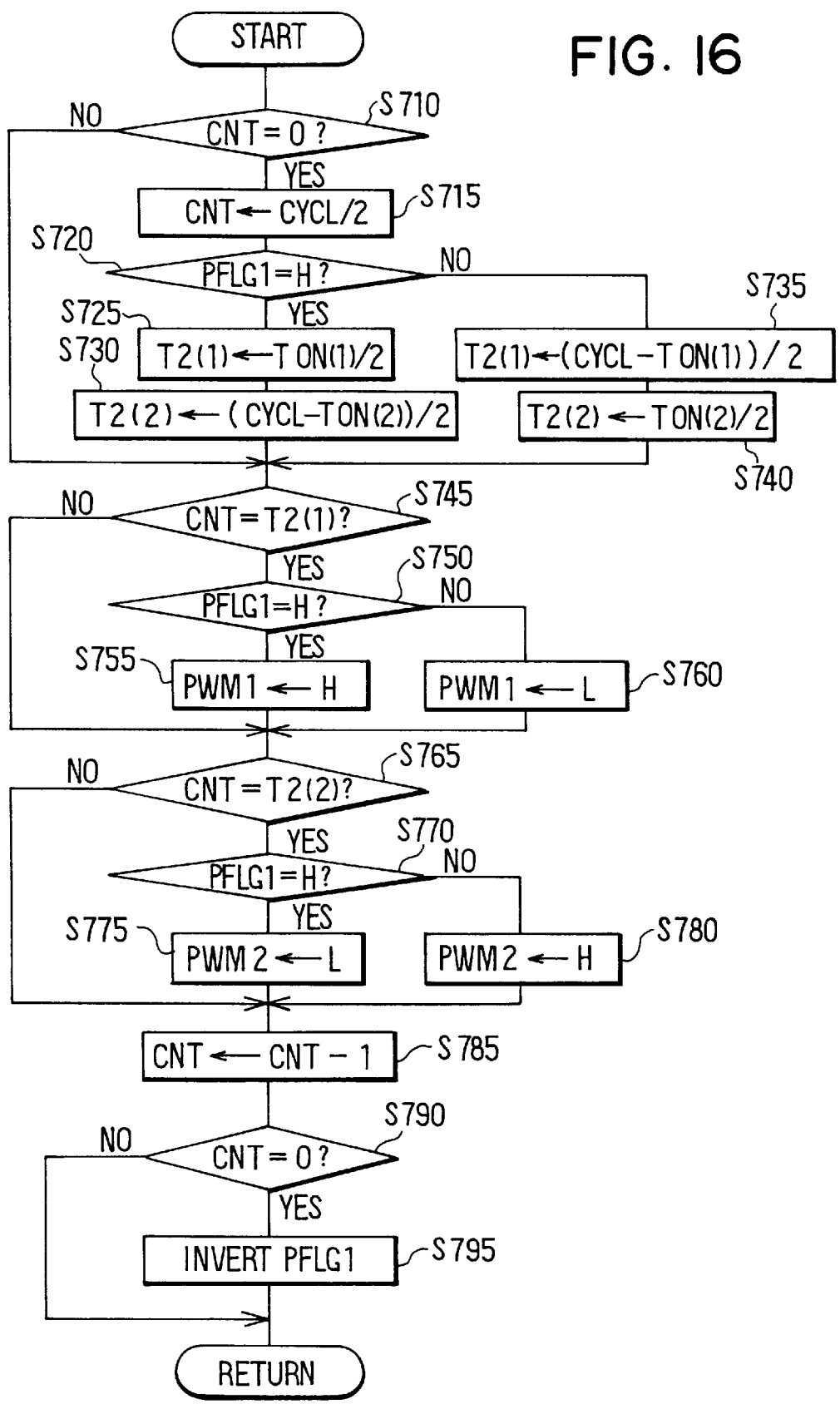
FIG. 16 is a flow diagram of pulse-width-modulated signal-output processing for achieving operation of the pulse-width-modulated signal-output processing portion of FIG. 12.

Meanwhile, operation of the pulse-width-modulated signal-output processing portion depicted in FIG. 12 can be achieved by executing the pulse-width-modulated signal-output processing shown in FIG. 16 at each iteration of a fixed time interval (for example 1 μsec).

That is to say, in the pulse-width-modulated signal-output processing, at S710 it is determined whether the value of the counter CNT is "0." Accordingly, when the value of the counter CNT is not "0," execution proceeds directly to S745. When the value of the counter CNT is "0," the time at which clocking of the half-cycle time of the pulse-width-modulated signals PWM1 and PWM2 by the counter CNT has started is considered to be obtained, and execution proceeds to S715.

At S715, the cycle data CYCL shared by the pulse-width-modulated signals PWM1 and PWM2 is acquired from the RAM 22, and a value equal to one-half of the acquired cycle data CYCL is set in the counter CNT.

Further, at S720, it is determined whether the flag PFLG1 has been set high. When the determination-period discrimination flag PFLG1 has been set, the "on" determination period is considered to be presently obtained, and execution proceeds to S725. Accordingly, the "on"time data TON(1) of the pulse-width-modulated signal PWM1 is first acquired from the RAM 22. Next, a value equal to one-half of the acquired "on" time data TON(1) is established as the threshold value T2(1) for pulse-width-modulated signal PWM1 inverting use. At S730, the "on" time data TON(2) of the pulse-width-modulated signal PWM2 is acquired from the RAM 22. Next, a value equal to one-half of the value obtained by subtracting the acquired "on" time data TON(2) from the cycle data CYCL acquired at S715 is established as the threshold value T2(2) for pulse-width-modulated signal PWM2 inverting use. Thereafter, processing proceeds to S745.

Additionally, when it is determined at S720 that the flag PFLG1 has not been set, the "off" determination period is presently obtained, execution proceeds to S735, and the "on" time data TON(1) of the signal PWM1 is acquired from the RAM 22. Next, a value equal to one-half of the value obtained by subtracting the above-described acquired "on" time data TON(1) from the cycle data CYCL acquired from the RAM 22 is established as the threshold value T2(1) for pulse-width-modulated signal PWM1 inverting use. Accordingly, at S740, the "on" time data TON(2) of the signal PWM2 is acquired from the RAM 22. Next, a value equal to one-half of the acquired "on" time data TON(2) is established as the threshold value T2(2) for signal PWM2 inverting use. Thereafter, execution proceeds to S745.

At S745 it is determined whether the value of the counter CNT coincides with the threshold value T2(1). When the value of the counter CNT does not coincide with the threshold value T2(1), execution proceeds directly to S765.

Meanwhile, when it is determined at S745 that the value of the counter CNT coincides with the threshold value T2(1), execution proceeds to S750, and it is determined whether the flag PFLG1 has been set high. Accordingly, when the flag PFLG1 has been set, the "on" determination period is presently obtained, and the threshold value T2(1) is a value equal to one-half of the "on" time data TON(1) established in the foregoing S725. Therefore, the clock time according to the counter CNT from the start of the "on" determination period is considered to have reached the time of one-half of the "off" time of the signal PWM1. Execution then proceeds to S755, and the output level of the signal PWM1 is set high before execution proceeds to S765.

Conversely, when it is determined at S750 that the flag PFLG1 has not been set, the "off" determination period is presently obtained, and the threshold value T2(1) is the value established at S735. Therefore, the clock time according to the counter CNT since the start of the "off" determination period is considered to have reached the time of one-half of the "on" time of the signal PWM1. Execution then proceeds to S760, and the output level of the signal PWM1 is set low before execution proceeds to S765.

Next, at S765 it is determined whether the value of the counter CNT coincides with the threshold value T2(2). When the value of the counter CNT does not coincide with the threshold value T2(2), execution proceeds directly to S785.

Meanwhile, when it is determined at S765 that the value of the counter CNT coincides with the threshold value T2(2), execution proceeds to S770, and it is determined whether the flag PFLG1 has been set high. When the flag PFLG1 has been set, the "on" determination period is obtained, and the threshold value T2(2) is the value established at S730. Therefore, the clock time according to the counter CNT from the start of the "on" determination period is considered to have reached the time of one-half of the "on" time of the signal PWM2. Execution then proceeds to S755, and the output level of the pulse-width-modulated signal PWM1 is set low before execution proceeds to S785.

Conversely, when it is determined at S770 that the flag PFLG1 has not been set, the "off" determination period is presently obtained, and the threshold value T2(2) is a value equal to one-half of the "on" time data TON(2) established at S740. Therefore, the clock time according to the counter CNT since the start of the "on" determination period is considered to have reached the time of one-half of the "off" time of the signal PWM2. Execution then proceeds to S780, and the output level of the pulse-width-modulated signal PWM1 is set high before execution proceeds to S785.

Accordingly, at S785 the value of the counter CNT is decremented by one, and at S790 it is determined whether the value of the counter CNT has become "0." Accordingly, when the value of the counter CNT is not "0," execution ends without further processing. However, when the value of the counter CNT is "0," execution proceeds to S795, the set/reset state of the flag PFLG1 is inverted, and thereafter the processing ends.

That is to say, in the signal-output processing according to the fifth embodiment, the processing of S710, S715, S720, S785, 5790, and S795 is identical to the processing of S310, S315, S320, S355, S360, and S365 of FIG. 6.

The processing of S725, S735, S745, S750, S755, and S760 corresponds to the PWM1 block 61 for generating the pulse-width-modulated signal PWM1. The processing as well is identical to the processing of S325, S330, S335, S340, S345, and S350 of FIG. 6.

In contrast thereto, the processing of S730, S740, S765, S770, S775, and S780 corresponds to the PWM2 block 62 for generating the pulse-width-modulated signal PWM2. The processing is an addition to the pulse-width-modulated signal-output processing of FIG. 6.

With the pulse-width-modulated signal-output processing according to the fifth embodiment, when the flag PFLG1 is determined at S720 to be high, at S730 the threshold value T2(2) is established according to a procedure similar to S330 and S735. When the flag PFLG1 is determined at S720 to be low, at S740 the threshold value T2(2) is established according to a procedure similar to S325 and S725. Further, when the flag PFLG1 is determined at S770 to be high, at S775 the signal PWM2 is made to go low. When the flag PFLG1 is determined at S770 to be low, at S780 the signal PWM2 is made to go high. As a result, the processing for generating the signal PWM2 (i.e., S730, S740, and S765–S780) is offset by an amount equal to one-half of the cycle time of the signals PWM1 and PWM2 with respect to the processing for generating the pulse-width-modulated signal PWM1 (i.e., S725, S735, and S745 through S760).

When the signal-output processing of FIG. 16 is repeatedly executed by a microprocessor or the like, two signals PWM1 and PWM2 can be generated with only a single counter CNT being utilized, as with the pulse-width-modulated signal-output processing portion of FIG. 12.

Sixth Embodiment

Figure 17:
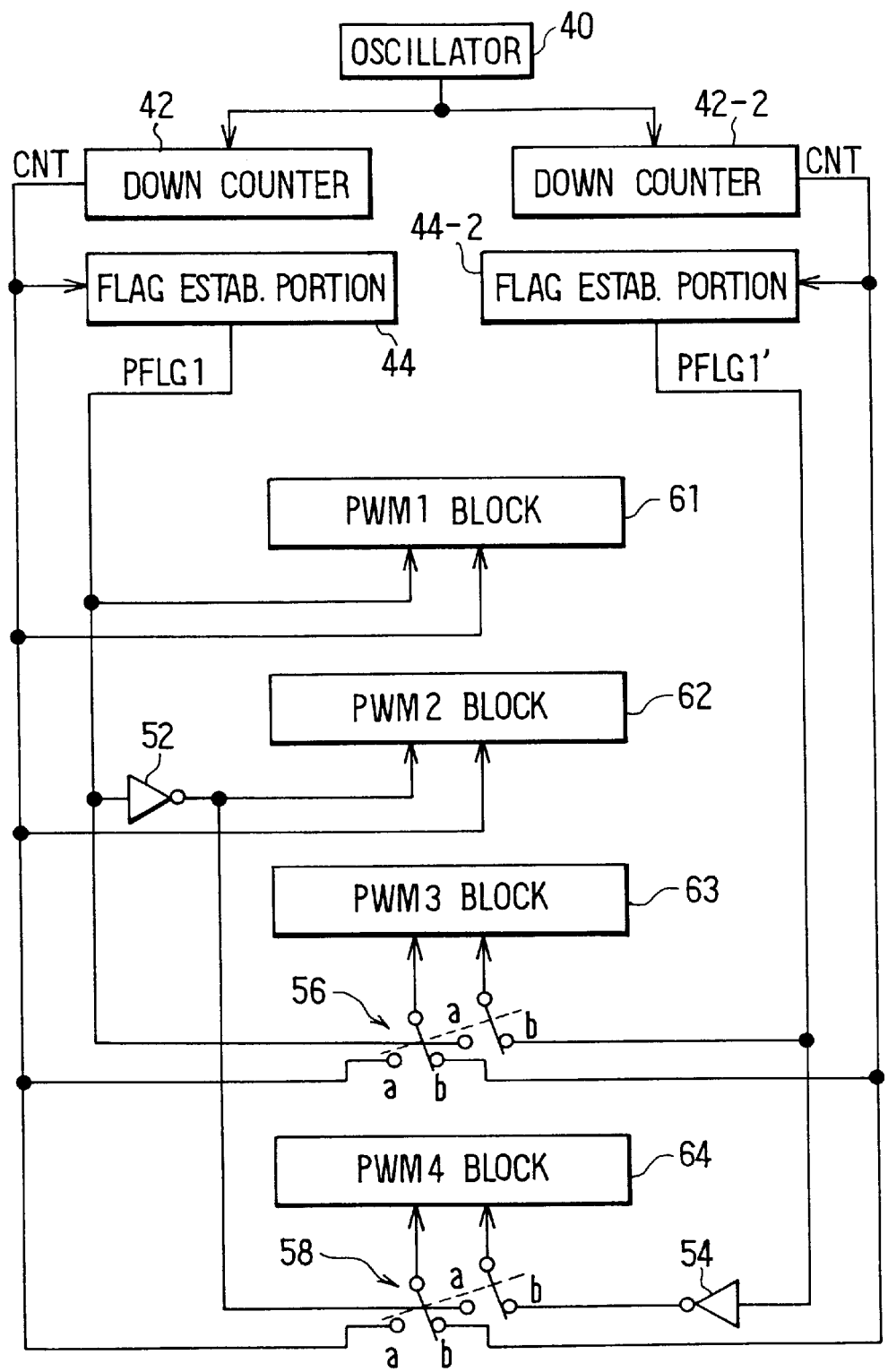
FIG. 17 is a block diagram of the structure of a pulse-width-modulated signal output circuit according to a sixth embodiment of the present invention.
Figure 18:
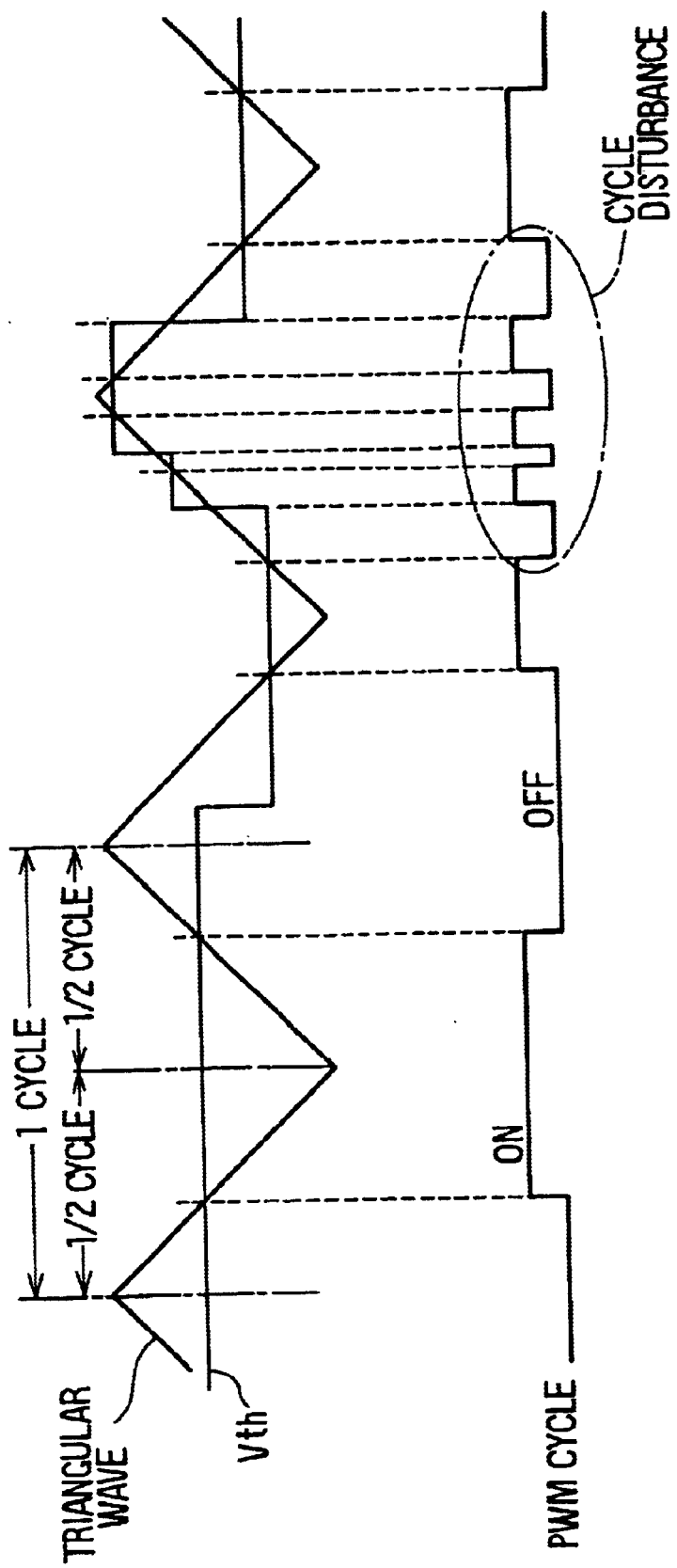
FIG. 18 in an explanatory diagram for describing limitations of the prior art.

As shown in FIG. 17, the signal output circuit 26 according to a sixth embodiment is further provided with a down counter 42-2, similar to the down counter 42, to perform down-counting in synchronization with a clock signal from the oscillator, a flag establishing portion 44-2 to output a flag PFLG1' via a procedure similar to that of the flag establishing portion 44, based on a count value (CNT) of the down counter 42-2, an inverter 54 to invert the level of the flag PFLG1' output by the flag establishing portion 44-8 and output same, a PWM block (PWM3 block) 63 for signal PWM3 output use, and a PWM block (PWM4 block) 64 for signal PWM4 output use, in addition to the pulse-width-modulated signal-output processing portion according to the fifth embodiment depicted in FIG. 12.

Accordingly, the down counter 42-2 performs count-down operation at a timing delayed by a time equal to one-fourth of the pulse-width-modulated signal cycle time with respect to the down counter 42.

As was described above, the PWM blocks 63 and 64 also include the threshold-value establishing portion 46, the register 48, and the comparator 50 within the dotted lines in FIG. 7. Also, two selector switches 56 and 58 are provided in the signal output circuit 26 according to the sixth embodiment.

When the selector switch 56 is set at a first switch position a, the count value (CNT) of the down counter 42 and the flag PFLG1 from the flag establishing portion 44 are supplied to the PWM3 block 63. When the selector switch 56 is set at a second switch position b, the count value (CNT) of the down counter 42-2 and the flag PFLG1' from the flag establishing portion 44-2 are supplied to the PWM3 block 63. Further, when the selector switch 58 is set at a first switch position a, the count value (CNT) of the down counter 42 and the output signal of the inverter 52 are supplied to the PWM4 block 64. When the selector switch 58 is set at a second switch position b, the count value (CNT) of the down counter 42-2 and the output signal of the inverter 52 are supplied to the PWM4 block 64.

Figure 14:
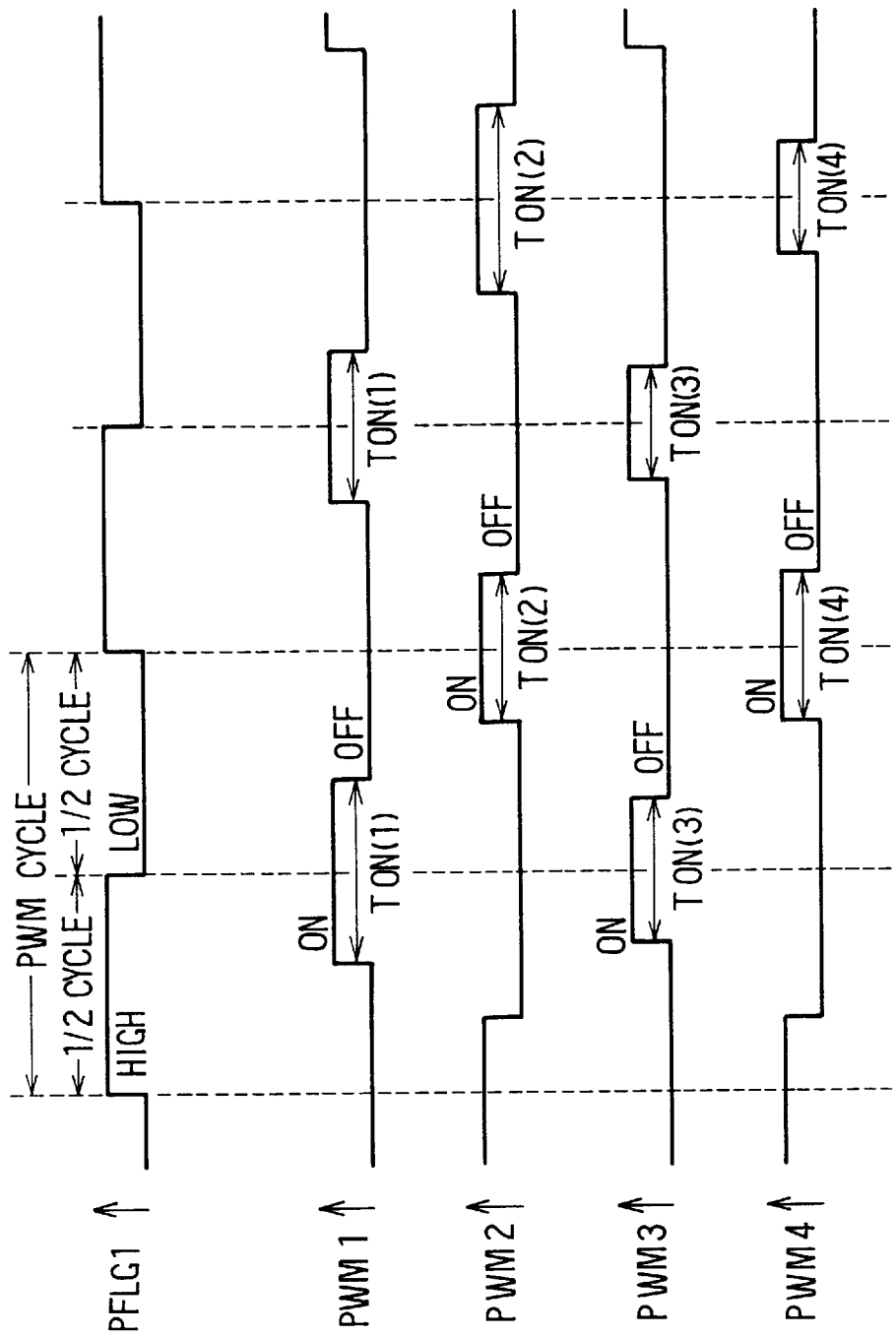
FIG. 14 is a timing diagram showing one example of level-change timing of several pulse-width-modulated signals output from the pulse-width-modulated signal output circuit according to the fifth embodiment.

With the signal output circuit 26 according to the sixth embodiment structured as described above, when the two selector switches 56 and 58 are set at the foregoing first switch position a, the pulse-width-modulated signals PWM1–PWM4 output from the circuit 26 undergo level changes at a timing shown in FIG. 14. When the two selector switches 56 and 58 are set at the foregoing second switch position b, the pulse-width-modulated signals PWM1–PWM4 undergo level changes at a timing shown in FIG. 15. Thus, it is advantageous to vary the output-time differentials of the signals PWM1–PWM4.

Additionally, according to an advantageous feature of the signal output circuit 26 of the sixth embodiment, when the two selector switches 56 and 58 are set at the foregoing second switch position b, and the half-cycle time of the signals counted by the two down counters 42 and 42-2 is varied, the cycle of the signals PWM1 and PWM2 and the cycle of the signals PWM3 and PWM4 can be differed.

While several embodiments of the present invention have been described above, it should be appreciated that the invention is not exclusively restricted to the above-described embodiments, but may be carried out in various modes.

For example, the signal output circuit 26 of the second through sixth embodiments utilizes a down counter to change the count value two times in a single pulse-width-modulated signal cycle as the clocking unit to repeatedly clock the pulse-width-modulated signal half-cycle time. However, an up counter may also be utilized to change the count value two times in a single pulse-width-modulated signal cycle. Specifically, the pulse-width-modulated signal-output processing of FIG. 6 for the signal output circuit 26 according to, for example, the second embodiment may be changed as described hereinafter.

(1): At S310, it is determined whether the value of the counter CNT is the value of the half-cycle data T1 established in the previous processing of S315 which will be described later.

(2): At S315, the cycle data CYCL(m) of the signal PWMm is acquired from the RAM 22, a value equal to one-half of the cycle data CYCL(m) is established as the half-cycle data T1, and further, the counter CNT is set to "0" as an initial value.

(3): The processing of S325 and the processing of S330 are interchanged. That is to say, at S325, the "on" time data TON(m) of the signal PWMm is acquired from the RAM 22, and a value equal to one half of the value obtained by subtracting the "on" time data TON(m) acquired above from the cycle data CYCL(m) acquired at S315 is established as the threshold value T2. Additionally, at S330, the "on" time data TON(m) of the pulse-width-modulated signal PWMm is acquired from the RAM 22, and a value equal to one-half of the acquired "von" time data TON(m) is established as the threshold value T2.

(4): At S355, the value of the counter CNT is incremented by one.

(5): At S360, it is determined whether the value of the counter CNT has reached the half-cycle data T1 at S315.

Accordingly, when modified as in the above-described (1) through (5), the counter CNT is caused to operate as an up counter, and the half-cycle time of the pulse-width-modulated signal PWMm can be repeatedly clocked. Even when modified in this way, the same effects as those of the second embodiment can be obtained, and in the third through sixth embodiments.

Seventh Embodiment

Figure 19:
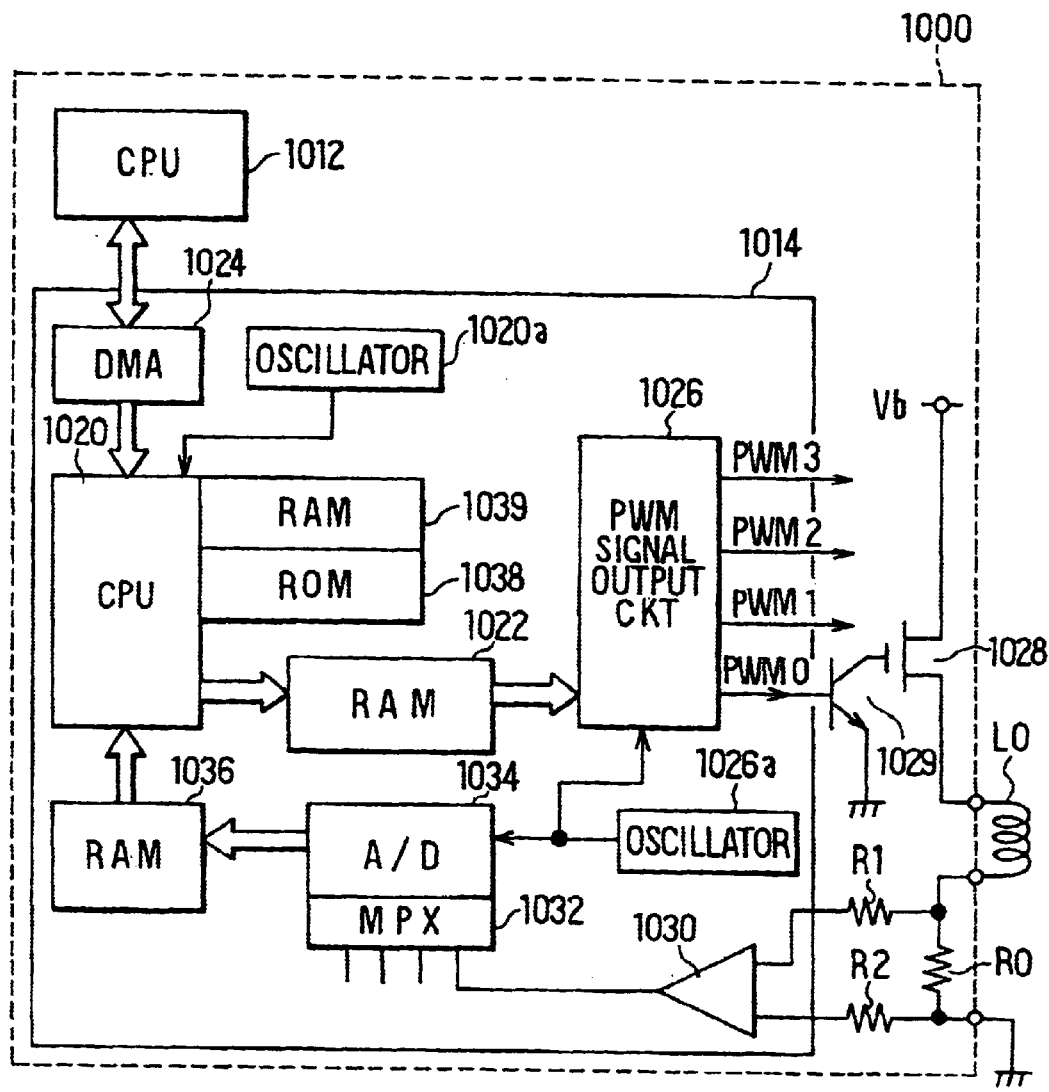
FIG. 19 is a schematic structural view depicting the structure of a vehicle linear-solenoid controller.

FIG. 19 is a block diagram showing the structure of a vehicle linear-solenoid controller 1000 in which the seventh embodiment of the present invention is applied. The linear-solenoid controller 1000 according to the invention is for individually controlling conduction of a plurality (in the embodiment, four) of linear solenoids L0–L3 (the drawing shows only L0) for use in association with an internal combustion engine. The linear-solenoid controller 1000 is provided with a linear-solenoid control IC 1014 to perform feedback control for current to the respective linear solenoids L0–L3 based on data indicating the target current value allowed to flow to the respective linear solenoids L0–L3 calculated by a host CPU 1012.

The IC 1014 is provided with a control CPU 1020 to calculate a duty for driving the solenoids L0–L3 with a pulse-width-modulated signal and for storing the calculated result in a RAM 1022 as pulse-width-modulated data. Also, a direct memory access circuit (DMA) 1024 acquires the target current values of the solenoids L0–L3 from a RAM incorporated within the host CPU 1012 and inputs these target current values to the control CPU 1020. A pulse-width-modulated signal output circuit 1026 respectively acquires the pulse-width-modulated data for the L0–L3 from a RAM for pulse-width-modulated data-transfer use 1022 and respectively generates pulse-width-modulated signals PWM0, PWM1, PWM2, and PWM3 for driving the solenoids L0–L3.

Meanwhile, the linear solenoid L0 which is the current control target is disposed in a conduction path from a power-source line connected to a battery. A FET 1028 is disposed in the conduction path on the power-source line side of the linear solenoid L0 as what is termed a high-side switch. Additionally, the connector of an NPN transistor 1029 whose emitter is grounded is connected to the FET 1028 gate.

The NPN transistor 1029 is for switching on the FET 1028 by grounding the gate of the FET 1028. The pulse-width-modulated signal PWM0 for energizing the linear solenoid L0 is input to the base of the NPN transistor 1029 from the pulse-width-modulated signal output circuit 1026. As a result, the NPN transistor 1029 and the FET 1028 are switched on when the signal PWM0 goes high, creating continuity of the conduction path from the battery to the linear solenoid L0. Conversely, when the pulse-width-modulated signal PWM0 goes low, the NPN transistor 1029 and the FET 1028 are switched off and the conduction path of the linear solenoid L0 is interrupted.

Switching elements similar to those of the linear solenoid L0 are provided for the other linear solenoids L1–L3 (not illustrated) as well, switching the respective switching elements on and off according to the pulse-width-modulated signals PWM1–PWM3 output from the circuit 1026 and enabling duty control of the current to the solenoids L1–L3.

A resistor R0 for current-detecting use is disposed in the conduction path on the ground-line side of the respective linear solenoids L0–L3 to enable detection of the current to the solenoids L0–L3 from the two end voltages thereof. The end voltages of the resistor R0 are input through resistors R1 and R2 to a differential amplifier 1030, and after being amplified, are selectively input through a multiplexer 1032 for signal-selecting use to an analog-to-digital converter 1034.

Accordingly, the analog-to-digital converter 1034 sequentially acquires, through the multiplexer 1032 and at a fixed analog-to-digital conversion cycle, a current detection voltage signal indicating the current to the respective linear solenoids L0–L3. The analog-to-digital converter 1034 then converts the current detection signal to a digital value and stores the digital value (i.e., the detected-current value) in a RAM 1036 for analog-to-digital data-transfer use.

The RAM 1036 can be accessed from the control CPU 1020 as well. On the control CPU 1020 side, the sum of the detected-current values of each of the respective linear solenoids L0–L3 stored in the RAM 1036 is calculated at high speed using for example a digital signal processor (DSP) or the like, and the mean value of current to the solenoids L0–L3 is determined from the calculated result. The duty of the pulse-width-modulated signals PWM0–PWM3 is calculated so that the mean current value becomes the target current value of the solenoids L0–L3 respectively input through the DMA 1024. Pulse-width-modulated data for energizing the solenoids L0–L3 is established on a basis of the calculated duty, and is stored in the RAM 22.

A ROM 1038 for storing a program for processing-execution use and various data items and a RAM 1039 for temporarily storing data for control use during processing execution are connected to the CPU 20. The control CPU 1020 is actuated on receiving a clock signal generated by a dedicated oscillator 1020a, and the circuit 1026 and the analog-to-digital converter 1034 are actuated on receiving a clock signal generated by an oscillator 1026a for pulse-width-modulated signal-generating use which differs from the oscillator 1020a. That is to say, the pulse-width-modulated signal output circuit 1026 and the analog-to-digital converter 1034 operate at Synchronization with the clock signal from the same oscillator 1026a, and the control CPU 1020, unlike the circuit 1026 and the analog-to-digital converter 1034, operates asynchronously from these several circuits according to the clock signal from the oscillator 1020a.

The configuration of the RAM for pulse-width-modulated data-transfer use 1022 and the RAM for analog-to-digital data-transfer use 1036, and the structure of the data stored in these several portions, will be described next.

As shown in FIG. 20A, the RAM for pulse-width-modulated data-transfer use 1022 is capable of storing three types of data: (1) data indicating cycles CYCL(0)–CYCL(3) of pulse-width-modulated signals PWM0–PWM3 for respectively duty-driving the four linear solenoids L0–L3; (2) data indicating "on" times TON(0)–TON(3) for making the signals PWM0–PWM3 go high within one cycle of the respective signals PWM0–PWM3 and switching on the switching elements disposed in the conduction paths of the respective solenoids L0–L3; and (3) update flags OVW(0) –OVW(3) indicating whether the data has just been updated by the control CPU 1020 or whether the data has already been utilized in pulse-width-modulated signal generation after data has been updated.

Accordingly, the pulse-width-modulated data in the RAM 1022 is updated each time the control CPU 1020 calculates the duty for driving the solenoids L0–L3. The update flags OVW(0)–OVW(3) are set at each of these updates (OVW←high). Additionally, the circuit 1026 generates a pulse-width-modulated signal for driving the solenoids L0–L3 by acquiring pulse-width-modulated data from the RAM 1022. However, when the corresponding update flags OVW(0)–OVW(3) are set at the time when the pulse-width-modulated is read, the pulse-width-modulated signal output circuit 1026 stores the fact that the values of the pulse-width-modulated data have not just been updated by resetting these update flags (OVW←low).

Meanwhile, as shown in FIG. 20B, the RAM 1036 can store, in each of respective channels ch0–ch3, 16 portions of past data values corresponding to the solenoids L0–L3 as respective data values (detection conversion values) of channel 0 (ch0) through channel 3 (ch3). Accordingly, the analog-to-digital converter 1034 respectively stores 16 past portions of the most recent detected current values in each of the several channels ch0–ch3 by storing, with respect to for example the detected current values of the linear solenoid L0, dat[0,0], dat[0,1], . . . , dat[0,15] in the data-storage region for channel 0 (ch0), and thereafter sequentially updating the detected current values in data-number sequence.

As shown in FIG. 20C, the analog-to-digital converter 1034 incorporates a RAM 1034a for temporarily storing analog-to-digital converted values ad[0]–ad[3π] of current corresponding to the channels ch0–ch3 before storing the detected current values dat[*,*] of the channels in the RAM 1036.

Next, the control processing executed by the analog-to-digital converter 1034, the control CPU 1020, and the pulse-width-modulated signal output circuit 1026 for conduction control of the linear solenoids in the linear-solenoid controller according to the present invention will now be described.

Figure 21:
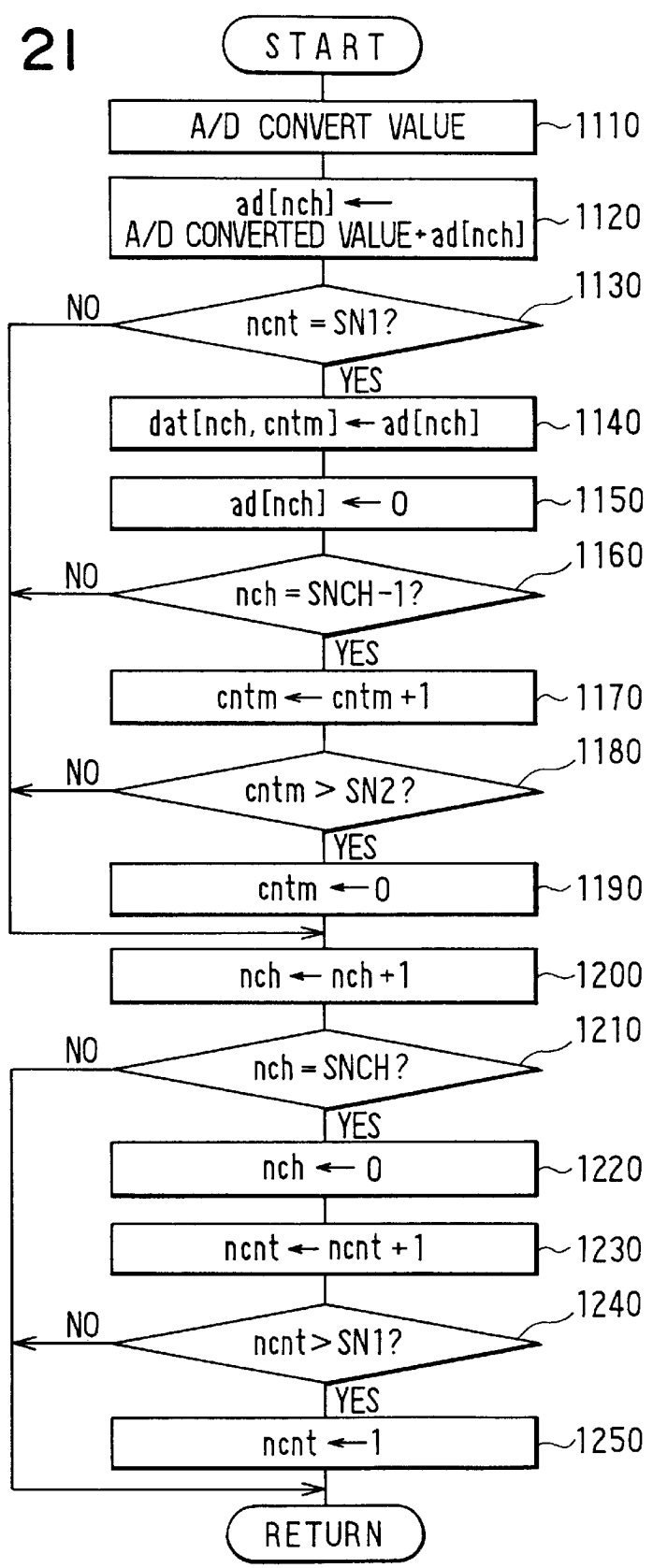
FIG. 21 is a flow diagram showing analog-to-digital conversion processing executed by an analog-to-digital converter.
Figure 22:
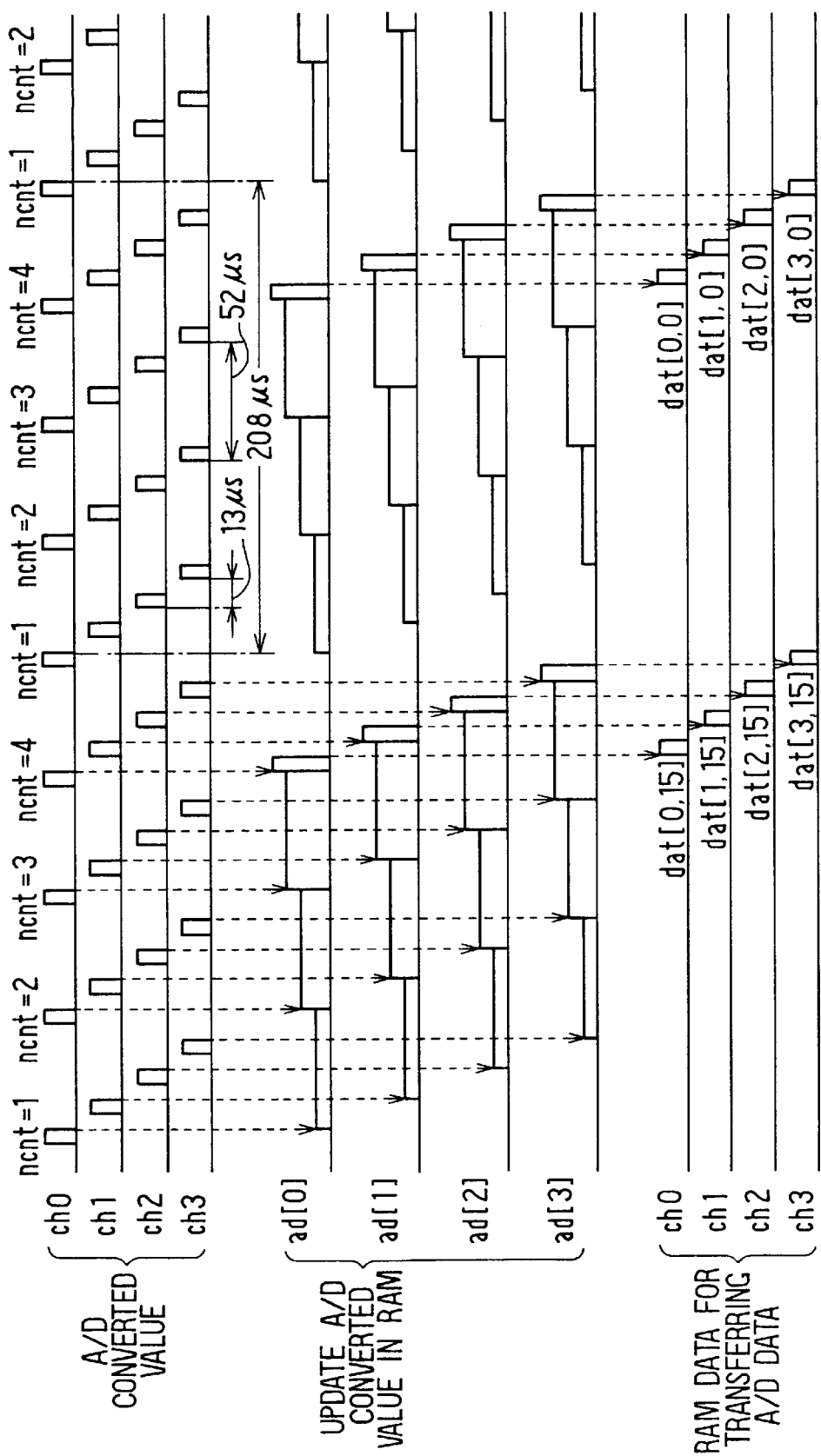
FIG. 22 is a timing diagram showing operation of the analog-to-digital converter.

FIG. 21 is a flow diagram showing analog-to-digital conversion processing repeatedly performed in the analog-to-digital converter 1034 for example at every 13 μsec, and FIG. 22 is a timing diagram for describing operation thereof.

To repeatedly execute analog-to-digital conversion according to the processing procedure which will be described hereinafter, the analog-to-digital converter 1034 is provided with a control portion made up of a logic circuit or a CPU for writing analog-to-digital converted values to the RAM 1034a, and for performing transfer of analog-to-digital converted values from the RAM 1034a to the RAM 1036, separately from the analog-to-digital conversion portion to perform analog-to-digital conversion of the input signals from the multiplexer 1032.

The analog-to-digital converter 1034 sequentially switches current-detection signals fetched through the multiplexer 1032 to the linear solenoids L0–L3 with each iteration of the analog-to-digital conversion processing. At S1110 (where S signifies "step"), the current-detection signal fetched through the multiplexer 1032 is acquired with analog-to-digital conversion. Next, at S1120, by adding the acquired analog-to-digital converted value to an analog-to-digital converted value ad[nch] stored in a specific channel region in the RAM 1034a corresponding to this the analog-to-digital converted value, the value ad[nch] in the RAM 1034a is updated, and execution proceeds to S1130. Here, nch indicates the channel number, and is specified by the value of a counter nch (which will be described later) which is sequentially updated to one of 0 through 3 each time the relevant processing is executed.

Briefly, at each iteration of analog-to-digital conversion processing, the analog-to-digital converter 1034 sequentially converts the current-detection signals from the differential amplifier 1030 provided for the solenoids L0–L3 as analog-to-digital converted values of ch0–ch3, and sequentially updates the several analog-to-digital converted values ad[0]–ad[3] in the RAM 1034a by adding these values to the corresponding values ad[nch] already stored in the RAM 34a.

Accordingly, at S1130, it is determined whether the value of a counter ncnt for counting the number of additions of the analog-to-digital converted value ad[nch] stored in the memory region for the several channels ch0–ch3 of the RAM 1034a has reached a predetermined addition count SN1 such as, for example, a count of 4. When the value of the counter ncnt reaches the addition count SN1 (in other words, when the analog-to-digital converted value ad[nch] of the specified channel (nch) updated at S1120 is the value obtained by adding the four most recent analog-to-digital conversion results for the channel), execution proceeds to S1140. This is achieved by transferring, as a detected-current value dat[nch, cntm] indicating a detected-current value, the analog-to-digital converted value ad[nch] stored in the memory region for the channel (nch) to a corresponding address [nch, cntm] in the RAM 1036, the detected-current vale dat[nch, cntm] at that address is rewritten, and at S1150, the detected-current value ad[nch] stored in the RAM 1034a is updated to an initial value of "0."

At S1160, it is determined whether the channel number (nch) of the analog-to-digital converted value ad[nch] updating the detected-current value dat[nch, cntm] in the RAM for analog-to-digital data-transfer use 1036 matches a value obtained by subtracting a value of "1" from the number of channels SNCH of the control target linear solenoids L0–L3. Stated another way, it is determined whether all updating of the "cntm"th detected-current value dat[0, cntm] through dat[3, cntm] of the channels ch0–ch3 of the RAM 1036 has been completed.

When an affirmative determination is made at S1160, the counter cntm for specifying the address of the RAM 1036 to be updated next is then incremented at S1170 to enable updating of the "cntm+1"th detected-current value dat[0, cntm+1] through dat[3, cntm+1] of the several channels ch0–ch3 of the RAM 1036 in processing thereafter.

When the value of the counter cntm is updated in this way, it is then determined whether the value of the counter cntm has exceeded, due to the updating, a maximum address value SN2 such as, for example, 15, at which a detected-current value is storable for each of the respective channels in the RAM 1036. When the value of the counter cntm has exceeded the maximum address value SN2, the value of the counter cntm is set to a value of "0" which is the minimum address value at which a detected-current value is storable for each of the respective channels in the RAM 1036. Execution then proceeds to S1200, and the value of the counter nch indicating the next channel to be digitally converted and data updated is incremented.

At S1200, when the value of the counter nch is incremented, execution advances to S1210. At S1210, it is determined whether the updated value of the counter nch has reached the number of channels SNCH of the control target linear solenoids L0–L3. Stated another way, it is determined whether the value of the counter nch has exceeded a value of "0" through "3" taken as the channel number.

When it is determined at S1210 that the value of the counter nch has reached the number of channels SNCH, at S1220, the value of the counter nch is set to an initial value of "0." At S1230, the value of the counter nch indicating the number of additions of the analog-to-digital converted value ad[nch] in the RAM 1034*a* is updated by incrementing the value of the counter ncnt. At S1240, it is determined whether the value of the updated counter ncnt has exceeded a predetermined number of additions SN1. When the value of the counter ncnt has exceeded the number of additions SN1, at S1250 the value of the counter ncnt is set to an initial value of "1," and the processing ends.

Conversely, when determined at S1240 that the value of the updated counter ncnt has not exceeded the number of additions SN1, or when determined at S1210 that the value of the counter nch has not reached the number of channels SNCH of the solenoids L0–L3, the processing ends without further execution.

As shown in FIG. 22, the analog-to-digital converter 34 sequentially performs analog-to-digital conversion of the current-detection values of the solenoids L0–L3 at the analog-to-digital conversion cycle (13 μsec) established by the generation cycle of the clock signal from the oscillator 1026*a*, and sequentially stores the converted values in the RAM 1034*a* of the channels ch0–ch3 corresponding to the converted values. Further, when converted values ad[0]–ad [3] are already stored in the memory region, the converted values ad[0]–ad[3] in the RAM 1034*a* are updated by adding new analog-to-digital converted values to the stored converted values.

The above updating is performed four times, and when the converted values ad[0]–ad[3] in the RAM 1034*a* become the sum of converted values of four analog-to-digital conversions, the values ad[0]–ad[3] in the RAM 1034*a* are respectively stored in the corresponding address regions of the RAM 1036 as single data dat[0, *]–dat[3, *] indicating a detected-current value, and the values ad[0]–ad[3] in the RAM 1034*a* are initialized to a value of "0." Also, when writing detected-current values to the RAM 1036, the detected-current values are sequentially written to each address from "0" to "15" determined by the value of the counter cntm for each respective channel ch0–ch3. When the address of the several channels ch0–ch3 where the detected-current values are written reaches "15," the detected-current values are again rewritten, starting with the memory region of address "0."

For this reason, analog-to-digital conversion of current flowing to the solenoids L0–L3 is performed every 52 μsec, and the sum of analog-to-digital converted values of four analog-to-digital conversions is sequentially stored every 208 μsec in the RAM 1036 as a detected value of current flowing to the solenoids L0–L3. Because of this, the newest analog-to-digital conversion results which undergo analog-to-digital conversion every 52 μsec are stored in a span of 3,328 μsec (208 μsec×16) for each of the respective channels ch0–ch3 (that is, each of the respective linear solenoids L0–L3) in the RAM 1036, and updating delay for these results is 208 μsec at most.

Further, the 16 detected-current values obtained through the analog-to-digital converter 1034 in the span of 3,328 μsec are stored in the RAM 1036, and the time (3,328 μsec) corresponds one cycle of pulse-width-modulated signals generated by the signal output circuit 1026.

Figure 23:
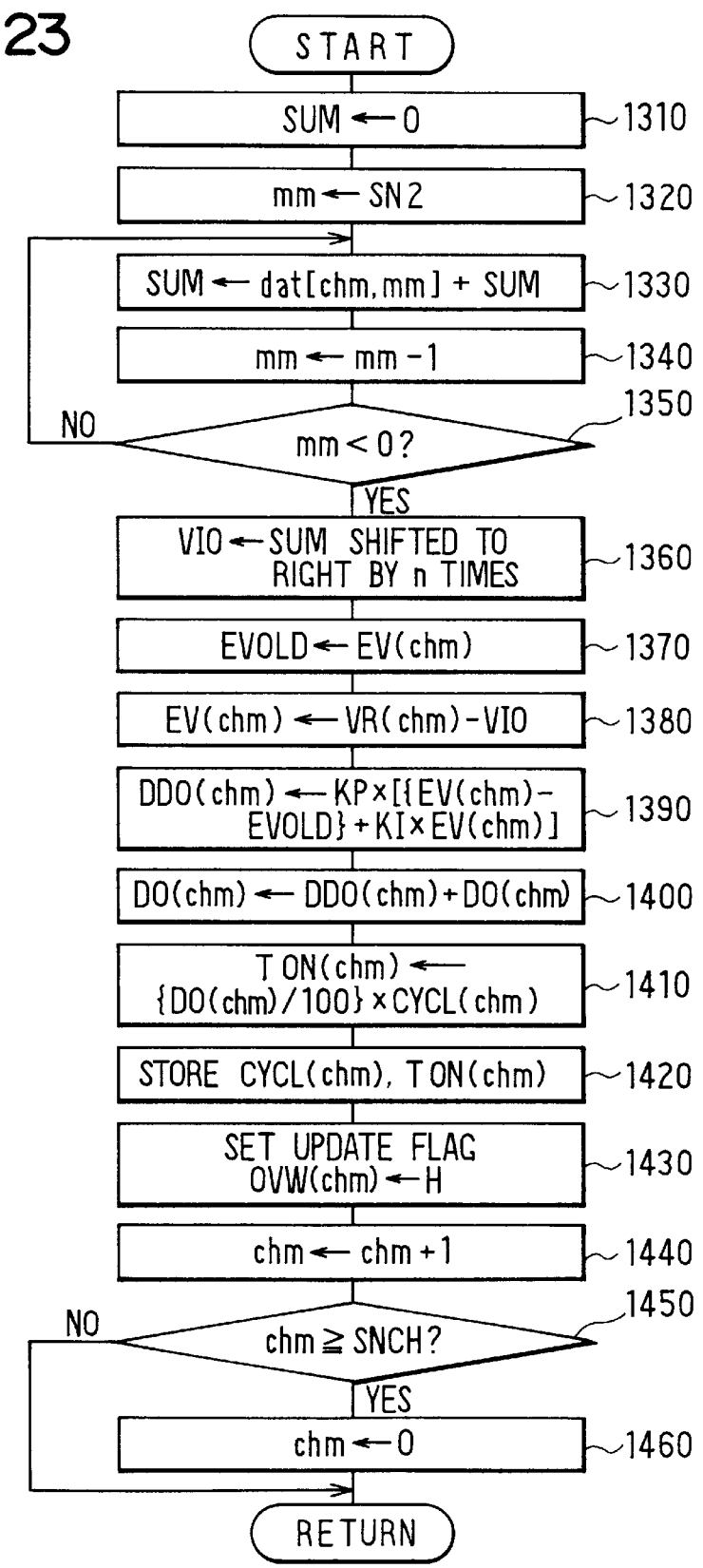
FIG. 23 is a flow diagram showing control-quantity processing executed by a control CPU.
Figure 24:
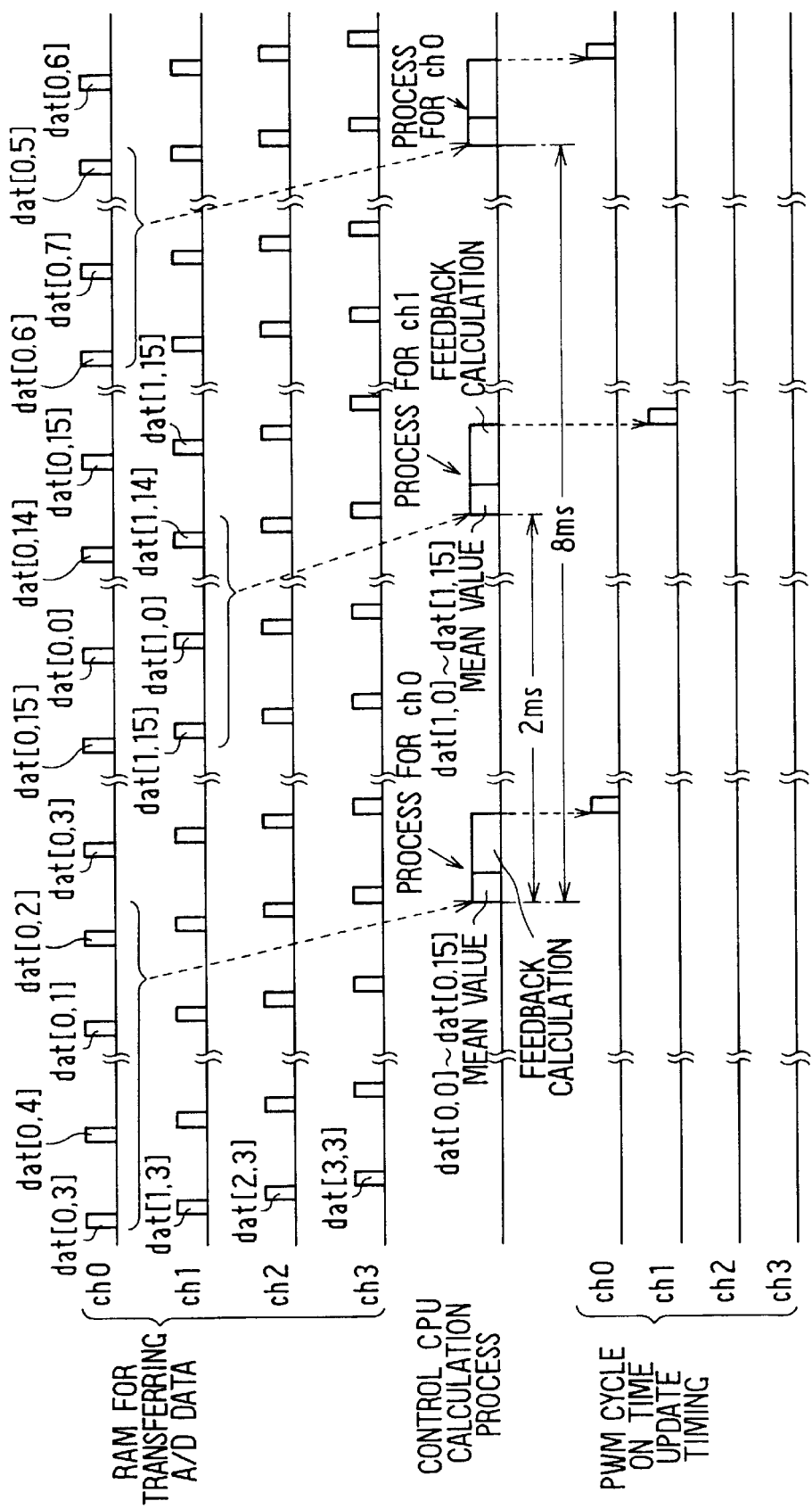
FIG. 24 is a timing diagram showing operation of the control CPU.

Next, FIG. 23 is a flow diagram showing control-quantity processing repeatedly performed in control CPU 1020 for example at every 2 msec, and FIG. 24 is a timing diagram for describing operation thereof.

As shown in FIG. 23, with the control-quality processing, at S1310, arithmetic data (hereinafter termed "current sum value") SUM indicating the sum of the current values stored in each of the several channels ch0–ch3 in the RAM 1036 is initialized to "0." At S1320, the maximum address value SN2 of the RAM 36 is set in a counter mm. At S1330, a detected-current value dat[chm, mm] of an address corresponding to the value of the counter mm is read from among the detected-current value of a channel chm stored in the RAM 1036, and the current sum value SUM is updated by adding the detected-current value dat[chm, mm] to the current sum value SUM. Further, at S1340, the value of the counter mm is decremented, and at S1350, it is determined whether the value of the counter mm has become negative. When the value of counter mm is not negative, execution proceeds to S1330.

Briefly, in the processing of S1310–S1350, the 16 detected-current values [chm, 0]–[chm, 15] of the channel chm stored in the RAM 1036 are sequentially acquired, starting with detected-current value [chm, 15], which has the largest address. The sum of the 16 detected-current values [chm, 0]–[chm, 16] is calculated. The channel chm of the detected-current values acquired at S1330 is specified by the value of the counter chm updated sequentially to 0, 1, 2, or 3 each time the processing is executed.

Next, when it is determined at S1350 that the value of the counter mm has become negative, execution proceeds to S1360 and a mean current value VIO is calculated by shifting the current sum value SUM to the right n times (according to the embodiment, six times).

That is to say, the number of analog-to-digital converted values per analog-to-digital conversion making up the sum value SUM is 64 (4×16), or $2^6$. Accordingly, to divide the digital data by $2^n$, it is sufficient to shift the digital data to the right by the value of the exponent n of the value to be divided, and either discard the lower n bits of the digital data or take the upper bit data for the data to the right of the decimal point. In this regard, at S1350, to determine the analog-to-digital converted value per analog-to-digital conversion (SUM/$2^6$) from the current sum value SUM, the mean of the analog-to-digital converted values VIO is calculated by shifting the current sum value SUM which is digital data to the right by the value of the exponent n (6) of $2^n$, the value to be divided When the mean current value VIO is calculated in this way, a duty D0(chm) for duty-driving the linear solenoid of the channel chm is determined based on a deviation EV(chm) between the mean current value VIO and a target current value VR(chm) fetched from the host CPU 1012 through the DMA 1024, and feedback computation is performed based on the duty to calculate the pulse-width-modulated data to write to the RAM 1022 (S1370–S1410).

In the feedback computation, the previously determined deviation value EV(chm) of the channel chm is set to EVOLD (S1370). Thereafter, the deviation EV(chm) between the mean current value VIO of the channel chm just determined at S1360 and the target current value VR(chm) is calculated (S1380), and a correction value DD0(chm) of the duty D0(chm) is determined based on the equation hereinafter, taking the deviation EV(chm), the previous determined deviation EVOLD, and predetermined control gains KP and KI (KP: proportional gain; KI: integral gain) as parameters (S1390):

$$DD0=KP\times[\{EV(chm)-EVOLD\}+KI\times EV(chm)]$$

Accordingly, the duty D0(chm) is updated by adding the correction value DD0(chm) to the presently established duty D0(chm) of the channel chm (S1400). The "on" time TON (chm) of the switching element (the NPN transistor 1029 and the FET 1028) per pulse-width-modulated signal cycle is calculated from the equation hereinafter of the updated duty DO(chm) and the pulse-width-modulated signal cycle CYCL(chm) predetermined with respect to the linear solenoid L(chm) of the channel chm (S1419).

$$TON(chm)=(D0\ (chm)/100)\times CYCL(chm)$$

In the foregoing equation, the duty DO(chm) is divided by "100" because the duty DO(chm) is a percentage (%) unit.

Next, when the "on" time TON(chm) of the switching element is calculated as pulse-width-modulated data of the channel chm in this way, at S1420, the "on" time TON(chm) and the pulse-width-modulated signal cycle CYCL(chm) are respectively stored in the address region of the corresponding channel in the RAM 1022. At S1430, the data for the linear solenoid L(chm) of the channel chm in the RAM 1022 is rewritten by setting the update flag OVW(chm) of the channel chm in the RAM 1022.

Accordingly, at S1450, the value of the counter chm specifying the channel of the target linear solenoid L(chm) is incremented. At S1450, it is determined whether the value of the counter chm greater than or equal to the number of channels SNCH of the linear solenoids L0–L3. When the value of the counter chm is greater than or equal to the number of channels SNCH, at S1460 the value of the counter chm is set to an initial value of "0" and the processing ends. Conversely, when the value of the counter chm is less than the number of channels SNCH, the processing ends with no further execution performed.

As described above, the control CPU 1020 determines the mean value VIO of current flowing to the linear solenoid L(chm) specified by the value of the counter chm at every predetermined processing cycle (2 msec), calculates the duty for driving the linear solenoid L(chm) from the mean current value VIO and the target current value VRR, and rewrites the pulse-width-modulated data of the channel chm in the RAM 1022 according to the duty. Thus, the pulse-width-modulated data of the channels ch0–ch3 in the RAM 1022 is rewritten every four executions of the control-quantity processing (stated another way, every 8 msec) by sequentially updating the value of 0, 1, 2, or 3 of the channel chm through S1440–S1460 each time the rewriting of the pulse-width-modulated data ends (refer to FIG. 24).

Accordingly, the mean current value is set with a value obtained by adding all 16 detected-current values in the RAM 36 then dividing the value (current sum value) SUM by the number of analog-to-digital conversions 64 (4×16) on the analog-to-digital converter 1034 side for each of the several channels. Because of this, the mean current value is the mean value of current flowing to the linear solenoids during an interval of 3,328 msec, which is the time of one pulse-width-modulated signal cycle, and the delay from the actual value of the mean current time employed in control is 208 used at most.

Figure 25:
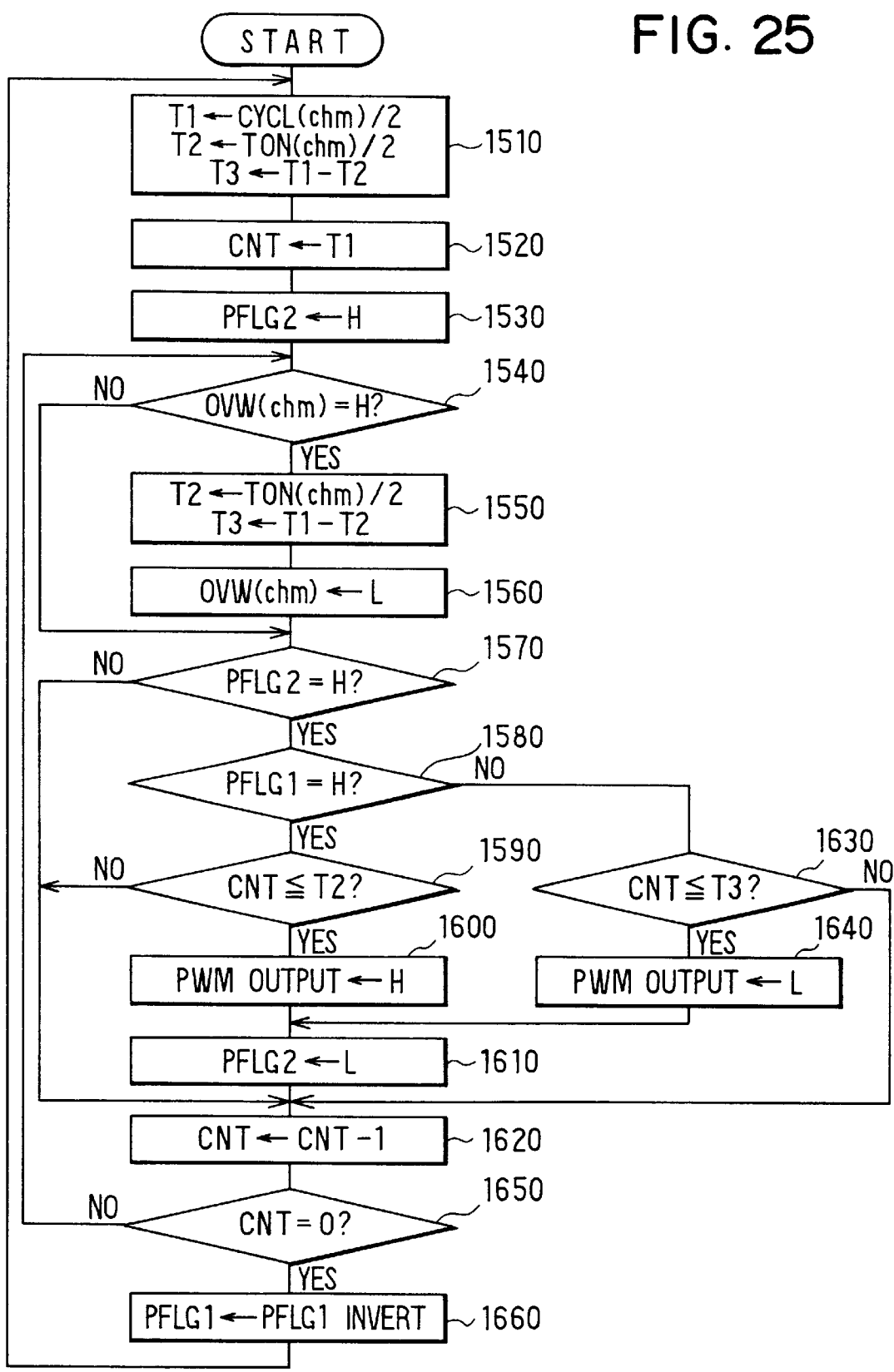
FIG. 25 is a flow diagram showing pulse-width-modulated signal-output processing executed by a pulse-width-modulated signal output circuit.
Figure 26:
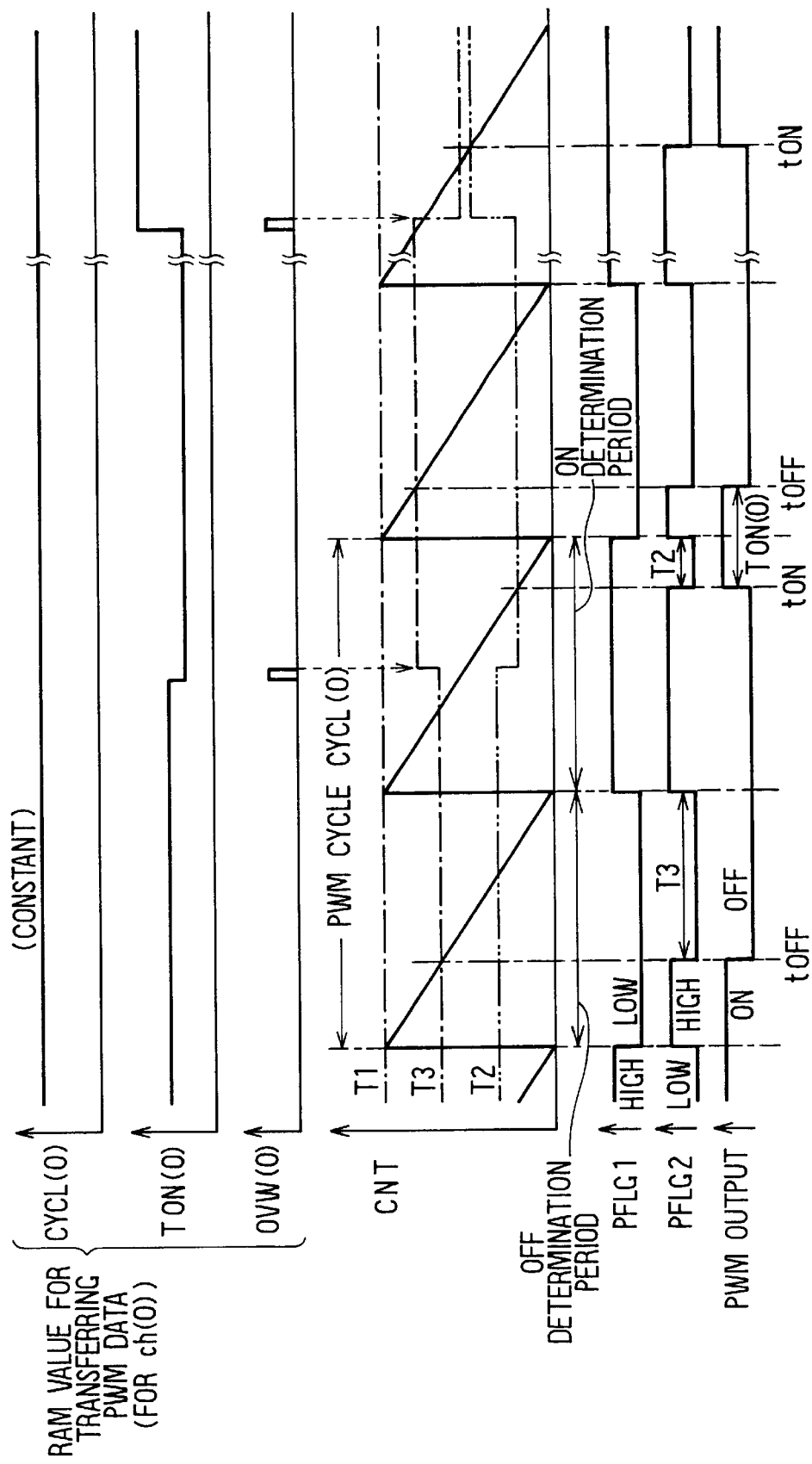
FIG. 26 is a timing diagram showing operation of the pulse-width-modulated signal output circuit.

Next, FIG. 25 is a flow diagram showing pulse-width-modulated signal-output processing executed individually for the four linear solenoids L0–L3, and FIG. 26 is a timing diagram for describing operation thereof.

The pulse-width-modulated signal-output processing described hereinafter is actually achieved by logic circuitry disposed in each of the solenoids L0–L3.

As shown in FIG. 25, in pulse-width-modulated signal-output processing, at S1510, the cycle CYCL(chm) of the pulse-width-modulated signal and the "on" time TON(chm) corresponding to the linear solenoid L(chm) which is the control target are acquired from the RAM 1022. Additionally, a time of one-half of this acquired cycle CYCL(chm) is set to a cycle time T1, a time of one-half of the "on" time TON(chm) is set to an "on" time for pulse-width-modulated signal-inversion use T2, and a time obtained by subtracting the time T2 from the time T1 is set to an "off" time for pulse-width-modulated signal-inversion use T3. At S1520, a counter for clocking use CNT is set to the cycle time T1, and at S1530, an output-inversion permission flag PFLG2 for the pulse-width-modulated signal is set (PFLG2←high).

Next, at S1540, an update flag OVW(chm) corresponding to the linear solenoid L(chm) which is the control target is acquired from the RAM 1022, and it is determined whether this update flag OVW(chm) has been set high. When the update flag OVW(chm) has not been set, execution proceeds to S1570. When the update flag OVW(chm) has been set, at S1550 the "on" time T2 and the "off" time T3 are set using a procedure similar to the above-described S1510. At S1560, the update flag OVW(chm) in the RAM 1022 is reset to low, and execution then proceeds to S1570.

At S1570 it is determined whether the output-inversion permission flag PFLG2 has been set high. When the output-inversion permission flag PFLG2 has been set, then at S1580 it is determined whether a determination-period discrimination flag PFLG1 has been set high. The determination-period discrimination flag PFLG1 indicates whether a determination period for inverting the pulse-width-modulated signal from low to high ("on" determination period) is presently obtained, or whether a determination period for inverting the pulse-width-modulated signal from high to low ("off" determination period) is presently obtained.

At S1580, when it is determined that the determination-period discrimination flag PFLG1 has been set, the "on" determination period is presently obtained, and execution proceeds to S1590, where it is determined whether the value of the clocking-use counter CNT is the "on" time T2 or less. When the value of the clocking-use counter CNT is the "on" time T2 or less, then at S1600 the output level for pulse-width-modulated signals is set high, and at S1610 the output-inversion permission flag PFLG2 is reset to low before execution proceeds to S1620.

Meanwhile, when it is determined at S1580 that the flag PFLG1 has not been set, the "off" determination period is presently obtained, and execution proceeds to S1630, where it is determined whether the value of the clocking-use counter CNT is the "off" time T3 or less. When the value of the clocking-use counter CNT is the "off" time T3 or less, at S1640 the output level for pulse-width-modulated signals is set low, at S1610 the output-inversion permission flag PFLG2 is reset to low, and thereafter execution proceeds to S1620.

When it is determined at S1570 that the output-inversion permission flag PFLG2 has not been high or when it is determined at S1590 that the value of the clocking-use counter CNT is not the "on" time T2 or less, execution proceeds to S1620.

At S1620, the clocking-use counter CNT is decremented. Further, at S1650 it is determined whether this clocking-use counter has reached "0." When the clocking-use counter has not reached "0," execution again proceeds to S1540. Conversely, when the clocking-use counter has reached "0," and at S1660 the set/reset status of the flag PFLG1 is inverted and execution proceeds to S1510.

In this processing, one-half of the cycle of the pulse-width-modulated signals to be output is repeatedly clocked utilizing the clocking-use counter CNT by writing to the counter CNT as the cycle time T1 a time of one-half of the cycle CYCL(chm) of the signals to be output to the switching element to control current to the target linear solenoid L(chm) (S1520), counting down the cycle time T1 by decrementing this count value at a fixed cycle (S1620), and when this count value reaches "0," again writing the cycle time T1 to the counter CNT (S1520).

Each time this clocking of the cycle time T1 by the clocking-use counter CNT ends, by inverting the flag PFLG1 (S1660), half of one pulse-width-modulated signal cycle is set as the "on" determination period for switching on the switching element by inverting the signal from low to high, and the remaining half is set as the "off" determination period for switching off the switching element by inverting the signal from high to low. Accordingly, as is shown in FIG. 26, in the "on" determination period (S1580: "YES"), the pulse-width-modulated signal is inverted from low to high (S1600) at a time tON whereat the value of the clocking-use counter CNT (i.e., the remaining time of the cycle time T1) becomes a time (the "on" time T2) which is one-half of the "on" time for switching on the switching element per signal cycle. Conversely, in the "off" determination period (S1580: "NO"), the pulse-width-modulated signal is inverted from high to low (S1640) at a time tOFF whereat the value of the clocking-use counter CNT (i.e., the remaining time of the cycle time T1) becomes a time (the "off" time T3) which is one-half of the "off" time (CYCL(chm)−TON(chm)) for switching off the switching element per pulse-width-modulated signal cycle.

Additionally, for the cycle time T1, the "on" time T2, and the "off" time T3, each time the clocking of the time that is one-half of the pulse-width-modulated signal cycle time (that is to say, the cycle time T1) by the clocking-use counter CNT ends, the pulse-width-modulated data in the RAM 1022 is acquired and updated (S1510). Further, it is determined whether update flag OVW(chm) in the RAM 1022 has been set (whether the control CPU 1020 has rewritten the pulse-width-modulated data; S1540), even when clocking of the cycle time T1 by the clocking-use counter CNT is in progress. When the update flag OVW(chm) has been set, the "on" time T2 and the "off" time T3 are updated according to the new pulse-width-modulated data after updating (S1550).

Because of this, the signals output from the pulse-width-modulated signal output circuit 1026 can be converted to signals corresponding to new pulse-width-modulated data at either the rise or fall timing immediately after the pulse-width-modulated data has been updated, without the timing of either one or the other of the rise or fall timing being fixed as in an apparatus according to the prior art.

As has been described above, in a linear-solenoid controller for vehicle use according to the present embodiment, on the analog-to-digital converter 1034 side, the current-detection signal indicating the current flowing to each of the respective target linear solenoids L0–L3 undergoes analog-to-digital conversion at a fixed analog-to-digital conversion cycle (52 μsec), and the sum of the analog-to-digital converted values of four conversions thereof is stored as the detected-current value in the RAM 1036. On the control CPU 1020 side, the mean value of current flowing to the linear solenoids during the interval is determined from the 16 past detected-current values stored in the RAM for analog-to-digital data-transfer use 1036, and pulse-width-modulated data is generated from the mean current value and the target current value and written to the RAM 1022.

Figure 27A:
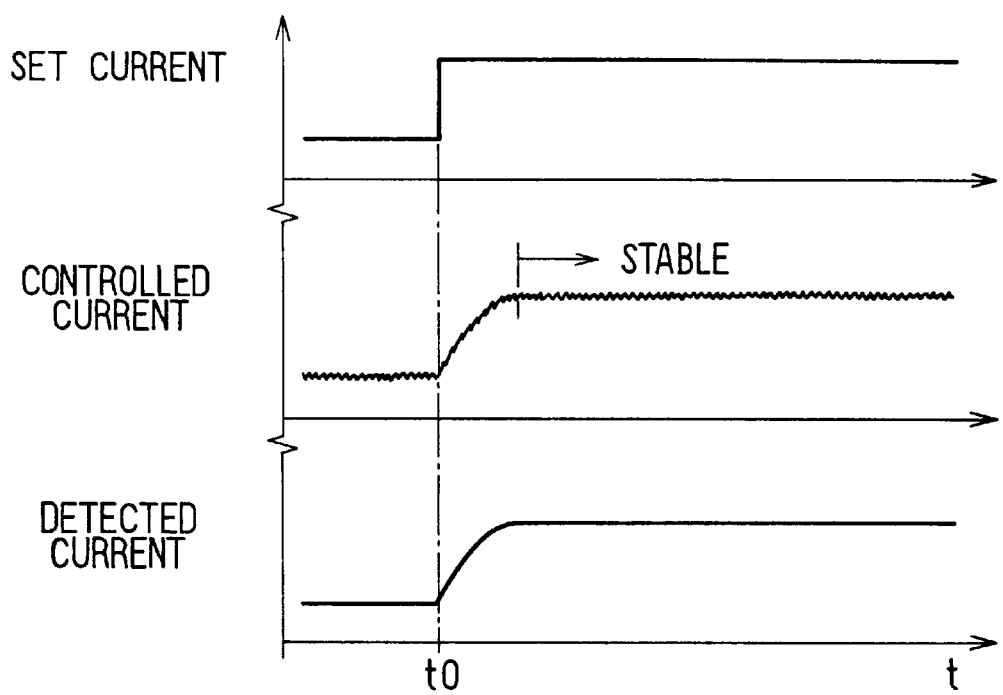
FIGS. 27A and 27B are explanatory diagrams for describing an effect of the embodiment.

Because of this, the delay of the mean current value calculated by the control CPU 1020 from the current value actually flowing to the linear solenoids is 208 μsec at most. Compared with an apparatus according to the prior art which smooths the current-detection signals using a lag circuit or the like, responsiveness lag in the current-feedback system can be suppressed, and as shown in FIG. 27A, the time from when the target value changes (time t0) until the control current actually flowing to the linear solenoids stabilizes can be shortened, and the responsiveness of control is enhanced.

Figure 27B:
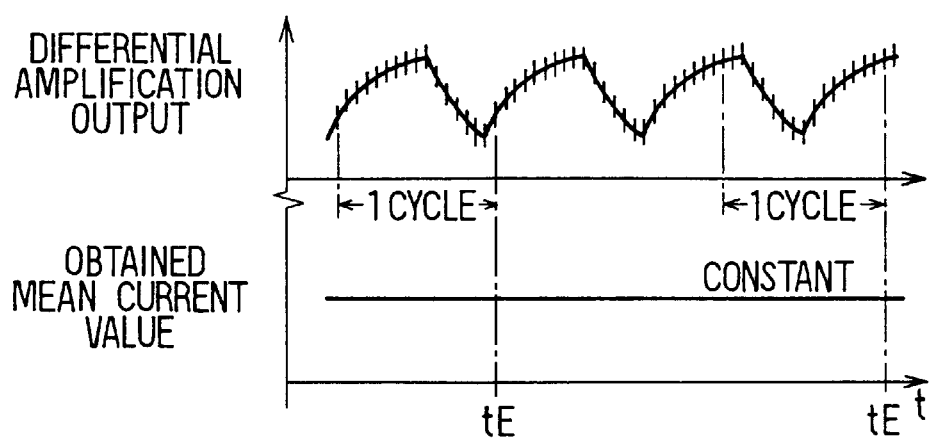

Additionally, the mean current value is determined from the sum of the detected-current values which have undergone analog-to-digital conversion by the analog-to-digital converter 1034 within the time per pulse-width-modulated signal cycle. Therefore, even when the processing timing tE of the control CPU 1020 determining the mean current value and the pulse-width-modulated signals are not synchronized, the obtained mean current value is always stable, and when the duty of the pulse-width-modulated signals is fixed and the current flowing to the linear solenoids is fixed, the obtained mean current value also is fixed, as shown in FIG. 27B. For this reason, according to the present embodiment, not only can control responsiveness be enhanced, but control stability is also enhanced.

Additionally, as was described above, during generation of the pulse-width-modulated signals on the pulse-width-modulated signal output circuit 1026 side, immediately after updating of the pulse-width-modulated data, the pulse-width-modulated signals can be made to correspond to the updated pulse-width-modulated data. Therefore, delay which occurs on the pulse-width-modulated signal output circuit 1026 side also can be reduced, and control responsiveness can be further improved.

Although the seventh embodiment according to the present invention has been described above, various modes of the embodiment may also be alternatively utilized.

As an example, in the foregoing embodiment, the processing cycle (the cycle of "on" TON) on the control-CPU side was longer than the time of one pulse-width-modulated signal cycle, as is understood from FIG. 26. However, it is also acceptable to establish the processing cycle on the control-CPU side as shorter than the time of one pulse-width-modulated signal cycle.

As another example, the foregoing embodiment was described as an apparatus wherein in the control-quantity processing executed in the control CPU 1020, the detected-current value dat[chm, mm] acquired from the RAM for analog-to-digital data-transfer use 1036 is added the current sum value SUM when calculating the current sum value SUM. With the present embodiment, however, the output (current-detection signal) from the differential amplifier 1030 which amplifies the differential of the two end voltages of the resistor R0 is input unmodified to the analog-to-digital converter 1034 through the multiplexer 1032. Therefore, the analog-to-digital conversion results of the analog-to-digital converter 1034 are subjected to the effects of noise overlaying the current-detection signal, potentially resulting in digitally converted abnormal current values.

Figure 28A:
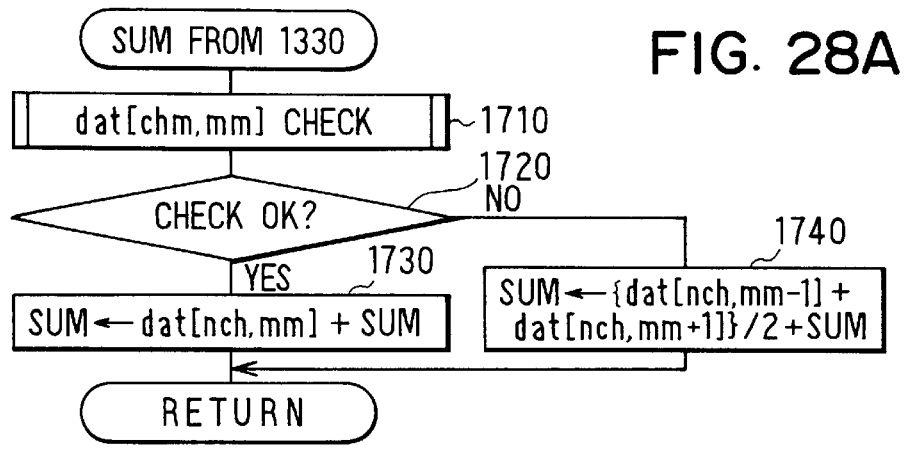
FIGS. 28A–28C are explanatory diagrams for describing another structural example of a vehicle linear-solenoid controller according to the embodiment.

In this regard, in the processing for calculating the current sum value SUM executed at S1330 in FIG. 23, it is acceptable to check the detected-current value dat[chm, mm] acquired from the RAM 1036 (S710), as shown for example in FIG. 28A. When the result of the check shows that the detected-current value dat[chm, mm] is a normal value (S720: "YES"), the current sum value SUM is updated by adding the detected-current value dat[chm, mm] without modification to the current sum value SUM (S1730).

However, when the detected-current value dat[chm, mm] is an abnormal value (S1720: "NO"), the current sum value SUM is updated by calculating the mean value "{dat[chm, mm−1]+dat[chm, mm+1]}/2" of the detected-current values dat[chm, mm−1] and dat(chm, mm+1] stored in the addresses (i.e., mm−1 and mm+1; when mm=0, mm−1 is taken to be the maximum address of 15, and when mm=15, mm+1 is taken to be the minimum address of 0) before and after the presently acquired detected-current value dat [chm, mm], and adding the mean value to the current sum value SUM (S1740).

That is to say, when the detected-current value dat[chm, mm] is an abnormal value, updating of the current sum value SUM with an abnormal detected-current value affected by noise is prevented by estimating the normal value of the detected-current value dat[chm, mm] from the mean value of the detected-current values dat[chm, mm−1] and dat[chm, mm+1] before and after, and adding the value to the current sum value SUM.

Accordingly, when this is done, the current sum value SUM and in turn the mean current value VIO can be determined with high accuracy without being affected by noise, and control accuracy can be improved.

Figure 28B:
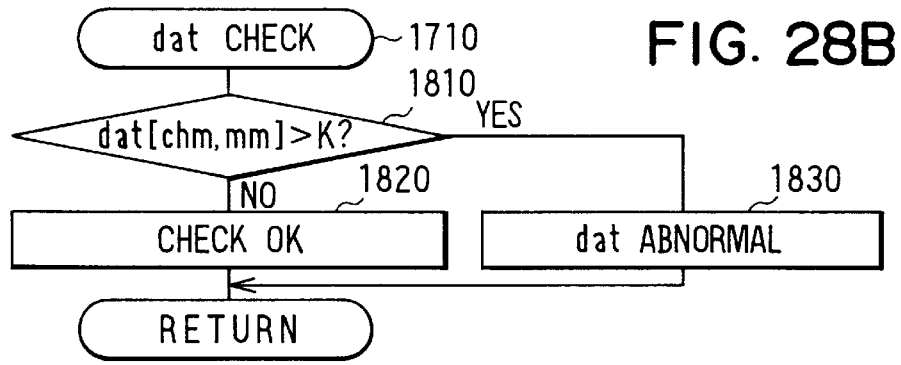

The checking processing of S1710 may, for example as shown in FIG. 28B, determine whether the detected-current value dat[chm, mm] exceeds a maximum value K (the value K may be predetermined ordinarily obtained (S1810). When the detected-current value dat[chm, mm] has not exceeded the maximum value K, the detected-current value dat[chm, mm] is determined to be a normal value (S1820). When the value dat[chm, mm] has exceeded the maximum value K, the detected-current value dat[chm, mm] is determined to be an abnormal value (S1830).

Figure 28C:
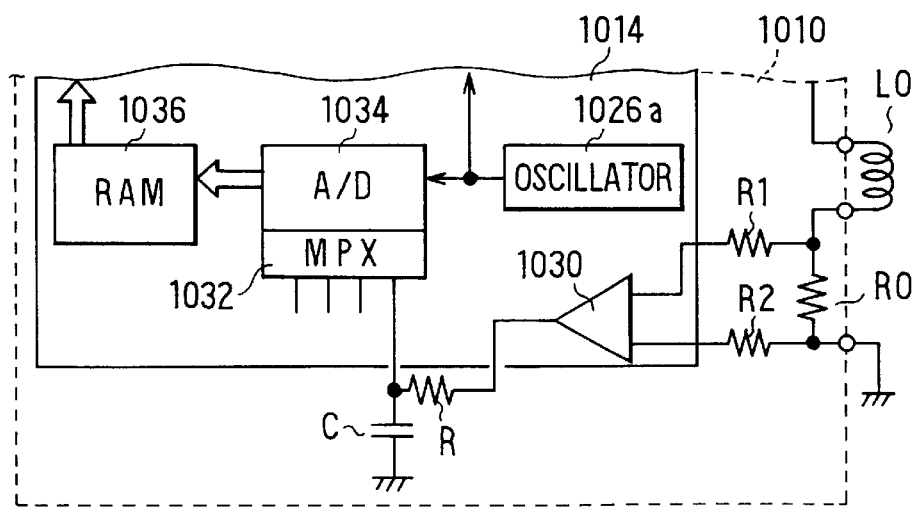
Figure 29:
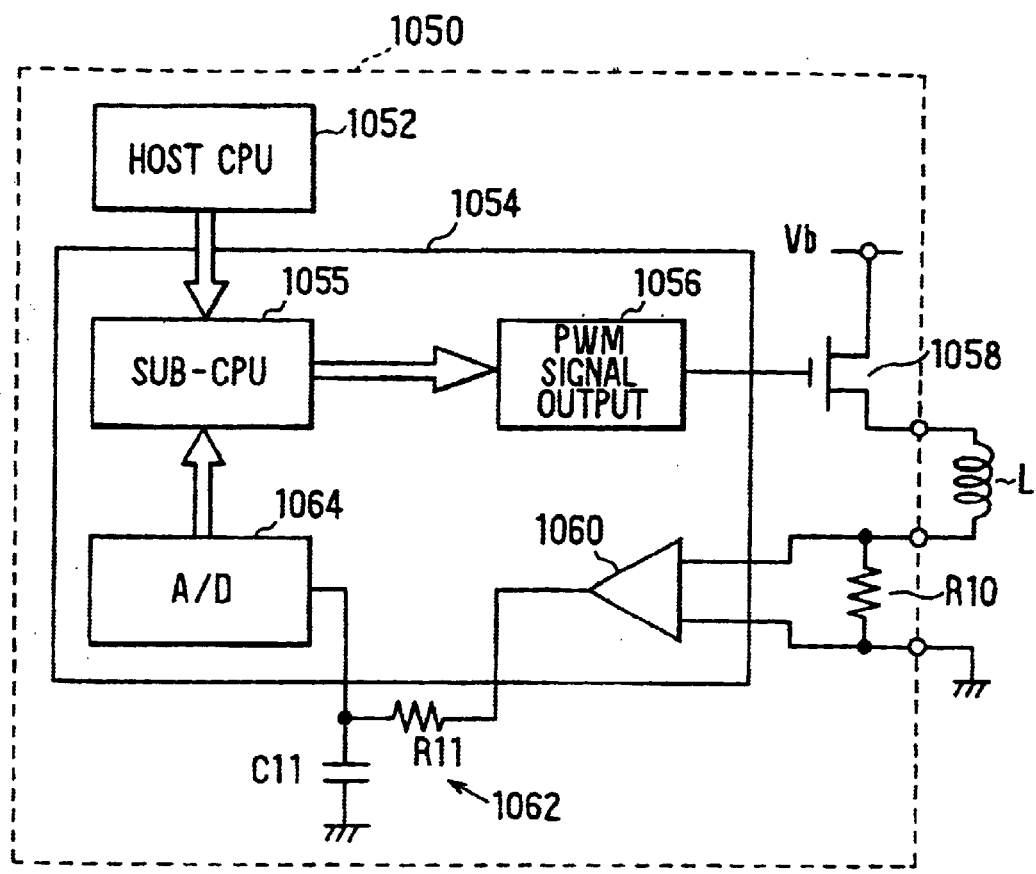
FIG. 29 is a schematic structural view depicting the structure of a linear-solenoid controller according to the prior art.
Figure 30A:
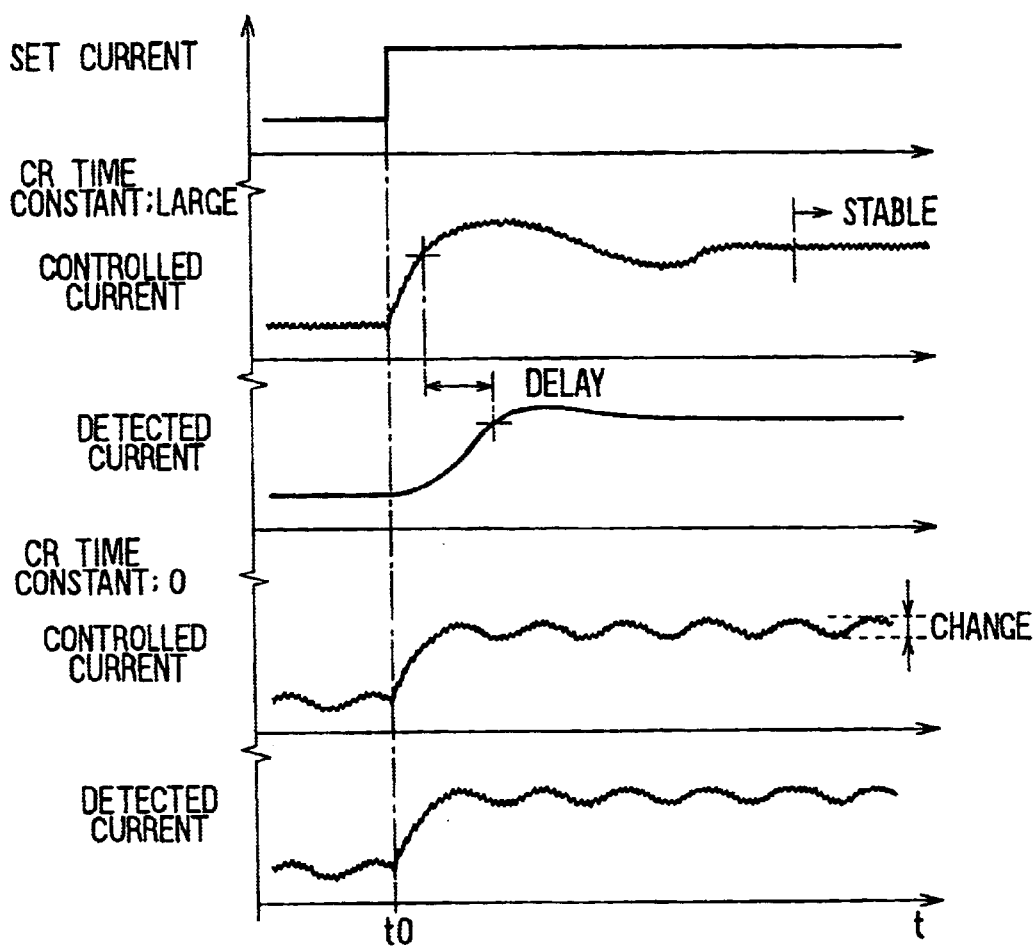
FIGS. 30A and 30B are explanatory diagrams for describing limitations associated with the prior art controller shown in FIG. 29.
Figure 30B:
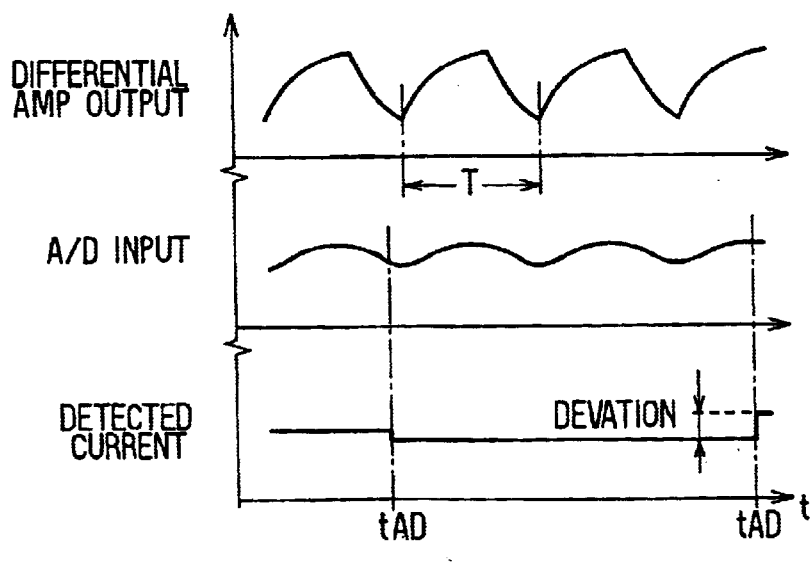

Additionally, to determine the mean current value VIO with high precision and without being affected by noise, it is acceptable, for example as shown in FIG. 28C, to provide a filter made up of a capacitor C and a resistor R in the input path of the current-detection signals from the differential amplifier 1030 to the multiplexer 1032, to directly eliminate noise from the current-detection signals input to the analog-to-digital converter 1034.

With the above-described embodiment, the control CPU 1020, the pulse-width-modulated signal output circuit 1026 and the analog-to-digital converter 1034, were described as respectively receiving clock signals from differing oscillators 1020*a* and 1020*b* and operating asynchronously. However, it is also acceptable to generate clock signals for actuating these several portions from a single oscillator, thereby simplifying the structure of the apparatus.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. An apparatus for conditioning analog signals for control use, comprising:
    an analog-to-digital converter for converting input signals to digital values at a conversion cycle shorter than an input cycle of said input signals;
    a data storage device for sequentially storing said digital values obtained from said analog-to-digital converter; and
    a processor for calculating a mean value by fetching said digital values at a cycle time m (where m is an integer) of said input signals from said data storage device, and for computing an arithmetic mean of said fetched digital values, for target control purposes.

2. A control apparatus, comprising:
    a detector for detecting a predetermined operating state of a control target, and for generating a detection signal changing at a fixed detection signal cycle in correspondence with said operating state;
    an analog-to-digital converter for fetching a detection signal from said detector and converting said detection signal to a digital value at a predetermined analog-to-digital conversion cycle; and
    a controller for controlling said control target based on a digital value acquired from said analog-to-digital converter;
    a storage device for storing said digital value converted by said analog-to-digital converter;
    said analog-to-digital converter for converting a detection signal from said detector to a digital value at an analog-to-digital conversion cycle shorter than said detection signal cycle, and for sequentially storing converted digital values in said storage device; and
    said controller including a calculator for calculating a mean value by fetching said stored digital values at a cycle time m (where m is an integer) of said detection signal from said storage device, for computing an arithmetic mean of said fetched digital values, and for utilizing a computed digital result of said calculator to control said control target.

3. A control apparatus as recited in claim 2, wherein:
    said detector detects a current flowing to an electrical load and changing at a fixed current cycle;
    said analog-to-digital converter converts said detection signal from said detector to said digital value at an analog-to-digital conversion cycle shorter than said fixed current cycle;
    said calculator calculates a current mean value of said current flowing to said electrical load by fetching said stored digital values from said storage device at said cycle time m of said current and computing an arithmetic mean of said fetched digital values; and
    said controller controls a predetermined operating state of a control target including said electrical load based on said mean current value of said electrical load computed by said calculator.

4. A current-control apparatus, comprising:
    a detector for detecting an electrical current flowing to an electrical load, said current being controlled by a pulse-width-modulated signal generated at a fixed control signal cycle;
    an analog-to-digital converter for converting a detection signal from said detector to a digital value at a predetermined analog-to-digital conversion cycle shorter than said fixed control signal cycle; and
    a controller for controlling a duty of said pulse-width-modulated signal so that a detected current value converted to a digital value by said analog-to-digital converter becomes a target current value;
    a data storage device for storing said detected current value converted to a digital value by said analog-to-digital converter;
    said analog-to-digital converter further for sequentially storing detection signals at said data storage device; and
    said controller including a calculator for calculating a mean current value within a cycle time m (where m is an integer) of the pulse-width-modulated-signal by fetching and computing an arithmetic mean of sequentially-stored detected current values, and for controlling a duty of said pulse-width-modulated signal based on a mean current value, calculated by said calculator, and said target current value.

5. A current-control apparatus as recited in claim 4, wherein said calculator fetches $2^n$ detected current values as detected current values for cycle time m of said pulse-width-modulated signal, calculates a sum of said detected current values, and calculates said mean current value from said sum.

6. A current-control apparatus as recited in claim 4, wherein said calculator is provided with means for determining an abnormality to determine whether an abnormal current value exists in detected current values of cycle time m fetched from said data storage device, and when an abnormal current value is determined to exist, does not utilize said abnormal current value in calculating said mean current value.

7. A current-control apparatus as recited in claim 6, wherein when an abnormal current value is determined to exist, said calculator estimates a normal current value with an analog-to-digital conversion timing of an abnormal current value from detected current values which have undergone analog-to-digital conversion before and after said abnormal current value, and substitutes said estimated current value for said abnormal current value in calculating said mean current value.

8. A current-control apparatus as recited in claim 4, further comprising a filter for eliminating high-frequency noise provided in a signal input path from said detector to said analog-to-digital converter.

9. A current-control apparatus as recited in claim 4, wherein said current-value storage device stores only detected current values of cycle time m of said pulse-width-modulated signal received for said calculator to calculate said mean current value; and said analog-to-digital converter sequentially updates, at said analog-to-digital conversion cycle, said sequentially-stored detected current values at said data storage device, by sequentially saving a newly detected digitally-converted current value at said data storage device.

10. A current-control apparatus as recited in claim 4, wherein said calculator operates at a predetermined operating cycle and calculates said mean current value together with a duty of said pulse-width-modulated signal based on said mean current value and said target current value; and a signal generator for repeatedly generating a pulse-width-modulated signal in correspondence with said duty calculated by said calculator.

11. A current-control apparatus as recited in claim 10, wherein said analog-to-digital conversion cycle is not more than a processing cycle whereat said calculator calculates said duty.

12. A current-control apparatus as recited in claim 10, wherein said calculator operates asynchronously from said analog-to-digital converter, and calculates said mean current value using respective detected current values stored at said data storage device.

13. A current-control apparatus as recited in claim 10, wherein said pulse-width-modulated signal generator and said analog-to-digital converter synchronously operate based on a clock signal from a common clock source.

* * * * *